US008302581B2

(12) United States Patent
Nishikiori et al.

(10) Patent No.: US 8,302,581 B2
(45) Date of Patent: Nov. 6, 2012

(54) AIR-FUEL RATIO IMBALANCE AMONG CYLINDERS DETERMINING APPARATUS OF A MULTI-CYLINDER INTERNAL COMBUSTION ENGINE

(75) Inventors: Takashi Nishikiori, Susono (JP); Keisuke Sano, Susono (JP); Takashi Watanabe, Susono (JP); Kazuhiro Wakao, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 13/192,143

(22) Filed: Jul. 27, 2011

(65) Prior Publication Data

US 2012/0053820 A1 Mar. 1, 2012

Related U.S. Application Data

(63) Continuation of application No. PCT/JP2009/051812, filed on Jan. 28, 2009.

(51) Int. Cl.
*F02M 1/00* (2006.01)

(52) U.S. Cl. ......... 123/434; 123/673; 701/103; 701/114

(58) Field of Classification Search .................. 123/434, 123/672, 673, 690; 701/103–105, 109, 114
See application file for complete search history.

(56) References Cited

U.S. PATENT DOCUMENTS

| | | | | |
|---|---|---|---|---|
| 4,577,602 A | * | 3/1986 | Showalter | 123/306 |
| 5,363,648 A | * | 11/1994 | Akazaki et al. | 60/276 |
| 5,600,056 A | * | 2/1997 | Hasegawa et al. | 73/23.32 |
| 5,623,913 A | * | 4/1997 | Kitajima et al. | 123/673 |
| 5,651,353 A | * | 7/1997 | Allston | 123/673 |
| 5,715,796 A | * | 2/1998 | Suzuki et al. | 123/492 |
| 5,732,689 A | * | 3/1998 | Ohno et al. | 123/673 |
| 7,802,563 B2 | * | 9/2010 | Behr et al. | 123/692 |
| 2007/0240695 A1 | * | 10/2007 | Mitsuda et al. | 123/673 |

FOREIGN PATENT DOCUMENTS

| | | |
|---|---|---|
| JP | 4-060135 A | 2/1992 |
| JP | 2000-0220489 A | 8/2000 |
| JP | 2005-030350 A | 2/2005 |
| JP | 2007-285136 A | 11/2007 |

OTHER PUBLICATIONS

International Search Report for PCT/JP2009/051812, dated Mar. 31, 2009.

* cited by examiner

*Primary Examiner* — John Kwon
(74) *Attorney, Agent, or Firm* — Sughrue Mion, PLLC

(57) ABSTRACT

An air-fuel ratio imbalance determining apparatus that is configured to sequentially stop a fuel injection for each of cylinders in accordance with a firing (ignition) order by changing the intake valves and exhaust valves of the cylinder whose fuel injection is stopped from a valve operating state to a valve resting state. After a predetermined time elapses (time-point tp), an upstream-side air-fuel ratio value obtained based on an output value of an upstream air-fuel ratio sensor disposed in the exhaust passage which becomes a value corresponding to an air-fuel ratio of the final gas. The determining apparatus obtains that value as data relating to an air-fuel ratio of the cylinder which discharged the final gas, and determines whether or not an air-fuel ratio imbalance is occurring based on the data relating to the air-fuel ratio of each of the cylinders.

6 Claims, 27 Drawing Sheets

AIR-FUEL RATIO IMBALANCE AMONG CYLINDERS DETERMINING APPARATUS OF A MULTI-CYLINDER INTERNAL COMBUSTION ENGINE

An air-fuel ratio imbalance among cylinders determining apparatus of a multi-cylinder internal combustion engine

TECHNICAL FIELD

The present invention relates to an "apparatus for determining an air-fuel ratio imbalance among cylinders of a multi-cylinder internal combustion engine", which is applied to the multi-cylinder internal combustion engine, the apparatus being able to determine (or monitor, detect) whether or not an imbalance of an air-fuel ratio of an air-fuel mixture supplied to each of cylinders (i.e., an air-fuel ratio imbalance among the cylinders, a variation in air-fuel ratios among the cylinders, or an air-fuel ratio non-uniformity among the cylinders) becomes excessively large.

BACKGROUND ART

A conventional and well-known multi-cylinder internal combustion engine adopting an electronic control fuel injection apparatus comprises one fuel injector per one of intake ports, each communicating with each of the cylinders (or each of combustion chambers of the cylinders). Further, the internal combustion engine of this type comprises a three-way catalytic converter (catalyst) and an air-fuel ratio sensor in an exhaust passage. The electronic control fuel injection apparatus, by an air-fuel ratio feedback amount calculated based on an output of the air-fuel ratio sensor, controls an "amount of a fuel injected from each of the fuel injectors" in such a manner that an average of air-fuel ratios of mixtures supplied to the entire engine coincides with (becomes equal to) the stoichiometric air-fuel ratio.

Meanwhile, when a property (characteristic) of the fuel injector for a specific cylinder becomes a "property that the fuel injector injects fuel in an amount larger (more excessive) than an instructed fuel injection amount", only an air-fuel ratio (air-fuel-ratio-of-the-specific-cylinder) of an air-fuel mixture supplied to the specific cylinder shifts to an extremely richer side. That is, a non-uniformity among air-fuel ratios of the cylinders (a variation in air-fuel ratios among the cylinders, air-fuel ratio imbalance among the cylinders) becomes large (prominent). In other words, there arises an imbalance among air-fuel ratios, each of which is an air-fuel ratio of a mixture supplied to each of a plurality of the cylinders (i.e., air-fuel ratios of individual cylinders).

In this case, an average of the air-fuel ratios of the mixtures supplied to the engine becomes an air-fuel ratio richer (smaller) than the stoichiometric air-fuel ratio. Accordingly, the air-fuel ratio of the specific cylinder is shifted to a leaner (larger) air-fuel ratio so that the air-fuel ratio of the specific cylinder is made closer to the stoichiometric air-fuel ratio, by the air-fuel ratio feedback amount calculated based on the output value of the air-fuel ratio sensor. The air-fuel ratio of the specific cylinder is still richer than the stoichiometric air-fuel ratio. Further, each of the air-fuel ratios of the other cylinders (air-fuel ratios of the cylinders other than the specific cylinder) is caused to shift to a leaner (larger) air-fuel ratio so that the air-fuel ratios of the other cylinders are caused to deviate more from the stoichiometric air-fuel ratio, by the air-fuel ratio feedback amount. At this time, since the number of the other cylinders is larger than the number (which is one) of the specific cylinder, each of the air-fuel ratios of the other cylinders is slightly leaner (larger) than the stoichiometric air-fuel ratio. As a result, the average of the air-fuel ratios of the entire mixtures supplied to the engine is caused to become roughly equal to the stoichiometric air-fuel ratio.

However, the air-fuel ratio of the specific cylinder is still richer (smaller) than the stoichiometric air-fuel ratio, and the air-fuel ratios of the other cylinders are still leaner (larger) than the stoichiometric air-fuel ratio, and therefore, a combustion condition of the mixture in each of the cylinders is different from a perfect combustion condition (combustion condition obtained when an air-fuel ratio of a mixture is equal to the stoichiometric air-fuel ratio). As a result, an amount of emissions (an amount of unburnt substances and/or an amount of nitrogen oxides) discharged from each of the cylinders increases. Accordingly, even though the average of the air-fuel ratios of the mixtures supplied to the engine coincides with the stoichiometric air-fuel ratio, the three-way catalytic converter may not be able to purify the increased emissions, and thus, there is a possibility that the emissions become worse. It is therefore important to detect whether or not the air-fuel ratio non-uniformity among cylinders becomes excessively large, since an appropriate measure can be taken in order to prevent the emissions from becoming worse.

One of conventional apparatuses (apparatuses for determining an air-fuel ratio imbalance among cylinders) that determine whether or not the "non-uniformity of the air-fuel ratios among cylinders (air-fuel ratio imbalance among cylinders, imbalance among air-fuel ratios of individual cylinders)" becomes excessively large obtains an estimated individual cylinder air-fuel ratio which represents each of the air-fuel ratios of the cylinders by analyzing an output of a single air-fuel ratio sensor disposed at an exhaust gas aggregated portion. Thereafter, the conventional apparatus determines whether or not the "non-uniformity of the air-fuel ratios among cylinders" becomes excessively large based on the estimated individual cylinder air-fuel ratio (refer to, for example, Japanese Patent Application Laid-Open (kokai) No. 2000-220489).

SUMMARY OF THE INVENTION

However, the conventional apparatus needs to detect, every time a short time period elapses, the air-fuel ratio of the exhaust gas which varies in accordance with an engine rotation, by the air-fuel ratio sensor. This requires an air-fuel ratio sensor having an extremely high responsibility. Further, there arises a problem that the apparatus can not estimate the air-fuel ratio of each of the cylinders with high accuracy, when the air-fuel ratio sensor is deteriorated, because the responsibility of the deteriorated air-fuel ratio sensor becomes lower. In addition, it is not easy to separate a noise from the variation in the air-fuel ratio. Furthermore, a high-speed data sampling technique and a high-performance CPU having a high processing ability are required. As described above, the conventional apparatus has a number of problems to be solved.

In contrast, when the air-fuel ratio sensor is provided in each of exhaust ports or each of branch portions of the exhaust manifold connected with each of the exhaust ports (i.e., at a position upstream of the aggregated portion of the exhaust manifold), the individual cylinder air-fuel ratio can be obtained. However, such an apparatus needs a number of air-fuel ratio sensors (i.e., a plurality of the air-fuel ratio sensors as many as the number of the cylinders).

The present invention is made to cope with the problems described above. One of objects of the present invention is therefore to provide a "practical apparatus for determining an air-fuel ratio imbalance among cylinders" which can determine whether or not the "air-fuel ratio imbalance (non-uniformity) among cylinders" becomes excessively large.

The apparatus for determining an air-fuel ratio imbalance among cylinders according to the present invention is applied to a multi-cylinder internal combustion engine comprising a plurality of cylinders having a valve driving device (unit).

The valve driving device is a device which selectively realizes (achieves) either one of a valve operating state and a valve resting state, in response to an instruction.

The valve operating state is a state, in which "an intake valve is opened and closed so that at least a fresh (new) air (a mixture in a case in which a fuel is injected into an intake port) is introduced into a combustion chamber through an intake port communicating with the combustion chamber" in an intake stroke, and in which "an exhaust valve is opened and closed so that a gas in the combustion chamber is discharged into an exhaust port communicating with the combustion chamber" in an exhaust stroke.

The valve resting state is a state in which "at least one of the intake valve and an exhaust valve" is maintained (kept) in "closing state" in "all strokes including the intake stroke and the exhaust stroke (i.e., a period in which a crank shaft rotates 720 degree crank angle)". In other words, the resting state is a state in which "at least one of the intake valve and the exhaust valve" is maintained (kept) in a non-operating (resting) state in such a manner that a new gas (gas other than a gas which once discharged into the exhaust ports) is not discharged into the exhaust ports.

The internal combustion engine to which the air-fuel ratio imbalance among cylinders determining apparatus according to the present invention is applied further comprises:

an exhaust gas aggregated section, which communicates with each of the exhaust ports of all "cylinders belonging to a specific cylinder group including at least two or more of a plurality of the cylinders of the engine", and into which a gas discharged from each of chambers of all of the cylinders belonging to the specific cylinder group merges (aggregates);

a main exhaust gas passage section, which communicates with the gas aggregated section, and which forms an exhaust passage downstream of the gas aggregated section; and a catalytic converter (e.g., three-way catalyst) disposed in the main exhaust gas passage section.

Furthermore, the air-fuel ratio imbalance among cylinders determining apparatus according to the present invention comprises: an air-fuel ratio sensor; engine control means; individual cylinder air-fuel ratio data obtaining means; and air-fuel ratio imbalance among cylinders determining means.

The air-fuel ratio sensor is disposed either in the "exhaust gas aggregated section" or in the "main exhaust gas passage section between the exhaust gas aggregated section and the catalytic converter". The air-fuel ratio sensor outputs an output value according to an air-fuel ratio of a gas existing at a position at which the air-fuel ratio sensor is disposed.

The engine control means is configured so as to supply an instruction to the valve driving device for all of the cylinders belonging to the specific cylinder group in such a manner that sates of all of the cylinders belonging to the specific cylinder group are maintained in the valve operating state, when the predetermined operation performing condition is not satisfied.

Further, the engine control means is configured so as to supply an instruction to the valve driving device for all of the cylinders belonging to the specific cylinder group in such a manner that the "sates of all of the cylinders belonging to the specific cylinder group" are sequentially changed "from the valve operating state to the valve resting state" in an "ignition order (firing order)" of the engine "from a first predetermined time-point (point in time) after the predetermined operation performing condition is satisfied.

The individual cylinder air-fuel ratio data obtaining means obtains a value based on the output value of the air-fuel ratio sensor at a predetermined second time-point after a "time-point at which the states of all of the cylinders belonging to the specific cylinder group have changed to the valve resting states owing to a satisfaction of the predetermined operation performing condition", as a data (i.e., air-fuel ratio relating data) rerating to an air-fuel ratio of a mixture supplied to the combustion chamber of a "cylinder (i.e., final gas discharging cylinder) whose state has changed to the valve resting state lastly (at the latest time-point) among all of the cylinders belonging to the specific cylinder group".

The air-fuel ratio imbalance among cylinders determining means, after a "time-point at which the air-fuel ratio relating data for each of all of the cylinders belonging to the specific cylinder group has been obtained" by the individual cylinder air-fuel ratio data obtaining means, determines whether or not an imbalance is occurring among the air-fuel ratios of the mixtures, each supplied to each of the combustion chambers of all of the cylinders belonging to the specific cylinder group, based on a plurality of the obtained air-fuel ratio relating data.

According to the configuration above, after the first predetermined time-point which is after the time-point at which the predetermined operation performing condition is satisfied, each of the "states of the cylinders belonging to the specific cylinder group" is sequentially changed from the valve operating state to the valve resting state in the order of ignition (firing order). No gas is newly discharged from the combustion chamber of the cylinder whose state has changed into the valve resting state. Accordingly, at the predetermined second time-point after a predetermined time has elapsed since (from) the time-point at which the states of all of the cylinders belonging to the specific cylinder group changed into the valve resting states, the gas existing at the position at which the air-fuel ratio sensor is disposed (i.e., at the "exhaust gas aggregated section" or at the position "between the exhaust gas aggregated section and the catalytic converter in the main exhaust gas passage section") substantially becomes a gas whose main component is a "gas discharged from the combustion chamber of the cylinder which lastly changed into the valve resting state (i.e., the gas of the final gas discharging cylinder).

Accordingly, the value obtained based on the output value of the air-fuel ratio sensor at the second predetermined time-point becomes the data (the air-fuel ratio relating data) which relates to the air-fuel ratio of the mixture supplied to the combustion chamber of the "final gas discharging cylinder". The individual cylinder air-fuel ratio data obtaining means obtains, as the "air-fuel ratio relating data for (of) the final gas discharging cylinder", the value based on the output value of the air-fuel ratio sensor at the second predetermined time-point. It should be noted that the "value based on the output value of the air-fuel ratio sensor" may be the output value of the air-fuel ratio sensor itself, or may be an air-fuel ratio obtained based on the output value of the air-fuel ratio sensor.

On the other hand, the predetermined operation performing condition is satisfied at a time-point irrelevant to the crank angle of the engine. Accordingly, when the predetermined operation performing condition is satisfied a sufficient number of times while the engine is continued to be operated, the air-fuel ratio relating data can be obtained for each of all of the cylinders belonging to the specific cylinder group. Alternatively, as described later, a data-to-be-obtained-cylinder (that is, a cylinder to be the final gas discharging cylinder) whose air-fuel ratio relating data should be obtained by the engine control means may be changed so that the air-fuel ratio relating data for each of all of the cylinders belonging to the specific cylinder group is obtained as early as possible, or so that it is avoided as much as possible that the air-fuel ratio relating data is obtained for a specific cylinder(s) only in an imbalanced manner. Then, the air-fuel ratio imbalance among cylinders determining means, after the "time-point at which the air-fuel ratio relating data for each of all of the cylinders belonging to the specific cylinder group has been obtained", determines whether or not "the air-fuel ratio imbalance among cylinders" is occurring based on a plurality of the obtained air-fuel ratio relating data.

As described above, according to the present invention, the data (the air-fuel ratio relating data) according to the air-fuel ratio of the mixture supplied to each of the cylinders can be obtained certainly, the practical air-fuel ratio imbalance among cylinders determining apparatus can be provided.

The engine control means can adopts, as the predetermined operation performing condition, a fuel-cut performing (executing, operation) condition.

In this case, the engine control means may be configured so as to:

(1) perform a fuel injection for each of the cylinders belonging to the specific cylinder group at a predetermined corresponding fuel injection timing which is before an end of the intake stroke of each corresponding cylinder, when the fuel cut performing condition is not satisfied; and (2) stop sequentially the fuel injection for each of the cylinders belonging to the specific cylinder group at the predetermined corresponding fuel injection timing, and change a state of the cylinder for which the fuel injection is stopped from the valve operating state to the valve resting state, after the predetermined first time-point which is after a time-point at which the fuel cut performing condition is satisfied.

Even when the state of the cylinder for which the fuel injection is stopped is changed "from the valve operating state to the valve resting state", there arises no problem for operating the engine, because no combustion is occurred in that cylinder. Accordingly, by the configuration described above, the air-fuel ratio relating data can be obtained without causing any obstacle for the operation of the engine. Further, since no fresh air is introduced (flowed) into the catalytic converter while the fuel cut operation is being performed, a progress of a deterioration of the catalytic converter can be avoided. It should be noted that "stopping sequentially the fuel injection for each of the cylinders belonging to the specific cylinder group at the predetermined corresponding fuel injection timing" may encompass "stopping the fuel injection for all of the cylinders belonging to the specific cylinder group after the predetermined first time-point". However, in the present example and attached claims, the expression of "the fuel injection is stopped" is used to express that "the fuel injection at the normal (original, or scheduled) injection timing is not performed.

In this case, it is preferable that the engine control means comprise data-to-be-obtained-cylinder determining means for determining the data-to-be-obtained-cylinder whose air-fuel ratio relating data should be obtained among the cylinders belonging to the specific cylinder group, when the fuel cut performing condition is satisfied. Further, it is preferable that the engine control means be configured so as to sequentially stop the fuel injection at the predetermined fuel injection timing for each of all of the cylinders belonging to the specific cylinder group in such a manner that the determined data-to-be-obtained-cylinder becomes the final gas discharging cylinder (that is, instruct the valve driving device to do so).

The fuel cut performing condition is satisfied at a time-point irrelevant to the crank angle of the engine. Accordingly, when the fuel cut performing condition is satisfied a sufficient number of times while the engine is continued to be operated, the air-fuel ratio relating data can be obtained for each of all of the cylinders belonging to the specific cylinder group. However, there may be a case in which the time-point at which the fuel cut performing condition is satisfied coincides with a time-point which makes a certain (specific) cylinder become the final gas discharging cylinder with high frequency (in an imbalanced manner).

In view of the above, providing the data to be obtained cylinder determining means which determines the data-to-be-obtained-cylinder when the fuel cut performing condition is satisfied as described above allows the air-fuel ratio relating data for each of the cylinders to be obtained with the similar frequency among the cylinders.

Consequently, the air-fuel ratio imbalance among cylinders determination can be made earlier. Alternatively, in a case in which an average of the air-fuel ratio relating data for a certain cylinder is obtained as the air-fuel ratio of the mixture supplied to the certain cylinder (i.e., as the individual cylinder air-fuel ratio), and in which the air-fuel ratio imbalance among cylinder determination is made by making a comparison among the individual cylinder air-fuel ratios thus obtained, a reliability of the individual cylinder air-fuel ratios can be made higher so that the reliability of the individual cylinder air-fuel ratio is approximately equal to each other.

Further, it is preferable that the data-to-be-obtained-cylinder determining means be configured so as to determine the data-to-be-obtained-cylinder based on the number of times of obtaining the air-fuel ratio relating data for each of all of the cylinders belonging to the specific cylinder group.

According to the aspect described above, a difference in frequencies of obtaining air-fuel ratio relating data for each of the cylinders can be made smaller with more certainty.

Further, it is preferable that the data-to-be-obtained-cylinder determining means be configured so as to determine the data-to-be-obtained-cylinder based on a time-relating-value which corresponds to a "time (duration) from a time-point at which the fuel cut performing condition is satisfied to the predetermined fuel injection timing of each of all of the cylinders belonging to the specific cylinder group".

For example, by means of sequentially stopping the fuel injection for the cylinder whose fuel injection timing is scheduled to arrive at an earlier time-point after the fuel cut performing condition is satisfied (i.e., sequentially stopping the fuel injection for from the cylinder whose fuel injection timing comes first to the cylinder whose fuel injection timing comes last after the fuel cut performing condition is satisfied), a time (duration) can be made shortest from the time-point at which the fuel cut performing condition is satisfied to a time-point at which the fuel injection for the final gas discharging cylinder is stopped. In contrast, if the data-to-be-obtained cylinder is different from the thus determined final gas discharging cylinder, a time (duration) can be made longer from the time-point at which the fuel cut performing condition is satisfied to the time-point at which the fuel injection for the final gas discharging cylinder is stopped. The time (duration) varies depending on a time (duration) from the time-point at which the fuel cut performing condition is satisfied to the fuel injection timing of the desired data-to-be-obtained cylinder. Accordingly, if the apparatus assigns the excessively higher priority to obtain the air-fuel ratio relating data with the similar frequency for each of the cylinders, a substantial completion of a start time-point of the fuel cut operation (i.e., a time-point at which fuel injections for all of the cylinders belonging to the specific cylinder group are stopped) is excessively delayed, and therefore, the engine may have an obstacle in the operation.

In contrast, according to the aspect described above, the data-to-be-obtained-cylinder is determined further based on the time-relating-value which corresponds to the "time (duration) from the time-point at which the fuel cut performing condition is satisfied to the predetermined fuel injection timing of each of all of the cylinders belonging to the specific cylinder group". Consequently, it is possible to avoid an occurrence of the obstacle in the engine operation due to the excessive delay of the start time-point of the substantial fuel cut operation.

It should be noted that the "time-relating-value" may be the "time (duration) from the time-point at which the fuel cut performing condition is satisfied to the predetermined fuel injection timing of each of all of the cylinders belonging to the specific cylinder group" itself, or may be a time varying depending on such a time (for example, a "time from the time-point at which the fuel cut performing condition is satisfied to a time-point at which an exhaust top dead center arrives of each of all of the cylinders belonging to the specific cylinder group").

It is also preferable that the data-to-be-obtained-cylinder determining means be configured so as to determine, when the fuel cut performing condition is currently satisfied, as a current data-to-be-obtained cylinder, a cylinder different from a cylinder which was the data-to-be-obtained cylinder when the fuel cut performing condition was satisfied previously.

According to the aspect described above as well, the difference in the frequencies of obtaining air-fuel ratio relating data for each of the cylinders can be made smaller.

DESCRIPTION OF THE BEST EMBODIMENT TO CARRY OUT THE INVENTION

Each of embodiments of an air-fuel ratio imbalance among cylinders determining apparatus (hereinafter, simply referred to as a "determining apparatus") according to the present invention will next be described with reference to the drawings. The determining apparatus is also a fuel injection amount control apparatus for controlling a fuel injection amount.

Structure Common to all of the Embodiments

Figure 1:
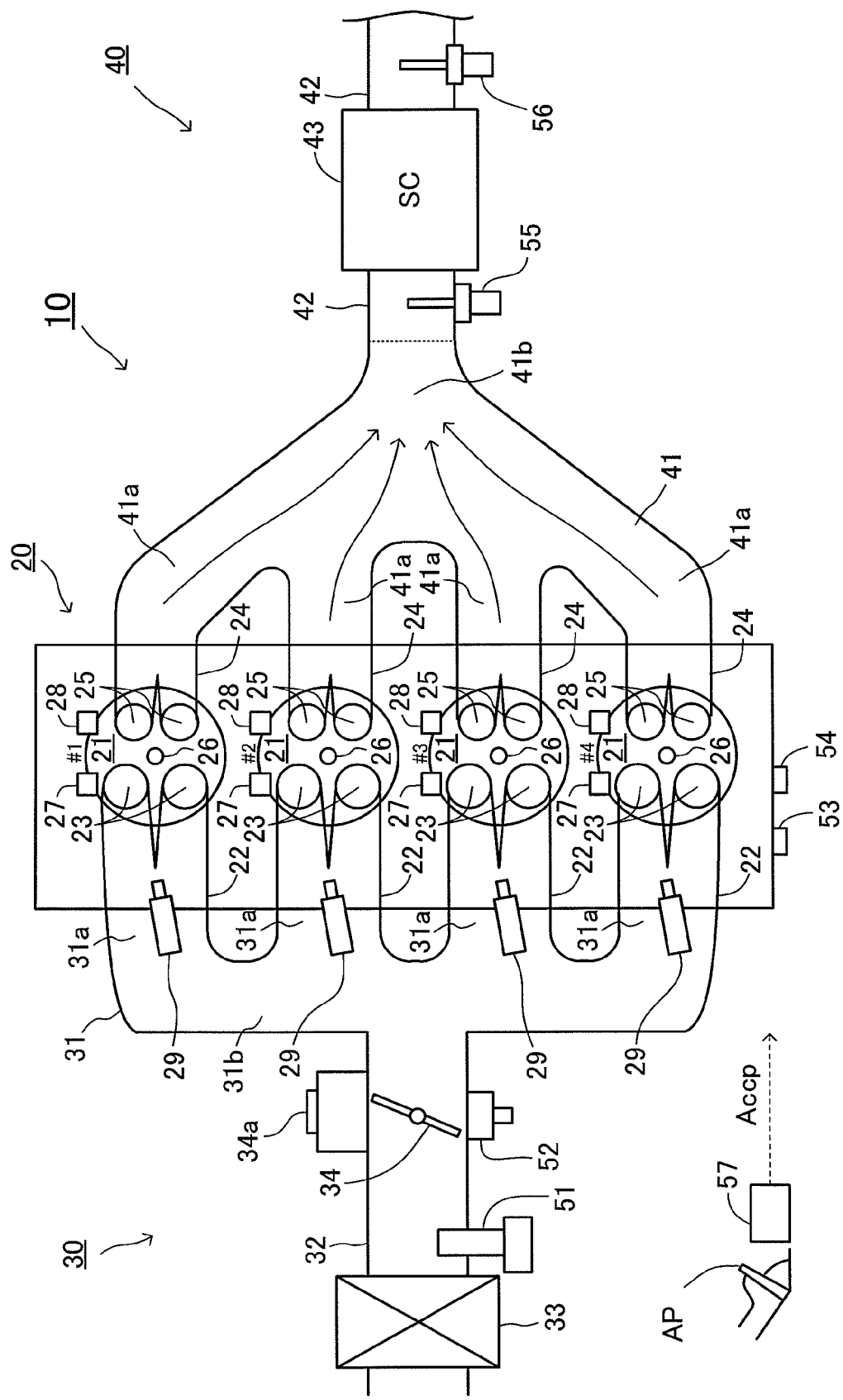
FIG. 1 is a schematic view of an internal combustion engine to which an air-fuel ratio imbalance among cylinders determining apparatus according to embodiments of the present invention is applied.

Firstly, a configuration of an internal combustion engine to which the determining apparatus according to each of the embodiments is applied will be described. FIG. 1 shows a schematic configuration of the internal combustion engine 10. The engine 10 is a 4 cycle, spark-ignition, multi-cylinder (in the present example, in-line 4 cylinders including a first cylinder #1 to a fourth cylinder #4), gasoline engine. The engine 10 includes a body section 20, an intake system 30, and an exhaust system 40. An ignition (firing) of the engine 10 is sequentially performed in order of the first cylinder #1, the third cylinder #3, the fourth cylinder #4, and the second cylinder #2. Accordingly, a fuel injection is also sequentially performed in order of the first cylinder #1, the third cylinder #3, the fourth cylinder #4, and the second cylinder #2.

The body section 20 includes a cylinder block section and a cylinder head section. The body section 20 includes a plurality of (i.e., four) of combustion chambers 21, each being formed by a top surface of a piston, a bore wall surface of a cylinder, and a bottom surface of the cylinder head section.

The cylinder head section includes: intake ports 22, each for supplying a "mixture of an air and a fuel" to each of the combustion chambers; and intake valves 23, each for opening and closing the intake port 22 (that is, each for realizing either one of a communicating state and a closing (shutoff) state between the combustion chamber 21 and the intake port 22). Each cylinder has two intake ports 22. Accordingly, two of the intake valves 23 are provided for each of the cylinders.

Further, the cylinder head section includes: exhaust ports 24, each for discharging an exhaust gas (burnt gas) from the combustion chamber 21; and exhaust valves 25, each for opening and closing the exhaust port 24 (that is, each for realizing either one of a communicating state and a closing (shutoff) state between the combustion chamber 21 and the exhaust port 24). Each cylinder has two exhaust ports 24. Accordingly, two of the exhaust valves 25 are provided for each of the cylinders.

A plurality (i.e., four) of ignition plugs 26 are fixed at the cylinder head section. Each of the ignition plugs 26 is disposed in such a manner that its spark generation portion is exposed in each of the combustion chambers 21 at a central portion of the chamber 21 and at a position close to the bottom surface of the cylinder head section. Each of the ignition plugs 26 is configured so as to generate a spark for an ignition from the spark generation portion in response to an ignition signal.

A "variable valve operating mechanism for intake valves" which is not shown in FIG. 1 and a "variable valve operating mechanism for exhaust valves" which is not shown in FIG. 1, that are described later in detail, are provided for each of the cylinders in the cylinder head section. An intake valve actuator 27 of the variable valve operating mechanism for intake valves and an exhaust valve actuator 28 of the variable valve operating mechanism for exhaust valves are provided for each of the cylinders. The variable valve operating mechanism may be referred to as a "valve driving device (unit)".

When a state of the intake valve actuator 27 is changed to a first state (that is, a displacement member 27a described later is moved to a first position (normal position) which is a displacement end Pmax1), the variable valve operating mechanism for intake valves cooperates with an intake cam shaft which is not shown in FIG. 1 so as to open the intake valve 23 in such a manner that at least a fresh air (in the present, a mixture of the fresh air and a fuel injected from a fuel injector 29) is introduced into the combustion chamber 21 through the intake port 22 in (during) an intake stroke, and so as to close the intake valve 23 in (during) the other strokes. When the intake valve 23 is in this state, it is expressed that the intake valve 23 is in "a valve operating state or an active state".

When a state of the exhaust valve actuator 28 is changed to the first state (that is, a displacement member 28a described later is moved to the first position (normal position) which is the displacement end Pmax1), the variable valve operating mechanism for exhaust valves cooperates with an exhaust cam shaft which is not shown in FIG. 1 so as to open the exhaust valve 25 in such a manner that a gas in the combustion chamber 21 is discharged into the exhaust port 24 in (during) an exhaust stroke, and so as to close the exhaust valve 25 in (during) the other strokes. When the exhaust valve 25 is in this state, it is expressed that the exhaust valve 25 is in "a valve operating state or an active state". In this manner, when the intake valve 23 and the exhaust valve 25 are both in the valve operating state, the intake valve 23 and the exhaust valve 25 are operated so as to generate a "normal combustion".

When the state of the intake valve actuator 27 is changed to a second state (that is, the displacement member 27a described later is moved to a second position (valve resting position) which is a displacement end Pmax2), the variable valve operating mechanism for intake valves is configured so as to rest (the operation of) the intake valve 23 in such a manner that the intake valve 23 is maintained in a valve closing state. That is, when the state of the intake valve actuator 27 is changed to the second state, the intake valve 23 is maintained in the valve closing state while the crank angle is equal to a value corresponding to not only the compression stroke, the expansion stroke, and the exhaust stroke, but also the intake stroke (i.e., regardless of the crank angle). When the intake valve 23 is in this state, it is expressed that the intake valve 23 is in "a valve resting state, a valve inoperative state, or an inactive state.

When the state of the exhaust valve actuator 28 is changed to the second state (that is, the displacement member 28a described later is moved to the second position (valve resting position) which is a displacement end Pmax2), the variable valve operating mechanism for exhaust valves is configured so as to rest (the operation of) the exhaust valve 25 in such a manner that the exhaust valve 25 is maintained in a valve closing state. That is, when the state of the exhaust valve actuator 28 is changed to the second state, the exhaust valve 25 is maintained in the valve closing state while the crank angle is equal to a value corresponding to not only the intake stroke, the compression stroke, and the expansion stroke, but also the exhaust stroke (i.e., regardless of the crank angle). When the exhaust valve 25 is in this state, it is expressed that the exhaust valve 25 is in "a valve resting state, a valve inoperative state, or an inactive state".

It should be noted that, in the present specification and the claims attached, a cylinder whose at least one of the intake valve(s) 23 and the exhaust valve(s) 25 is in the valve resting state is expressed as a "cylinder (or the state of the cylinder) which is in the valve resting state". In the present specification and the claims attached, a cylinder whose intake valve(s) 23 and exhaust valve(s) 25 are both in the valve operating states is expressed as a "cylinder (or the state of the cylinder) which is in the valve operating state".

Further, a plurality (i.e., four) of fuel injectors (infection valves, injectors) 29 are fixed in the cylinder head section. Each of the fuel injectors 29 is disposed at an aggregated portion of a pair of the intake ports 22 of each of the cylinders. The fuel injector 29 is configured so as to inject, in response to an injection instruction signal, a "fuel of an instructed injection amount Fi included in the injection instruction signal" into the corresponding intake ports 22, when the fuel injector 29 is normal. In this way, each of the plurality of the cylinders 21 comprises the fuel injector (fuel supplying means) 29 for supplying the fuel independently from the other cylinders.

The intake system 30 includes an intake manifold 31, an intake pipe 32, an air filter 33, a throttle valve 34, and a throttle valve actuator 34a.

The intake manifold 31 includes: a plurality of branch portions 31a, each being connected with each of aggregated portions of the intake ports 22; and a surge tank 31b into which the branch portions 31a merge (aggregate). The intake pipe 32 is connected to the surge tank 31b. The intake manifold 31, the intake pipe 32, and the plurality of intake ports 22 constitute (form) an intake passage. The air filter 33 is disposed at an end of the intake pipe 32. The throttle valve 34 is rotatably supported in the intake pipe 32 at a position between the air filter 33 and the intake manifold 31. The throttle valve 34 is configured so as to rotate to adjust/vary an opening sectional area of the intake passage formed by the intake pipe 32. The throttle valve actuator 34a includes a DC motor, and is configured so as to rotate the throttle valve 34 in response to an instruction (drive) signal.

The exhaust system 40 includes: an exhaust manifold 41; an exhaust pipe 42: an upstream-side catalytic converter 43; and an unillustrated downstream-side catalytic converter.

The exhaust manifold 41 includes: a plurality of branch portions 41a, each communicating with each of the exhaust ports 24; and an aggregated portion (section) 41b into which the branch portions 41a merge (aggregate). The exhaust pipe 42 is connected with the aggregated portion 41b of the exhaust manifold 41. The exhaust manifold 41, the exhaust pipe 42, and a plurality of the exhaust ports 23 constitute (form) a passage through which an exhaust gas passes. It should be noted that, in the present specification and the attached claims, for convenience, the branch portions 41a of the exhaust manifold 41 may be referred to as an exhaust gas passage branch section, the aggregated portion 41b of the exhaust manifold 41 may be referred to as an exhaust gas aggregated section, and the exhaust pipe 42 may be referred to as a main exhaust gas passage section.

The upstream-side catalytic converter 43 is so-called a three-way catalytic unit (catalyst) which supports a "noble (precious) metals serving as catalytic materials" and "ceria ($CeO_2$) serving as an oxygen-storage-release material" on a support made of a ceramics, and which has an oxygen-storage-release function (oxygen storage function). The upstream-side catalytic converter 43 is disposed (interposed) in the exhaust pipe 42. The unillustrated downstream-side catalytic converter is the three-way catalytic unit similar to the upstream-side catalytic converter 43. The downstream-side catalytic converter is disposed (interposed) in the exhaust pipe 42 at a position downstream of the upstream-side catalytic converter 43. These are the outline of the engine 10.

The determining apparatus comprises: a hot-wire air flowmeter 51; a throttle position sensor 52; a cam position sensor 53; a crank position sensor 54; an upstream air-fuel ratio sensor 55; a downstream air-fuel ratio sensor 56; and an accelerator opening sensor 57.

The hot-wire air flowmeter 51 detects a mass flow rate of an intake air flowing in the intake pipe 32 so as to output a signal indicative of the mass flow rate (an intake air amount per unit time of the engine 10) Ga.

The throttle position sensor 52 detects an opening (degree) of the throttle valve 34 so as to output a signal indicative of the throttle valve opening angle TA.

The cam position sensor 53 generates a single pulse signal every time the intake cam shaft rotates by 90 degrees, further 90 degrees, and further 180 degrees from a predetermined angle.

The crank position sensor 54 outputs a signal which has a narrow pulse every 10° rotation of an unillustrated crank shaft of the engine 10 and a wide pulse every 360° rotation of the crank shaft. The pulse signal generated by the crank position sensor 54 is converted into a signal indicative of an engine rotational speed NE by an electric controller 60 described later (refer to FIG. 3). Further, the electric controller 60 obtains, based on the signals from the cam position sensor 53 and the crank position sensor 54, a crank angle of the engine (for example, an absolute crank angle representing a crank angle with reference to an intake top dead center of each of the cylinder).

The upstream air-fuel ratio sensor 55 is disposed in either one of the aggregated portion 41b of the exhaust manifold 41 and the exhaust pipe 42 at a position between the aggregated portion 41b of the exhaust manifold 41 and the upstream-side catalytic converter 43 (that is, either in the exhaust gas aggregated section or in the main exhaust gas passage section at a position upstream of the upstream-side catalytic converter 43). The upstream air-fuel ratio sensor 55 is a "wide range air-fuel ratio sensor of a limiting current type having a diffusion resistance layer", described in, for example, Japanese Patent Application Laid-Open (kokai) No. Hei 11-72473, Japanese Patent Application Laid-Open No. 2000-65782, and Japanese Patent Application Laid-Open No. 2004-69547, etc.

Figure 2:
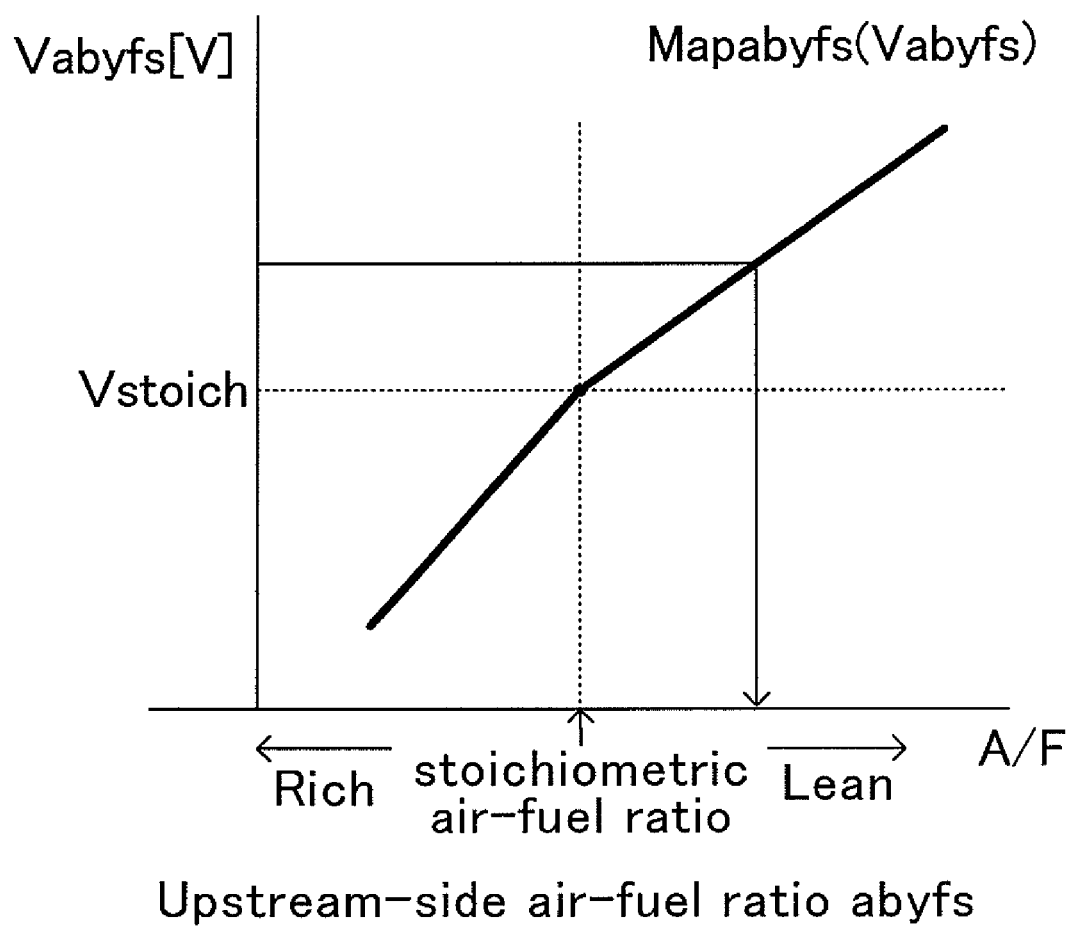
FIG. 2 is a graph showing a relationship between an output value of the upstream air-fuel ratio sensor shown in FIG. 1 and an upstream-side air-fuel ratio.

As shown in FIG. 2, the upstream air-fuel ratio sensor 55 outputs an output value Vabyfs according to an air-fuel ratio (upstream-side air-fuel ratio) of the exhaust gas (the gas whose air-fuel ratio is to be detected) flowing/passing through (at) the position at which the upstream air-fuel ratio sensor 55 is disposed. The output value Vabyfs increases, as the air-fuel ratio of the gas whose air-fuel ratio is to be detected becomes larger (leaner). The electric controller 60, described later, stores an air-fuel ratio conversion table (map) Mapabyfs shown in FIG. 2, and detects/obtains an actual upstream-side air-fuel ratio abyfs by applying an actual output value Vabyfs to the air-fuel ratio conversion table Mapabyfs. The detected/obtained upstream-side air-fuel ratio abyfs may be simply referred to as a "detected air-fuel ratio abyfs".

As described above, the upstream air-fuel ratio sensor 55 is an air-fuel ratio sensor, which is disposed either in the "exhaust gas aggregated section (the aggregated portion 41b)" or in the "main exhaust gas passage section (the exhaust pipe 43) at a position between the exhaust gas aggregated section (the aggregated portion 41b) and the catalytic converter (the upstream-side catalytic converter 43)", and which outputs the output value Vabyfs corresponding to an air-fuel ratio of a gas existing at the position at which the air-fuel ratio sensor is disposed.

Referring back to FIG. 1 again, the downstream air-fuel ratio sensor 56 is disposed in the exhaust pipe 42 and at a position between the upstream-side catalytic converter 43 and the unillustrated downstream-side catalytic converter. The downstream air-fuel ratio sensor 56 is a well-known oxygen-concentration sensor of a concentration cell type (O₂ sensor). The downstream air-fuel ratio sensor 56 outputs an output value Voxs according to an air-fuel ratio (downstream-side air-fuel ratio) of the exhaust gas flowing/passing through (at) the position at which the downstream air-fuel ratio sensor 56 is disposed.

The output value Voxs of the downstream air-fuel ratio sensor 56 becomes equal to a maximum output value max (e.g., about 0.9 V) when the downstream-side air-fuel ratio is richer than the stoichiometric air-fuel ratio, becomes equal to a minimum output value min (e.g., about 0.1 V) when the downstream-side air-fuel ratio is leaner than the stoichiometric air-fuel ratio, and becomes equal to a voltage Vst (e.g., about 0.5 V) which is a approximately middle value between the maximum output value max and the minimum output value min when the downstream-side air-fuel ratio is equal to the stoichiometric air-fuel ratio.

The accelerator opening sensor 57 detects an operation amount Accp of an accelerator pedal AP operated by a driver so as to output a signal indicative of the operation amount Accp of the accelerator pedal AP.

Figure 3:
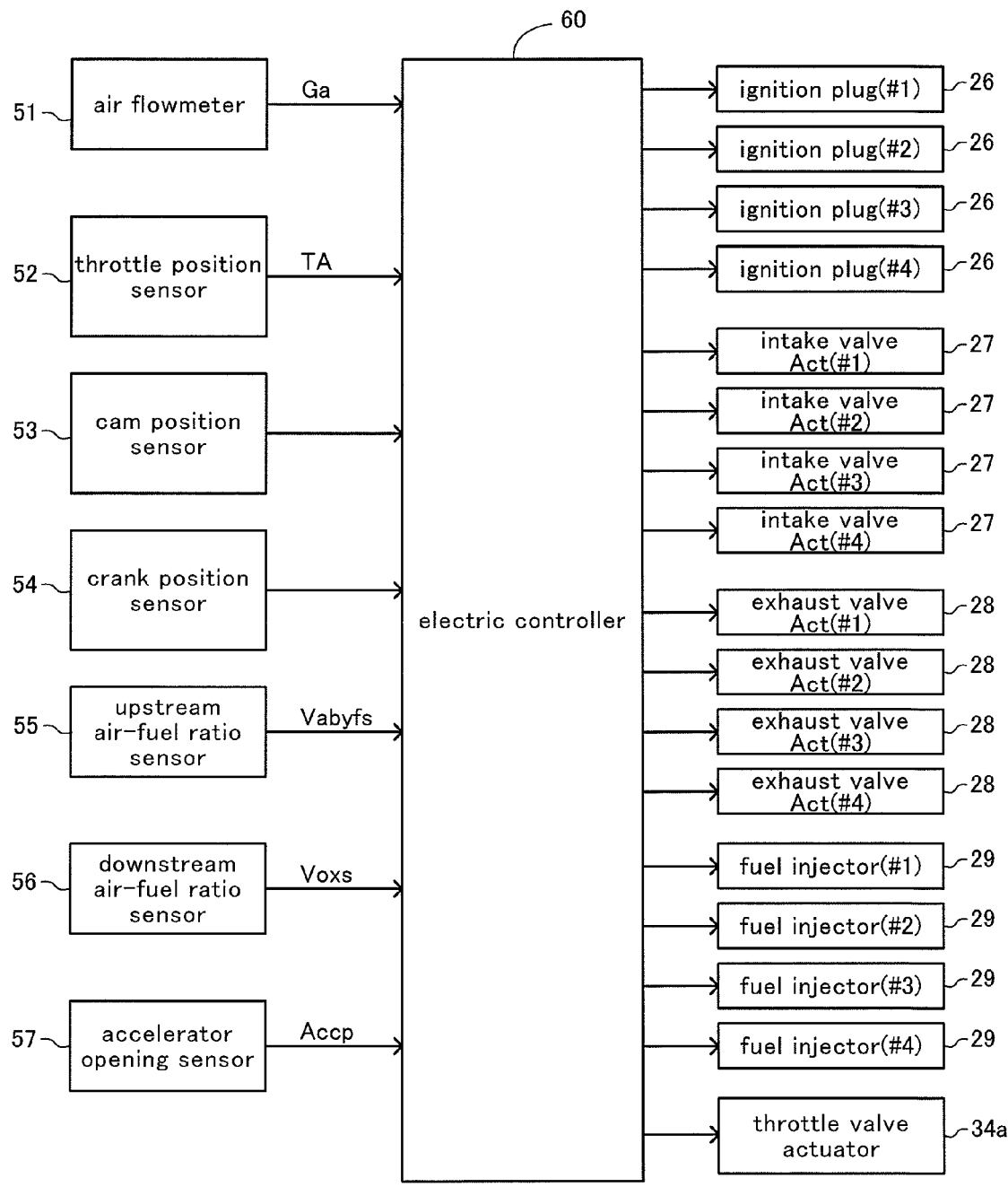
FIG. 3 is a block diagram showing an electrical configuration of the air-fuel ratio imbalance among cylinders determining apparatus according to the embodiments of the present invention.

The determining apparatus further includes an electric controller 60 shown in FIG. 3. The electric controller 60 is a "well-known microcomputer" including "a CPU, a ROM, a RAM, a backup RAM (or a nonvolatile memory such as an EEPROM) which stores data when an electric power is supplied and holds the data while the electric power is not supplied, an interface including an AD converter, and so on".

The interface of the electric controller 60 is connected to the sensors 51 to 57, and is configured in such a manner that the interface supplies signals from the sensors 51 to 57 to the CPU. Further, the interface is configured so as to send instruction signals (an ignition signal, an injection instruction signal, a drive signal, and so on), in response to instructions from the CPU, to each of the ignition plugs 26 of each of the cylinders, each of the intake valve actuators 27 of each of the cylinders, each of the exhaust valve actuators 28 of each of the cylinders, each of the fuel injectors 29 of each of the cylinders, the throttle valve actuator 34a, and so on. It should be noted that the electric controller 60 is connected to send the instruction signal to the throttle valve actuator 34a in such a manner that the throttle valve opening angle TA is increased as the obtained operation amount Accp of the accelerator pedal becomes larger.

<Variable Valve Operating Mechanism>

The variable valve operating mechanism for intake valves and the variable valve operating mechanism for exhaust valves will next be described. The variable valve operating mechanism for intake valves and the variable valve operating mechanism for exhaust valves have similar configurations to each other. Accordingly, the variable valve operating mechanism for intake valves will firstly be described.

Figure 4:
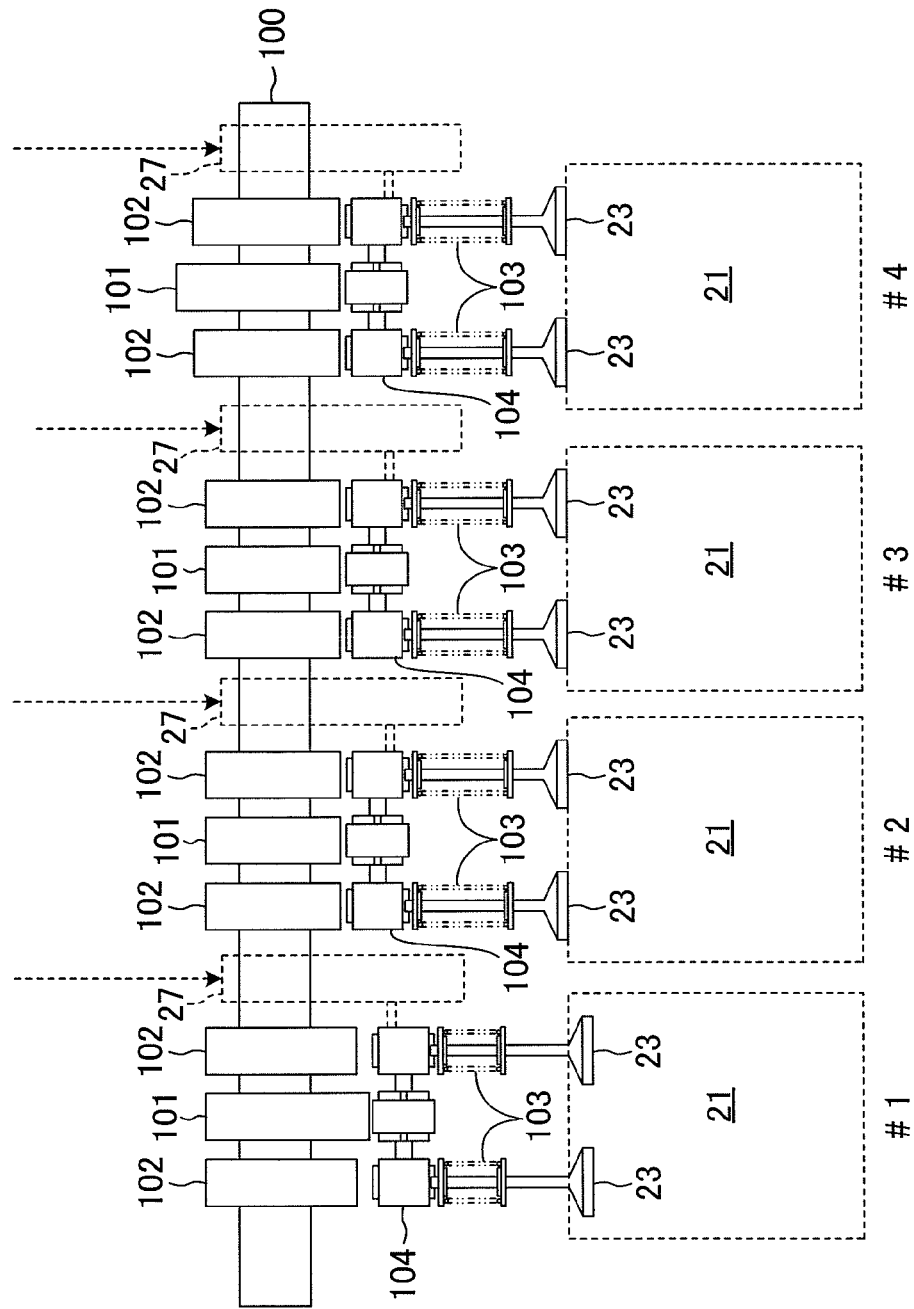
FIG. 4 is a schematic view of a mechanism for opening and closing intake valves (variable valve driving mechanism for intake valves, intake valve opening-closing mechanism)

As shown in FIG. 4, the variable valve operating mechanism for intake valves comprises the intake cam shaft 100, cams 101, cams 102, valve springs 103, variable mechanisms 104, and the intake valve actuators 27 described before.

The intake valve 23 is opened and closed by utilizing actuating forces of "the main cam 101 and the sub cam 102" fixed to the intake cam shaft 100, and biasing force of the valve spring 103. The intake cam shaft 100 is connected with the unillustrated crank shaft through a timing chain etc., and is configured to be rotated at half speed of the crank shaft.

One of the main cams 101 and two of the sub cams 102 per one of the cylinders are formed on (in) the intake cam shaft 100. The main cam 101 is disposed (arranged) between the two sub cams 102. A profile of the main cam 101 has (assumes) a shape such that "an action angle of the intake valve 23 and a lift amount of the intake valve 23 depending on a height of a cam nose" when the intake valve 23 is opened and closed by the main cam 101 are respectively greater than "an action angle of the intake valve 23 and a lift amount of the intake valve 23" when the intake valve 23 is opened and closed by the sub cam 102.

A profile of the sub cam 102 has (assumes) a shape such that the "lift amount of the intake valve 23 (i.e., the height of a cam nose)" is zero. In other words, the sub cam 102 is a cam having a base circle portion only, i.e., the sub cam 102 is a zero-lift cam.

The variable mechanism 104 is interposed (arranged) between the cams 101, 102 and the intake valves 23 for each of the cylinders including the first cylinder #1, the second cylinder #2, the third cylinder #3, and the fourth cylinder #4. That is, the actuating force of the cams 101 and 102 is transmitted to two of the intake valves 23 through the variable mechanism 104.

The variable mechanism 104 is an "intake valve opening property changing mechanism" which can selectively achieve (realize) either a "state in which the actuating force of the main cam 101 is transmitted to the intake valve(s) 23" or a "state in which the actuating force of the sub cam(s) 102 is transmitted to the intake valve(s) 23".

It should be noted that, in the present embodiment, the sub cam 102 is the zero lift cam. Accordingly, the state (the valve resting state) in which the actuating force of the sub cam(s) 102 is transmitted to the intake valve(s) 23 means a sate in which the intake valve(s) 23 is/are maintained in the closing state, and neither opens nor closes.

Figure 5:
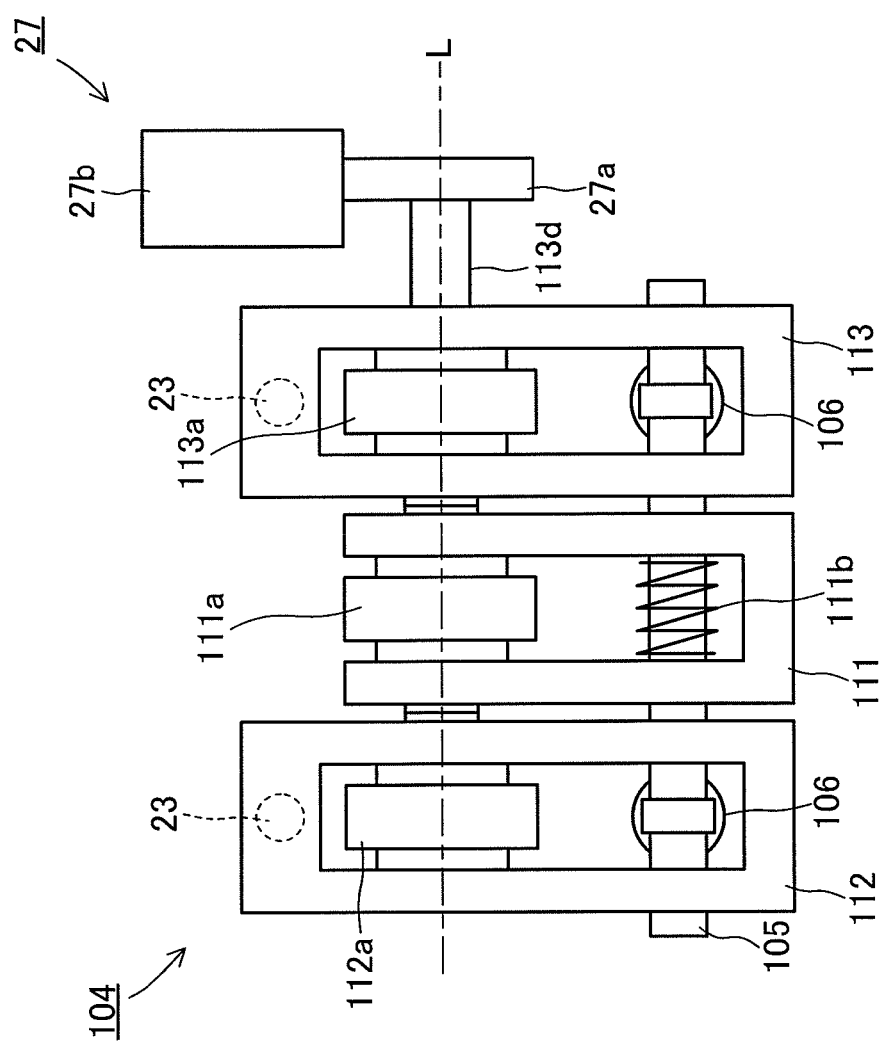
FIG. 5 is a plan view of the variable mechanism shown in FIG. 4.

Each of the variable mechanisms 104 of each of the cylinders is configured so as to be driven by the intake valve actuator 27 which is provided one by one cylinder. As shown in FIG. 5 which is a plan view of the variable mechanism 104, the variable mechanism 104 includes a rocker shaft 105. The rocker shaft 105 is supported by the cylinder head section through a lash adjuster 106 in such a manner that the rocker shaft 105 is parallel to the "intake cam shaft 100 shown in FIG. 4" (refer to FIG. 7).

A single first roller rocker arm 111 and a pair of second roller rocker arms 112, 113 are rotatably supported by the rocker shaft 105. The first roller rocker arm 111 is disposed (arranged) between the two second roller rocker arms 112 and 113. A length of the first roller rocker arm 111 is shorter than a length of the second roller rocker arm 112, 113.

A first roller 111a is rotatably supported at a portion close to an end of the first roller rocker arm 111. The first roller rocker arm 111 is biased in a direction shown by an arrow X in FIG. 6 by a coil spring 111b fixed to the rocker shaft 105. That is, the coil spring 111b biases the first roller rocker arm 111 in such a manner that the first roller 111a always contacts with the main cam 101.

According to the above configuration, the first roller rocker arm 111 moves (pivots, swings) around the rocker shaft 105 by a cooperation of the actuating force of the main cam 101 and the biasing force of the coil spring 111b. The first roller rocker arm 111 may be referred to as a first swing member.

Figure 7:
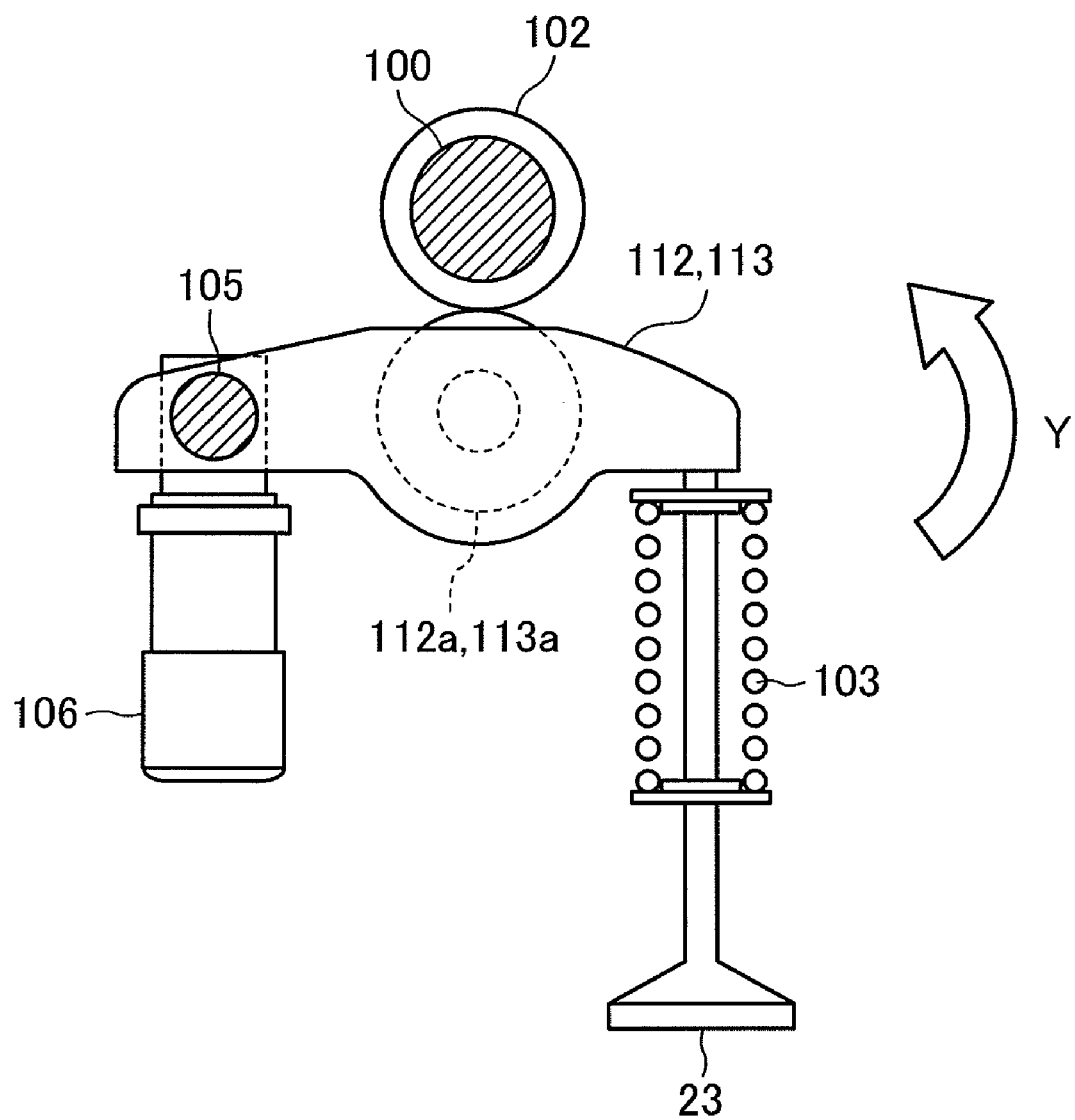
FIG. 7 is a side view of a second roller rocker arm.

On the other hand, as shown in FIG. 7, an end portion of each of the second roller rocker arm 112, 113 contacts with a base portion of the intake valve 23 (more specifically, a base end portion of the valve stem). Second rollers 112a, 113a are rotatably supported by the second roller rocker arm 112, 113 at positions toward rocker shaft 105 with respect to the contact portions with the intake valves 23. An outer diameter of each of the second rollers 112a, 113a is substantially equal to an outer diameter of the first roller 111a.

A position of each of the second roller 112a, 113a is arranged (determined) in such a manner that a shaft center of each of the second roller 112a, 113a and a shaft center of the first roller 111a are in the same straight line L (refer to FIG. 5), when the first roller 111a contacts with the base circle portion of the main cam 101 (refer to FIG. 6) and each of the second rollers 112a, 113a contacts with the base circle portion of each of the sub cams 102, 102 (refer to FIG. 7).

Each of the second roller rocker arms 112, 113 is biased in a direction shown by an arrow Y in FIG. 7 by each of the valve springs 103, 103. Accordingly, each of the second rollers 112a, 113a is pressed against each of the sub cams 102, 102 by each of the valve springs 103, 103 when each of the sub cams 102, 102 lifts (including, lifting at zero lift) each of the intake valves 23, 23.

Each of the second roller rocker arms 112, 113 is pressed against each of the sub cams 102, 102 by each of the lash adjusters 106, 106 when each of the sub cams 102, 102 does not lift each of the intake valves 23, 23. Each of the second roller rocker arms 112, 113 thus configured is referred to as a second swing member.

A mechanism (switching mechanism) for connecting/separating the first roller rocker arms 111 with/from the second roller rocker arms 112, 113 will next be described.

Figure 8:
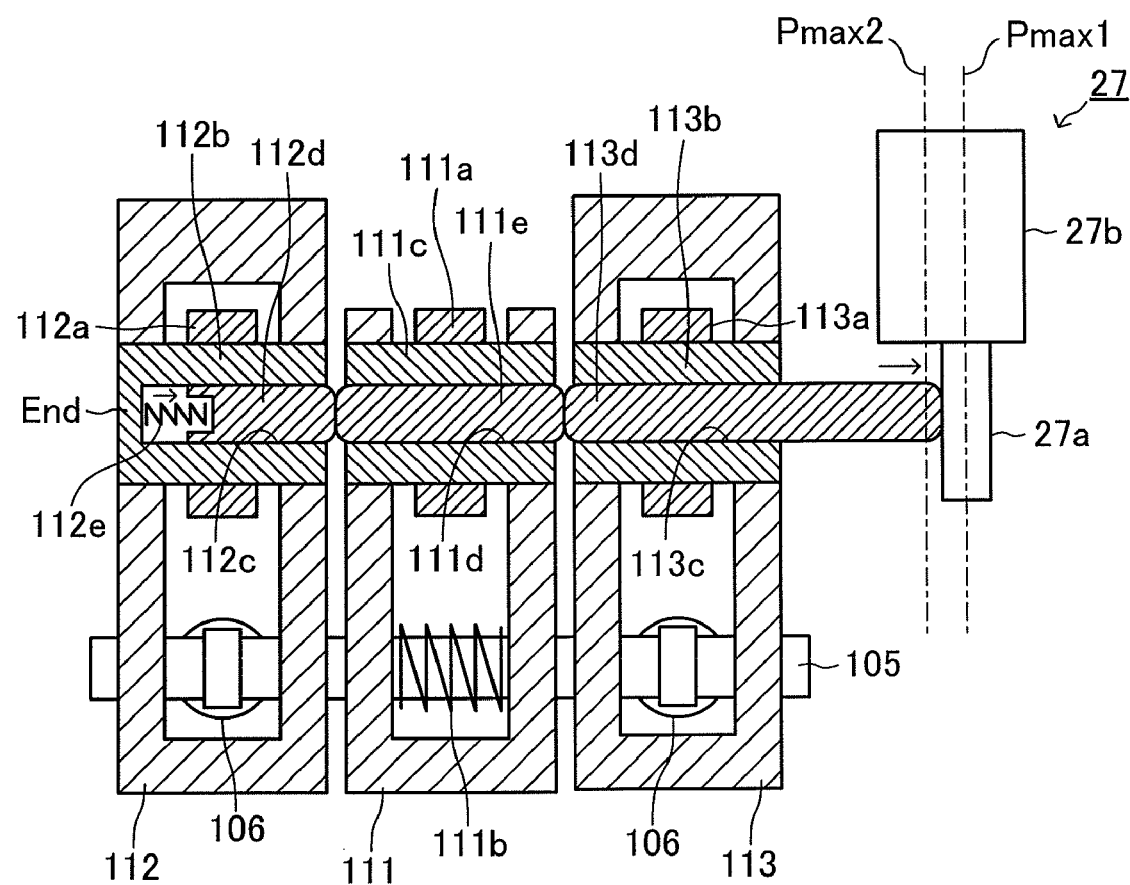
FIG. 8 is a top cross-sectional view of the variable mechanism shown in FIG. 5.

FIG. 8 is a cross-sectional view of the variable mechanism shown 104. As shown in FIG. 8, in a "first support shaft 111c" which is a support shaft of the first roller 111a, a first pin hole 111d is formed in such a manner that the first pin hole 111d extends in an axial direction of the first support shaft 111c. The first pin hole 111d opens at both ends (sides) of the first roller rocker arm 111.

Figure 9:
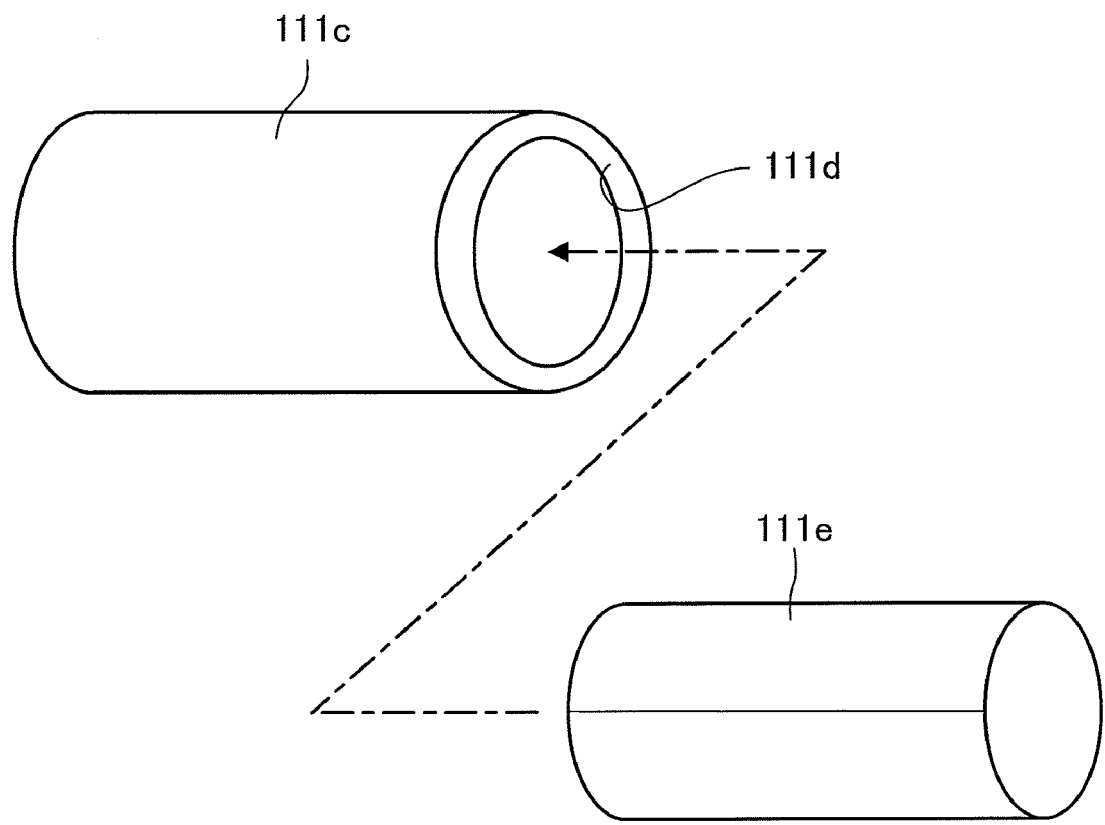
FIG. 9 is a view showing a first support shaft and a first pin.

As shown in FIG. 9, a cylindrical first pin 111e is slidably inserted into the first pin hole 111d. An outer diameter of the first pin 111e is substantially equal to an inner diameter of the first pin hole 111d. A length of the first pin 111e along the axis direction is substantially equal to a length of the first pin hole 111d.

Referring back to FIG. 8 again, in "second support shafts 112b and 113b" that are support shafts of the second rollers 112a and 113a, respectively, "a second pin hole 112c and a second pin hole 113c" are formed, respectively, in such a manner that they extend in the axial direction. Each of the inner diameters of the second pin holes 112c and 113c is equal to the inner diameter of the first pin hole 111d.

One of ends of the second pin hole 112c among the two second pin holes 112c and 113c (the second pin hole positioned at an opposite side to the intake valve actuator 27 with reference to the first roller rocker arm 111) is opened at a side of the first roller rocker arm 111, and the other end End of the second pin hole 112c at an opposite side to the first roller rocker arm 111 is closed (hereinafter, the end which is closed is referred to as a "closed end").

Figure 10:
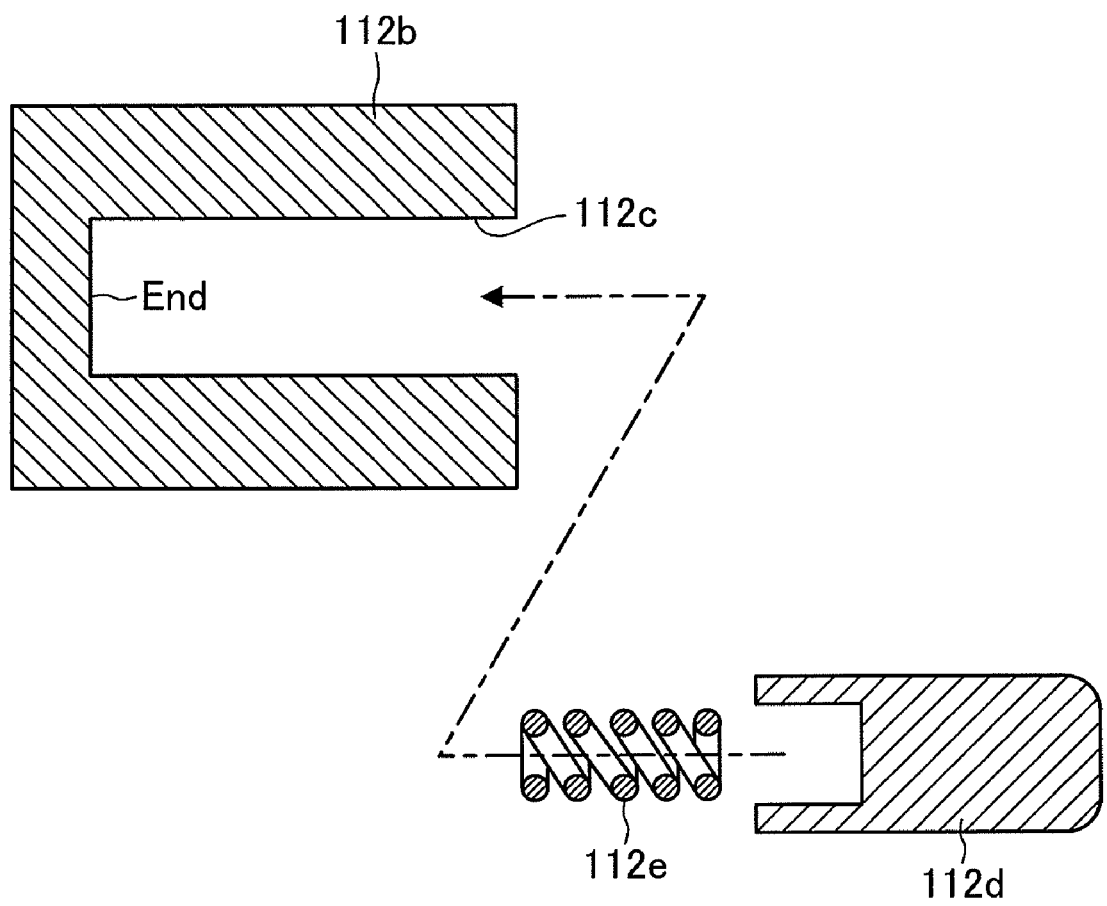
FIG. 10 is a view showing a second support shaft and a second pin.

As shown in FIG. 10, a cylindrical second pin 112d is slidably inserted into the second pin hole 112c. An outer diameter of the second pin 112d is substantially equal to the inner diameter of the second pin hole 112c. A length of the second pin 112d along the axis direction is shorter than a length of the second pin hole 112c.

A return spring 112e is installed in the second pin hole 112c. The return spring 112e is disposed between an end portion of the second pin 112d (end at a side of the closed end End) and the closed end End of the second pin hole 112c. The return spring 112e is a member which biases the second pin 112d toward the first roller rocker arm 111.

Referring back to FIG. 8 again, both ends of the second pin hole 113c which is the other pin hole among the two second pin holes 112c and 113c (the second pin hole positioned at a side to the intake valve actuator 27 with reference to the first roller rocker arm 111) are opened at both ends of the second roller rocker arm 113.

A cylindrical second pin 113d is slidably inserted into the second pin hole 113c. An outer diameter of the second pin 113d is substantially equal to the inner diameter of the second pin hole 113c. A length of the second pin 113d along the axis direction is longer than a length of the second pin hole 113c.

It is not necessary for centers of the pin holes 111d, 112c, and 113c to coincide with shaft centers of the support shafts 111c, 112b, and 113b. However, relative positional relationship among the three pin holes 111d, 112c, and 113c is determined/arranged in such a manner that the shaft centers of the pin holes 111d, 112c, and 113c are in the same straight line, when the first roller 111a contacts with the base circle portion of the main cam 101 (refer to FIG. 6) and each of the second rollers 112a, 113a contacts with the base circle portion of each of the sub cams 102, 102 (refer to FIG. 7).

In the mechanism thus configured, the second pin 112d is always biased toward the first roller rocker arm 111 by the return spring 112e. Therefore, the top end of the second pin 112d is pressed against the base end of the first pin 111e. Accordingly, the top end of the first pin 111e is pressed against the base end of the second pin 113d. Consequently, the top end of the second pin 113d always contacts with a displacement member 27a of the intake valve actuator 27.

The displacement member 27a is moved by an electric motor 27b of the intake valve actuator 27 in such a manner that the displacement member 27a can move forward and backward in the axial directions of the support shafts 111c, 112b, and 113b (in other words, in the axial direction of the pins 111e, 112d, and 113d). As described above, the intake valve actuator 27 (electric motor 27b) is electrically controlled by the electric controller 60.

A positional relative relationship and dimensions of "the displacement member 27a, the return spring 112e, the first pin 111e, and the second pins 112d, 113d" are so determined to satisfy two conditions described below.

(1) As shown in FIG. 8, when the displacement member 27a is positioned at a displacement end Pmax1 which is the furthest position from the variable mechanism 104, in other words, when the return spring 112e extends so as to become the predetermined longest length, the top end of the second pin 112d and the base end of the first pin 111e are positioned in a gap between the second roller rocker arm 112 and the first roller rocker arm 111, and the top end of the first pin 111e and the base end of the second pin 113d are positioned in a gap between the first roller rocker arm 111 and the second roller rocker arm 113.

Figure 11:
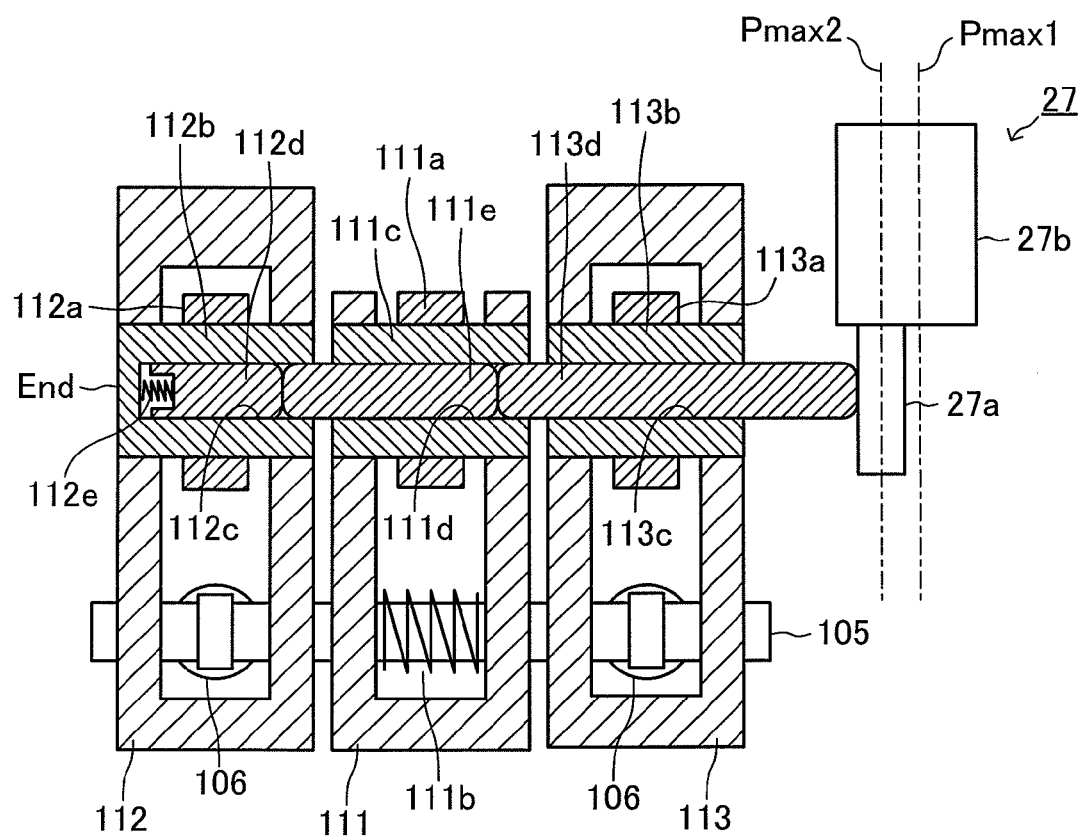
FIG. 11 is a view for describing an operation of the variable mechanism.

(2) As shown in FIG. 11, when the displacement member 27a is positioned at another displacement end Pmax2 close to the variable mechanism 104, in other words, when the return spring 112e compresses so as to become the predetermined shortest length, the top end of the second pin 112d and the base end of the first pin 111e are positioned in the second pin hole 112c, and the top end of the first pin 111e and the base end of the second pin 113d are positioned in the first pin hole 111d.

If the positional relative relationship and the dimensions of the displacement member 27a, the return spring 112e, the first pin 111e, and the second pins 112d, 113d are determined according to the conditions (1) and (2) described above, the first roller rocker arm 111 and the second roller rocker arms 112, 113 are separated from each other when the displacement member 27a is positioned at the displacement end Pmax1.

In such a case, the first roller rocker arm 111 swings (pivots) by the actuating force of the main cam 101. Independently from the swing motion of the first roller rocker arm 111, the second roller rocker arms 112, 113 receive the actuating force of the sub cams 102, 102. However, the sub cam 102 is the zero lift cam, and thus, the second roller rocker arms 112, 113 do not swing (pivot). Consequently, the intake valves 23 do not perform the opening and closing operation. That is, the intake valves 23 are maintained in the resting state.

Meanwhile, when only the first roller rocker arm 111 swings, the shaft center of the first pin 111e deviates from the shaft center of the second pins 112d, 113d. In such a case, it is necessary that a part of an end face of the first pin 111e and a part of an end face of the second pin 112d contact with each other, and a part of an end face of the first pin 111e and a part of an end face of the second pin 113d contact with each other. Accordingly, shapes of the end faces of the first pin 111e, and the second pins 112d, 113d are determined so as to satisfy such a condition.

In contrast, when the displacement member 27a is positioned at the displacement end Pmax2, the second roller rocker arm 112 and the first roller rocker arm 111 are interlocked (joined, connected) by the first pin 111e, and the first roller rocker arm 111 and the second roller rocker arm 113 are connected (interlocked, joined) by the second pin 113d. That is, when the displacement member 27a is positioned at the displacement end Pmax2, the first roller rocker arm 111 and the second roller rocker arms 112, 113 are connected to each other.

When the first roller rocker arm 111 and the second roller rocker arms 112, 113 are connected to each other, and when the first roller rocker arm 111 swings by the actuating force of the main cam 101, the second roller rocker arms 112, 113 also swing together with the first roller rocker arm 111. Consequently, the intake valves 23 perform the opening and closing operation in accordance with the cam profile of the main cam 101. That is, the intake valves 23 are in the operating state.

Figure 12:
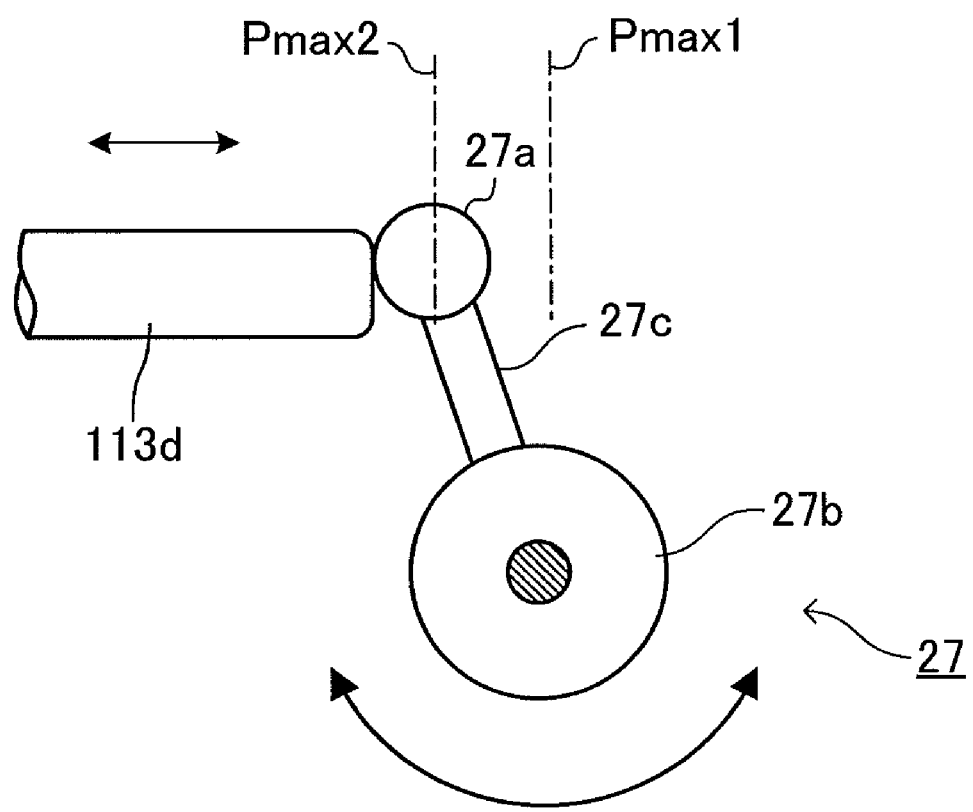
FIG. 12 is a plan view showing an intake valve actuator.

A more specific configuration of the intake valve actuator 27 will next be described. FIG. 12 is a plan view showing the more specific configuration of the intake valve actuator 27.

The intake valve actuator 27 comprises: the displacement member 27a; the electric motor 27b supported by the cylinder head section; and an arm 27c extending in a radial direction from an outer circumference of the electric motor 27b. A base portion of the arm 27c is fixed to a rotating shaft of the electric motor 27b, and a tip portion of the arm 27c is fixed to the displacement member 27a. As described before, the displacement member 27a is in abutment with the tip portion of the second pin 113d of the variable mechanism 104. The intake valve actuator 27 rotates the electric motor 27b to thereby rotate the arm 27c so that the displacement member 27a is moved at either the displacement end Pmax1 or the displacement end Pmax2. By means of this action, the intake valve actuator 27 moves the second pin in the axial direction to thereby set the state of the intake valve(s) 23 to (at) either the "valve operating state" or the "valve resting state".

Figure 13:
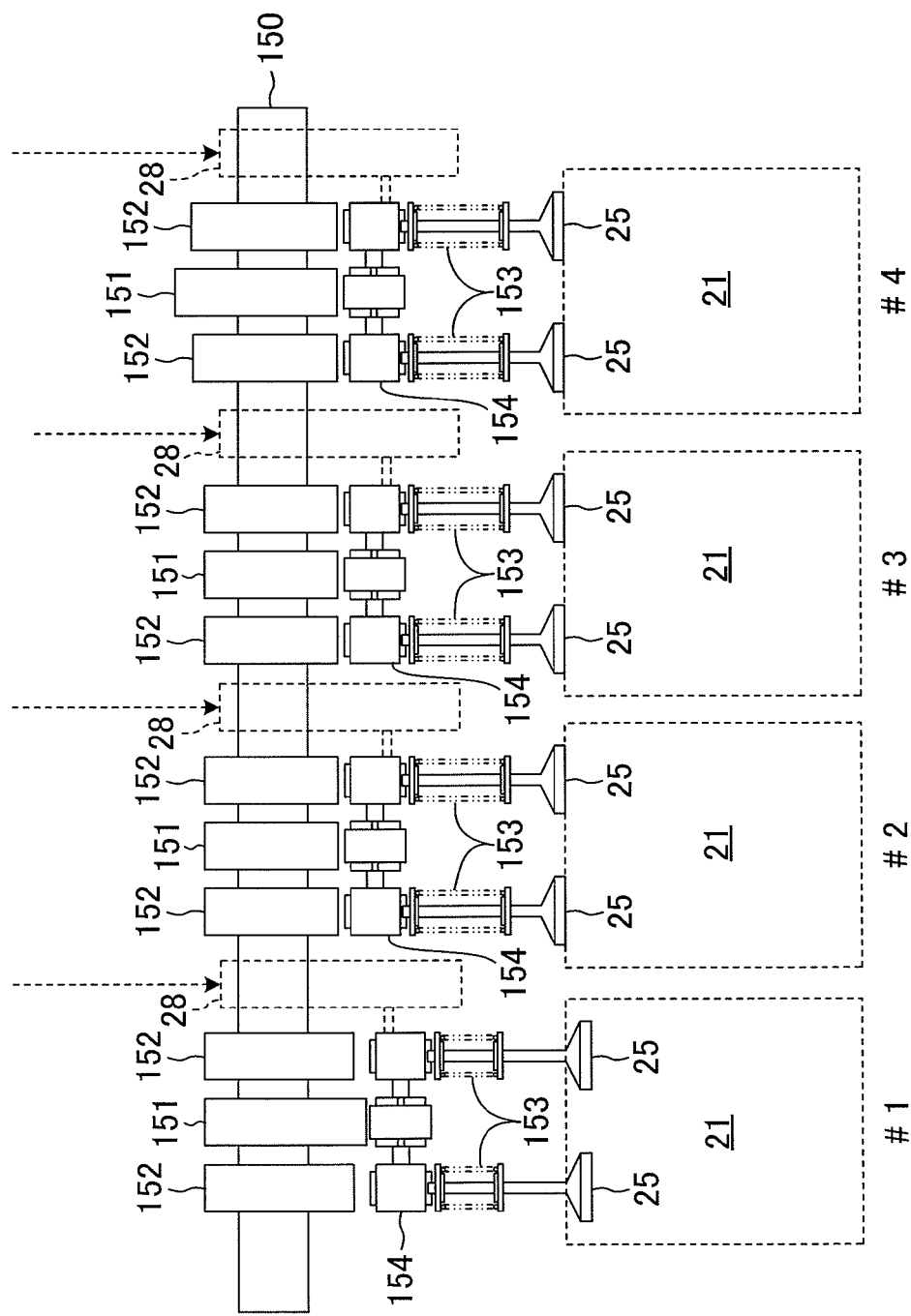
FIG. 13 is a schematic view of a mechanism for opening and closing exhaust valves (variable valve driving mechanism for exhaust valves, exhaust valve opening-closing mechanism)

As shown in FIG. 13, the variable valve operating mechanism for exhaust valves comprises: an exhaust cam shaft 150; cams 151; cams 152; valve springs 153; variable mechanisms 154; and exhaust valve actuators 28. The cams 151, the cams 152, the valve springs 153, the variable mechanisms 154, and the exhaust valve actuators 28 have configurations equivalent to the configurations of "the cams 101, the cams 102, the valve springs 153, the variable mechanisms 104, and the intake valve actuators 27" described above, respectively. Accordingly, by driving the exhaust actuator 28 by the electric controller 60, the state of the exhaust valve(s) 25 is set to (at) either the "valve operating state" or the "valve resting state". These are the configurations of the variable valve operating mechanism for intake valves and the variable valve operating mechanism for exhaust valves.

<Outline of Air-Fuel Ratio Imbalance Among Cylinders Determining Method>

An "outline of air-fuel ratio imbalance among cylinders determining method" commonly adopted by the determining apparatuses according to the embodiments will next be described. The determination of an air-fuel ratio imbalance among cylinders is determining whether or not the air-fuel ratio imbalance among cylinders becomes larger than a warning value, in other words, the determination is determining whether or not a non-uniformity among individual cylinder air-fuel-ratios which can not be permissible in view of the emission (i.e., the air-fuel ratio imbalance among cylinders) is occurring. Accordingly, if a "value according (corresponding) to an air-fuel ratio of a mixture supplied to each of the cylinders" can be obtained for each individual cylinder while an air-fuel ratio control is being performed to supply a mixture whose air-fuel ratio is equal to a predetermined target air-fuel ratio (e.g., the stoichiometric air-fuel ratio) to each of the cylinders, it is possible to perform the determination of the air-fuel ratio imbalance among cylinders by comparing these values.

In view of the above, the determining apparatus sequentially stops supplying the fuel (injection) to each of the cylinders according to the ignition (firing) order (i.e., fuel injection order) after a predetermined first time-point which is after a time-point (hereinafter this time-point is referred to as "a predetermined operating condition satisfied time-point, a fuel cut operating condition satisfied time-point, or a fuel cut start condition satisfied time-point") at which a fuel cut operating condition (a fuel cut start condition) as a predetermined operation performing condition is satisfied. In other words, after the predetermined first time-point (time-point at which the fuel injection is firstly stopped), the determining apparatus sequentially stops the fuel injection from the fuel injector 29 provided at the position corresponding to each of the cylinders (the intake ports 22 of each cylinder) in the fuel injection order. Further, the determining apparatus changes the "states of the intake valves 23 and the exhaust valves 25 of the cylinder which is in a state in which the fuel injection to the cylinder is started to be stopped" to the valve resting states and maintains the states. That is, the determining apparatus sequentially changes the state of the cylinder whose fuel injection is stopped from the valve operating state to the valve resting state, from the cylinder whose fuel injection is stopped.

In this case, by a time-point (final gas discharged time-point) at which an exhaust gas (hereinafter, referred to as "final gas") generated as a result of a combustion of a mixture including a fuel lastly injected immediately before the predetermined first time-point" is discharged from a cylinder (hereinafter, referred to as "final gas discharging cylinder") which had the combustion to its exhaust ports 24, exhaust gases discharged from the other cylinders 21 flows into the upstream-side catalytic converter 43 and flows out to a downstream of the upstream-side catalytic converter 43 through the exhaust manifold 41 and the exhaust pipe 42. Further, after the final gas discharged time-point, no new gas is discharged from any one of the combustion chambers 21 to the exhaust ports 24.

Accordingly, when a predetermined time elapses from the final gas discharged time-point (e.g., when a time required for the final gas to reach the upstream air-fuel ratio sensor 55 elapses from the final gas discharged time-point), a space formed by "the all of the exhaust ports 24, the exhaust manifold 41, and a portion upstream of the upstream-side catalytic converter 43 in the exhaust pipe 42" is substantially filled with the final gas. It should be noted that the space formed by "the all of the exhaust ports 24, the exhaust manifold 41, and the portion upstream of the upstream-side catalytic converter 43 in the exhaust pipe 42" is simply referred to as a "exhaust gas staying space", hereinafter.

Consequently, when the predetermined time elapses from the final gas discharged time-point, the output value Vabyfs of the upstream air-fuel ratio sensor 55 becomes stable, and the output value Vabyfs becomes a value representing (indicative of) an air-fuel ratio of the exhaust gas of the "cylinder whose corresponding fuel injection was carried out finally (i.e., the final gas discharging cylinder)" (and thus, it represents the air-fuel ratio of the mixture supplied to the final gas discharging cylinder). The determining apparatus obtains the output value Vabyfs as data (air-fuel ratio relating data) representing (indicative of) the air-fuel ratio of the "cylinder whose corresponding fuel injection was performed lastly (i.e. the final gas discharging cylinder)", and memorizes/stores it in a memory (the RAM).

Figure 14:
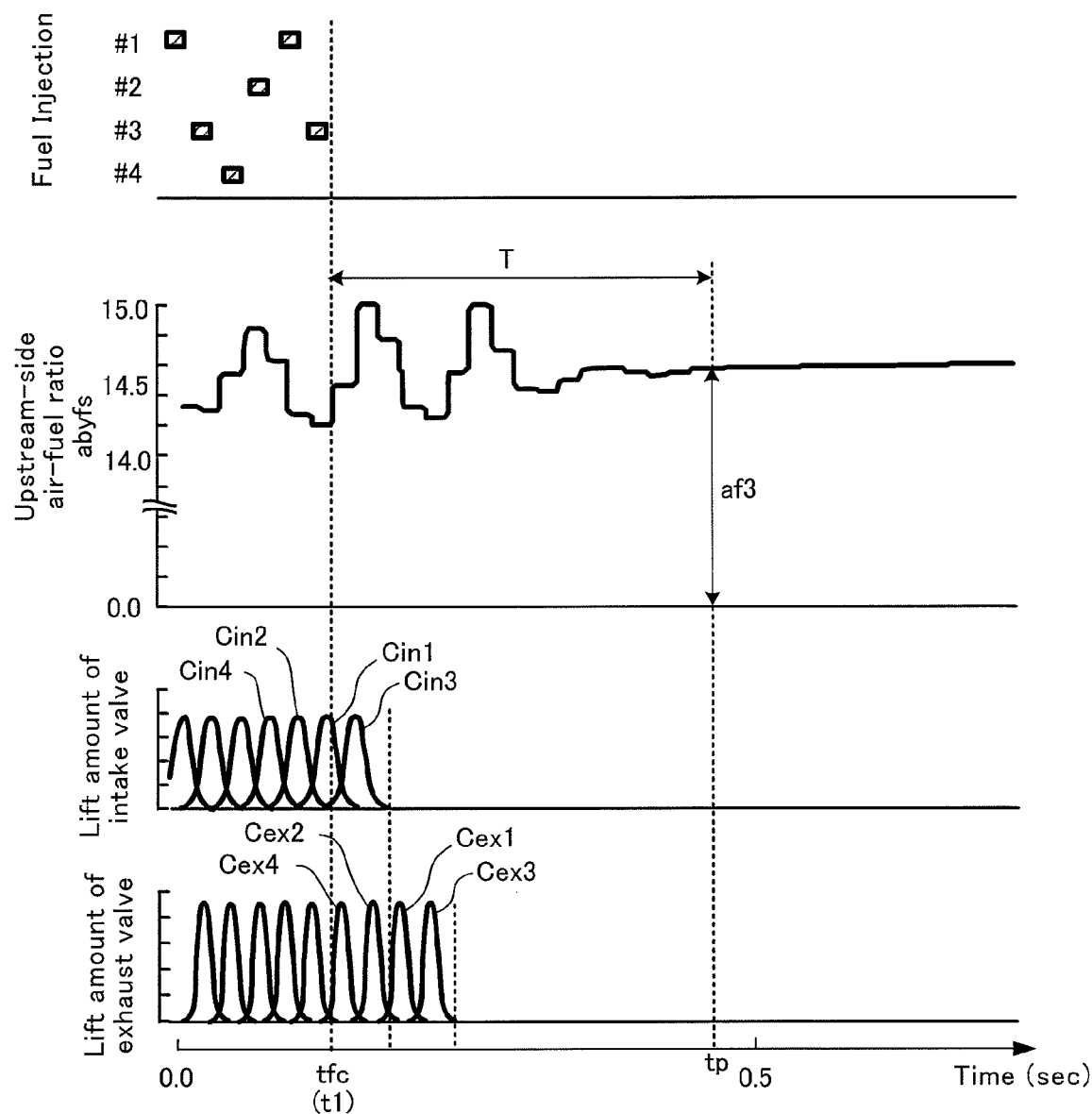
FIG. 14 is a timing chart showing "fuel injections, an upstream-side air-fuel ratio, lift amounts of the intake valves, and lift amounts of the exhaust valves" immediately after and immediately before a fuel cut performing condition is satisfied.

More specific description on the operation described above will be made with reference to FIG. 14. FIG. 14 is a timing chart showing "fuel injections, an upstream-side air-fuel ratio obtained based on the output value Vabyfs of the upstream air-fuel ratio sensor 55, lift amounts of the intake valves, and lift amounts of the exhaust valves" immediately after and immediately before at the time-point (fuel cut start condition satisfied time-point tfc) at which the fuel cut performing condition described above is satisfied. A curve line CinN (N; an integer from 1 to 4) shows a lift amount of the intake valve(s) 23 of the Nth cylinder, and a curve line CexN (N; an integer from 1 to 4) shows a lift amount of the exhaust valve(s) 25 of the Nth cylinder.

In the example shown in FIG. 14, a fuel injection for a cylinder is stopped from a time-point (the first predetermined time-point t1 described above) at which a fuel injection timing firstly arrives after the fuel cut start condition satisfied time-point tfc. It should be noted that the first predetermined time-point t1 may be a fuel injection timing which arrives after a time-point at which the several number of fuel injections are performed after the fuel cut start condition satisfied time-point tfc, for example.

In the example shown in FIG. 14, the fuel cut start condition satisfied time-point tfc arrives immediately after the completion of the fuel injection for the third cylinder. Accordingly, the first fuel injection timing which arrives immediately after the fuel cut start condition satisfied time-point tfc is the fuel injection timing for the fourth cylinder.

The determining apparatus maintains both the state of the intake valves 23 of the m-th cylinder (m: an integer from 1 to 4) and the state of the exhaust valves 25 of the m-th cylinder in the "valve operating states" until a time-point at which "the exhaust gas generated in the m-th cylinder as a result of a combustion of a fuel in the combustion chamber 21 of the m-th cylinder is completely discharged from the combustion chamber 21 of the m-th cylinder to the exhaust ports 24 of the combustion chamber 21 of the m-th cylinder (i.e., exhaust gas staying space), the fuel injected for the m-th cylinder by the predetermined first time-point t1 after the fuel cut start condition satisfied time-point tfc, and thereafter, the determining apparatus changes at least one of the state of the intake valves 23 of the m-th cylinder and the state of the exhaust valves 25 of the m-th cylinder (both states, in the example shown in FIG. 14) into the "valve resting state(s)".

That is, in the example shown in FIG. 14, the intake valves 23 of the third cylinder are maintained in the valve operating state until the latest point in time (refer to a curve line Cin3), and the exhaust valves 25 of the third cylinder are maintained in the valve operating state until the latest point in time (refer to a curve line Cex3).

In this way, the fuel injection is sequentially stopped after the predetermined first time-point t1 which is after the fuel cut start condition satisfied time-point tfc. However, the exhaust gas generated from the fuel already injected is sequentially discharged into the exhaust gas staying space after the predetermined first time-point t1, and flows into the upstream-side catalytic converter 43 after passing through the upstream air-fuel ratio sensor 55. This causes, as shown in FIG. 14, the upstream-side air-fuel ratio abyfs obtained based on the output value Vabyfs of the upstream air-fuel ratio sensor 55 to vary depending on the air-fuel ratio of the exhaust gas discharged from each of the cylinders, until a predetermined time T elapses after the fuel cut start condition satisfied time-point tfc (in actuality, the predetermined first time-point t1).

When and after a time-point tp (predetermined second time-point tp) which arrives when the predetermined time T elapses after the fuel cut start condition satisfied time-point tfc (in actuality, the predetermined first time-point t1), the exhaust gas staying space is substantially filled with the exhaust gas discharged from the combustion chamber 21 of the third cylinder. In addition, no new gas from "any one of the combustion chambers 21 of the cylinders" is flowed into the exhaust gas staying space, after a time-point at which a discharge of the final gas is completed. Consequently, the upstream-side air-fuel ratio abyfs (detected air-fuel ratio) obtained based on the output value Vabyfs of the upstream air-fuel ratio sensor 55 at the predetermined second time-point tp reaches (converges on) a constant value af3 corresponding (according) to the air-fuel ratio of the exhaust gas discharged form the third cylinder. Therefore, the determining apparatus obtains the value af3 as the air-fuel ratio relating data representing (indicative of) the air-fuel ratio of the mixture supplied to the combustion chamber 21 of the third cylinder.

Meanwhile, the fuel cut start condition satisfied time-point tfc comes irrespective of the crank angle. Therefore, even if the fuel injection timing of any cylinder which comes immediately after the fuel cut start condition satisfied time-point tfc is used as the predetermined first time-point t1 (i.e., a time-point at which the fuel injection is firstly stopped), the air-fuel ratio relating data obtained according to the method described above can be obtained for each of the cylinders at the approximately same frequency to each other, after the fuel cut operation is carried out a sufficient number of times. Further, the determining apparatus may change the predetermined first time-point t1 in order to obtain the air-fuel ratio relating data for each of the cylinders at a closer frequency to each other.

Thereafter, the determining apparatus obtains each of the individual cylinder air-fuel ratios, each represented by the air-fuel ratio relating data, after the fuel cut operation is carried out a sufficient number of times (in other words, after a time-point at which the air-fuel ratio relating data for each of all of the cylinders has been obtained (at least one or more of the air-fuel ratio relating data for each of the cylinders has been obtained). The individual cylinder air-fuel ratio for a certain cylinder may be, for example, an average of a plurality of the air-fuel ratio relating data obtained for the certain cylinder. Subsequently, the determining apparatus compares these individual cylinder air-fuel ratios with each other, and determines that the air-fuel ratio imbalance among cylinders is occurring when one of the individual cylinder air-fuel ratios deviates (differs) from the rest of the individual cylinder air-fuel ratios. These are the outline of air-fuel ratio imbalance among cylinders determining method commonly adopted by the determining apparatuses according to the embodiments.

It should be noted that there may be a case in a certain engine 10 in which the exhaust gas staying space is filled, at the time-point tp (predetermined second time-point tp) at which the predetermined time T elapses after the predetermined first time-point t1, with the "final gas" and the "exhaust gas discharged from the cylinder which discharged the exhaust gas immediately before the final gas discharged time-point". However, in such a case, a proportion of the final gas in the exhaust gas staying space is higher than a proportion of the gas discharged from the cylinder other than the final gas discharging cylinder in the exhaust gas staying space. Accordingly, the upstream-side air-fuel ratio abyfs (detected air-fuel ratio) at the predetermined second time-point tp is most affected by the air-fuel ratio of the final gas discharging cylinder, and therefore, it is possible to determine whether or not the air-fuel ratio imbalance among cylinders is occurring based on the air-fuel ratio relating data obtained according to the method described above.

Further description on this point will next be made. It is assumed here that only the air-fuel ratio of the mixture supplied to the third cylinder greatly deviates toward a richer side, and for example, the air-fuel ratio of the third cylinder is equal to 11. At this point of time, each of the air-fuel ratios of the other cylinders is equal to, for example, 14.5 (the stoichiometric air-fuel ratio). Further, it is assumed that 70% of the gas existing in the exhaust gas staying space at the predetermined second time-point tp is the "final gas", and 30% of the gas existing in the exhaust gas staying space at the predetermined second time-point tp is the exhaust gas discharged from the cylinder whose ignition timing is one time prior to the ignition timing of the cylinder which discharged the final gas in the ignition order.

Under this assumption, when the cylinder which discharged the final gas is the first cylinder, 70% of the gas existing in the exhaust gas staying space at the predetermined second time-point tp is the gas discharged from the first cylinder, and 30% of the gas existing in the exhaust gas staying space at the predetermined second time-point tp is the gas discharged from the second cylinder whose ignition timing is immediately before the first cylinder's ignition timing. In this case, since each of the air-fuel ratio of the first cylinder and the air-fuel ratio of the second cylinder is equal to the stoichiometric air-fuel ratio, the detected air-fuel ratio becomes equal to approximately 14.5. That is, if the detected air-fuel ratio is obtained according to a simple weighted average method, the detected air-fuel ratio is 14.5 (=14.5·0.7+ 14.5·0.3).

On one hand, when the cylinder which discharged the final gas is the third cylinder, 70% of the gas existing in the exhaust gas staying space at the predetermined second time-point tp is the gas discharged from the third cylinder, and 30% of the gas existing in the exhaust gas staying space at the predetermined second time-point tp is the gas discharged from the first cylinder whose ignition timing is immediately before the third cylinder's ignition timing. In this case, if the detected air-fuel ratio is obtained according to the simple weighted average method, the detected air-fuel ratio is 12.05 (=11.0·0.7+14.5·0.3).

On the other hand, when the cylinder which discharged the final gas is the fourth cylinder, 70% of the gas existing in the exhaust gas staying space at the predetermined second time-point tp is the gas discharged from the fourth cylinder, and 30% of the gas existing in the exhaust gas staying space at the predetermined second time-point tp is the gas discharged from the third cylinder whose ignition timing is immediately before the fourth cylinder's ignition timing. In this case, if the detected air-fuel ratio is obtained according to the simple weighted average method, the detected air-fuel ratio is 13.45 (=14.5·0.7+11.0·0.3).

In addition, when the cylinder which discharged the final gas is the second cylinder, 70% of the gas existing in the exhaust gas staying space at the predetermined second time-point tp is the gas discharged from the second cylinder, and 30% of the gas existing in the exhaust gas staying space at the predetermined second time-point tp is the gas discharged from the fourth cylinder whose ignition timing is immediately before the second cylinder's ignition timing. In this case, if the detected air-fuel ratio is obtained according to the simple weighted average method, the detected air-fuel ratio is 14.5 (=14.5·0.7+14.5·0.3).

In this way, the detected air-fuel ratio is 14.5 when the cylinder which discharged the final gas is the first cylinder, 12.05 when the cylinder which discharged the final gas is the second cylinder, 13.45 when the cylinder which discharged the final gas is the fourth cylinder, and 14.5 when the cylinder which discharged the final gas is the second cylinder. Accordingly, the detected air-fuel ratio obtained when the cylinder which discharged the final gas is the third cylinder is considerably smaller than the detected air-fuel ratio obtained when the cylinder which discharged the final gas is the cylinder other than the third cylinder, and the "detected air-fuel ratio obtained when the cylinder which discharged the final gas is the fourth cylinder, and the gas existing in the exhaust gas staying space includes the gas discharged from the third cylinder" is considerably smaller than the "detected air-fuel ratio obtained when the gas existing in the exhaust gas staying space does not include the gas discharged from the third cylinder".

In view of the above, the "detected air-fuel ratio obtained at predetermined second time-point tp" is the air-fuel ratio relating data, representing the air-fuel ratio of the mixture supplied to the combustion chamber of the "cylinder (final gas discharging cylinder) which is uniquely specified based on the cylinder whose state becomes in the valve resting state lastly (i.e., final gas discharging cylinder)", or representing the air-fuel ratio of the mixture supplied to the combustion chambers of a plurality of the "cylinders including the final gas discharging cylinder" that are uniquely specified base on the final gas discharging cylinder".

Further, this can apply to a case in which the gas existing in the exhaust gas staying space at the predetermined second time-point tp includes the final gas and the gases discharged from the cylinder whose ignition timing is one time prior to the final gas discharging cylinder's ignition timing and from the cylinder whose ignition timing is two times prior to the final gas discharging cylinder's ignition timing. This is because the gas existing in the exhaust gas staying space at the predetermined second time-point tp contains the final gas most.

Details of Operation of the Air-Fuel Ratio Imbalance Among Cylinders Determining Apparatus According to a First Embodiment The actual operation of the air-fuel ratio imbalance among cylinders determining apparatus (hereinafter, referred to as a "first determining apparatus") according to the first embodiment will next be described.

<Fuel Injection Amount Control>

The CPU of the electric controller 60 (hereinafter, expressed simply as a "CPU") executes a "routine (data-to-be-obtained cylinder determining routine) for determining a cylinder whose air-fuel ratio relating data should be obtained" shown by a flowchart in FIG. 15, every time a predetermined time elapses. Accordingly, at an appropriate time-point, the CPU starts a process from step 1500 shown in FIG. 15 to proceed to step 1510 at which the CPU determines whether or not a value of a fuel cut request flag XFCreq is "0". Hereinafter, the fuel cut request flag XFCreq is expressed as the "F/C request flag XFCreq".

The F/C request flag XFCreq indicates that a request for performing the fuel cut operation (operation in which the fuel injections from the fuel injectors 29 are stopped so as to stop supplying the fuel to the engine 10) is being generated when the value of the F/C request flag XFCreq is "1". The F/C request flag XFCreq indicates that the request for performing the fuel cut operation is not being generated when the value of the F/C request flag XFCreq is "0". It should be noted that the value of the F/C request flag XFCreq is set to (at) "0" by an initialization routine executed when an unillustrated ignition key switch is changed from an off-position to an on-position of a vehicle on which the engine 10 is mounted.

It is assumed that the present time is immediately after the engine is started, and therefore, the value of the F/C request flag XFCreq is "0". In this case, the CPU makes a "Yes" determination at step 1510 to proceed to step 1520 at which the CPU determines whether or not the fuel cut start condition is satisfied. One of the examples of the fuel cut start condition is satisfied when "the throttle valve opening angle TA is equal to "0" (or the operation amount Accp of the accelerator pedal is equal to "0"), and the engine rotational speed NE is equal to or higher than a fuel cut start rotational speed NEFCth". The fuel cut operation performed when the example of the fuel cut start condition is satisfied is referred to as a "deceleration fuel cut operation". It should be noted that, in consideration of step 1510 and step 1520, it can be said that the deceleration fuel cut operation start condition is satisfied when the value of the F/C request flag XFCreq is "0", the throttle valve opening angle TA is equal to "0", and the engine rotational speed NE is equal to or higher than the fuel cut start rotational speed NEFCth.

At this point of time, if the fuel cut start condition is not satisfied, the CPU makes a "No" determination at step 1520 to directly proceed to step 1595 to end the present routine tentatively.

Further, the CPU repeatedly executes a "routine shown by a flowchart in FIG. 16" every time the crank angle of any one of the cylinders reaches a predetermined crank angle θa (e.g., θa=90° crank angle, that is, BTDC 90° crank angle) before its intake top dead center, for the cylinder (hereinafter, referred to as a "fuel injection cylinder") whose crank angle has reached the predetermined crank angle. This routine is referred to as a "fuel injection and valve operation control routine".

Accordingly, when the crank angle of any one of the cylinders reaches the predetermined crank angle θa, the CPU starts a process from step 1600 to proceed to step 1610 at which the CPU determines whether or not the value of the F/C request flag XFCreq is "0".

According to the assumption described above, the value of the F/C request flag XFCreq is "0". The CPU therefore makes a "Yes" determination at step 1610 to proceed to step 1620 at which the CPU sends an injection instruction signal to the "fuel injector 29 disposed at the aggregated portion of the intake ports 22 of the fuel injection cylinder" so that a fuel of the instructed fuel injection amount Fi is injected from the fuel injector 29.

It should be noted that the CPU calculates the instructed fuel injection amount Fi at step 1620 as follows.

(1) The CPU obtains a "cylinder intake air amount Mc" which is an "air amount introduced into the fuel injection cylinder", based on "the intake air amount Ga measured by the air flowmeter 51, the engine rotational speed NE, and a look-up table MapMc". The cylinder intake air amount Mc may be calculated based on a well-known air model (a model constructed according to laws of physics describing and simulating a behavior of an air in the intake passage).

(2) The CPU obtains a base fuel injection amount Fbase through dividing the cylinder intake air amount Mc by a target upstream-side air-fuel ratio abyfr. The target upstream-side air-fuel ratio abyfr of the present example is set to (at) the stoichiometric air-fuel ratio.

(3) The CPU corrects the base fuel injection amount Fbase by (with) the main feedback amount DFi. More specifically, the CPU adds the main feedback amount DFi to the base fuel injection amount Fbase to calculate a final fuel injection amount Fi. The main feedback amount DFi is separately calculated in an unillustrated feedback routine according to a PID control or the like, in such a manner that at least the "upstream-side air-fuel ratio abyfs obtained based on the output value Vabyfs of the upstream air-fuel ratio sensor 55" coincides with the "target upstream-side air-fuel ratio abyfr". Briefly speaking, the main feedback amount DFi is increased when the upstream-side air-fuel ratio abyfs is larger than the target upstream-side air-fuel ratio abyfr, and the main feedback amount DFi is decreased when the upstream-side air-fuel ratio abyfs is smaller than the target upstream-side air-fuel ratio abyfr.

In this manner, the fuel injection is carried out for the fuel injection cylinder in such a manner that the air-fuel ratio of the mixture supplied to the fuel injection cylinder coincides with the stoichiometric air-fuel ratio.

Subsequently, the CPU proceeds to step 1630 to send instruction signals to "the intake valve actuator 27 and the exhaust valve actuator 28" of the fuel injection cylinder in order to set the states of "the intake valves 23 and the exhaust valves 25" of the fuel injection cylinder to (at) the "valve operating states". That is, the CPU sets the state of the cylinder to which the fuel is injected to (at) the "valve operating state". Thereafter, the CPU proceeds to step 1695 to end the present routine tentatively. With the processes described above, a normal fuel injection (fuel supply) is performed for the fuel injection cylinder at a "predetermined fuel injection timing before an intake stroke of the fuel injection cylinder", and the fuel injection cylinder carries out operations of the intake, the compression, the expansion, and the exhaust strokes.

Figure 17:
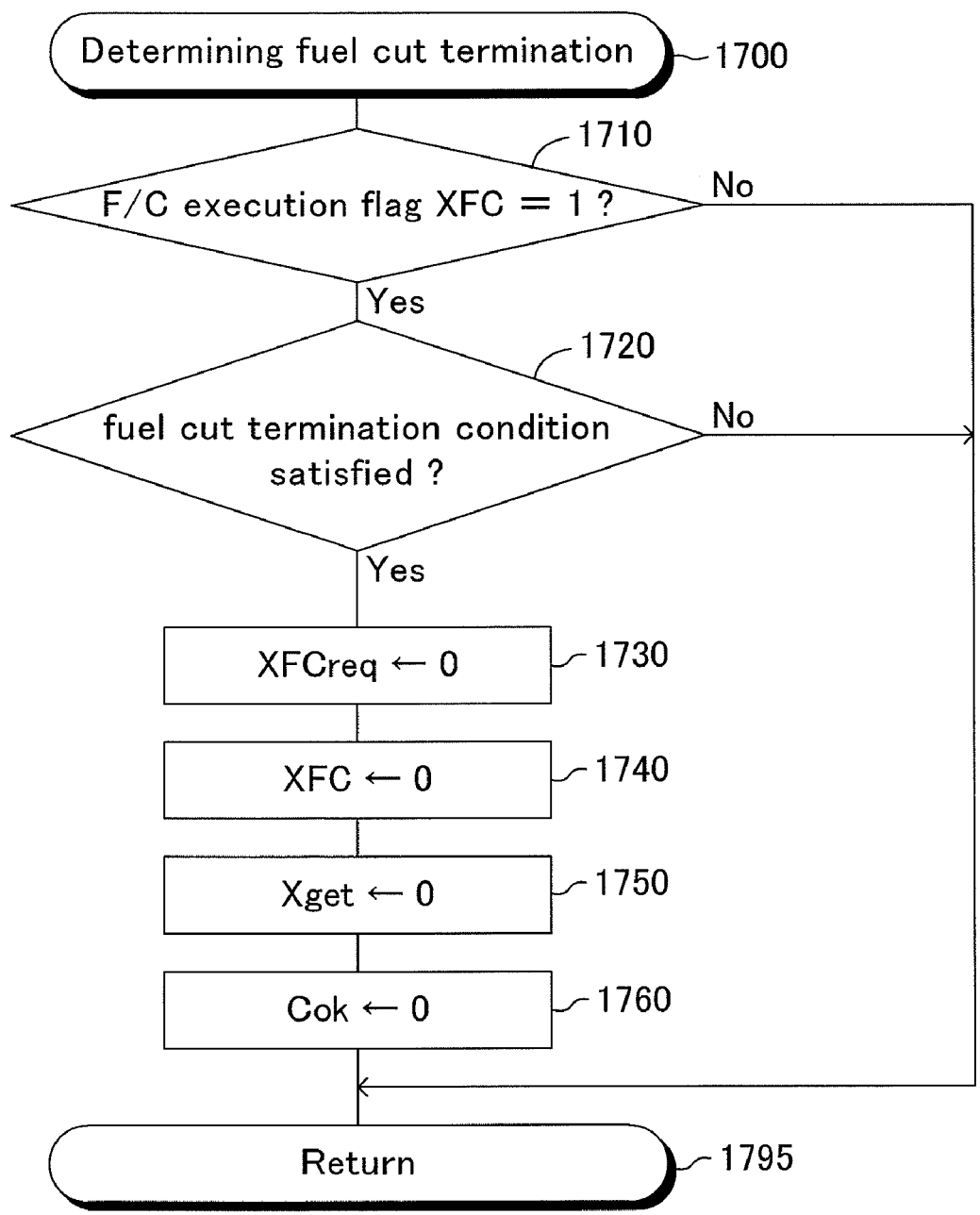
FIG. 17 is a flowchart showing a routine executed by the CPU of the air-fuel ratio imbalance among cylinders determining apparatus according to the first embodiment of the present invention.

Further, the CPU executes a "fuel cut termination determining routine" shown by a flowchart in FIG. 17 every time a predetermined time elapses. Accordingly, at an appropriate predetermined time-point, the CPU starts the process from step 1700 in FIG. 17 to proceed to step 1710 at which the CPU determines whether or not a value of a F/C execution flag XFC is "1".

The F/C execution flag XFC indicates that the fuel cut operation is being performed (a current engine operating state is in a state in which the fuel injections for all of the cylinders are stopped) when the value of the F/C execution flag XFC is "1". The F/C execution flag XFC indicates that the fuel cut operation is not being performed when the value of the F/C execution flag XFC is "0". It should be noted that the value of the F/C execution flag XFC is set to (at) "0" by the initialization routine described above.

As described later, the value of the F/C execution flag XFC is set to (at) "1" while the value of the F/C request flag XFCreq is "1". According to the assumption described above, the value of the F/C request flag XFCreq is "0" at the present time, and therefore, the value of the F/C execution flag XFC is also "0". The CPU therefore makes a "No" determination at step 1710 to directly proceed to step 1795 to end the present routine tentatively.

Figure 18:
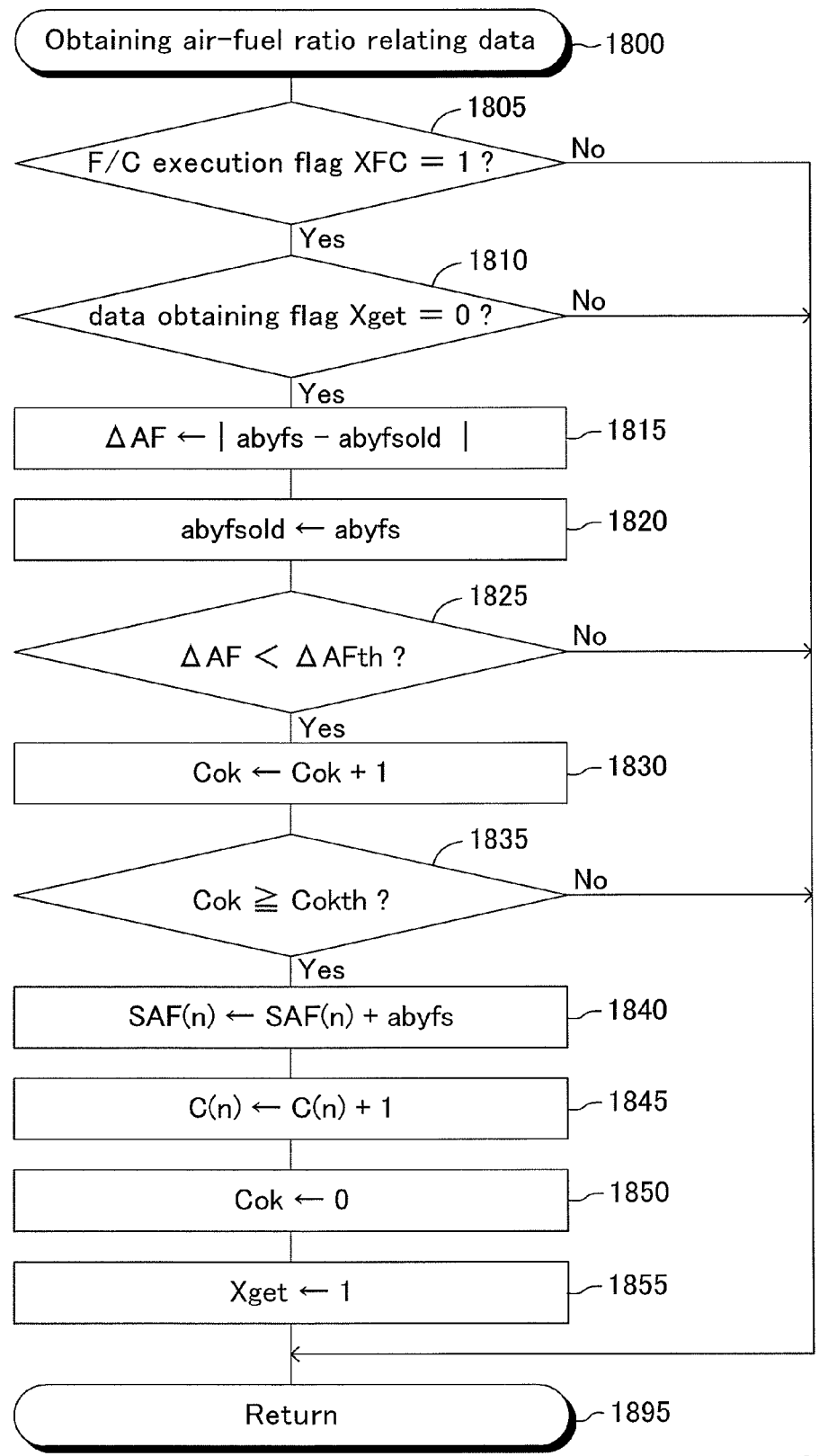
FIG. 18 is a flowchart showing a routine executed by the CPU of the air-fuel ratio imbalance among cylinders determining apparatus according to the first embodiment of the present invention.

Further, the CPU executes an "air-fuel ratio relating data obtaining routine" shown by a flowchart in FIG. 18 every time a predetermined time elapses. Accordingly, at an appropriate predetermined time-point, the CPU starts a process from step 1800 in FIG. 18 to proceed to step 1805 at which the CPU determines whether or not the value of the F/C execution flag XFC is "1". As described above, the value of the F/C execution flag XFC is "0". Accordingly, the CPU makes a "No" determination at step 1805 to directly proceed to step 1895 so as to end the present routine tentatively.

Figure 19:
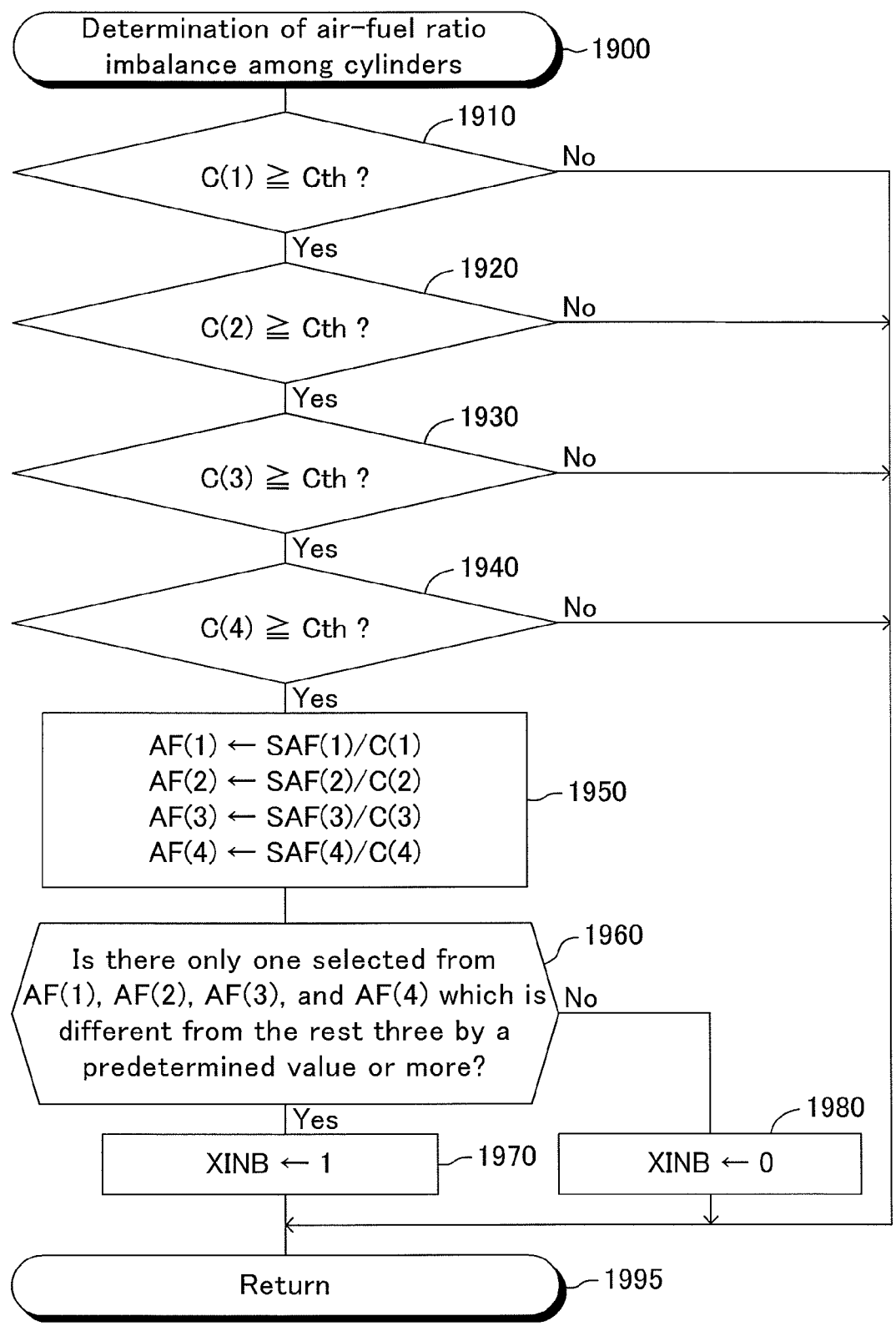
FIG. 19 is a flowchart showing a routine executed by the CPU of the air-fuel ratio imbalance among cylinders determining apparatus according to the first embodiment of the present invention.

Furthermore, the CPU executes an "air-fuel ratio imbalance among cylinders determining routine" shown by a flowchart in FIG. 19 every time a predetermined time elapses. Accordingly, at an appropriate predetermined time-point, the CPU starts a process from step 1900 in FIG. 19 to proceed to step 1910 at which the CPU determines whether or not a value of a first cylinder data number counter C(1) is equal to or larger than a predetermined data number threshold Cth (Cth>1). In other words, the CPU determines whether or not the number of samples of the air-fuel ratio relating data on the first cylinder has reached a sufficient number. It should be noted that the data number threshold Cth may be "1".

As described later, the first cylinder data number counter C(1) is incremented by "1" every time the air-fuel ratio relating data on (for) the first cylinder is newly obtained. In addition, the first cylinder data number counter C(1) is set to (at) "0" by the initialization routine described above. Thus, according to the assumption described above, the value of the first cylinder data number counter C(1) is "0" and is smaller than the data number threshold Cth. The CPU therefore makes a "No" determination at step 1910 to directly proceed to step 1995 to end the present routine tentatively. It should be noted that each of cylinder data number counters for the other cylinders, i.e., the L-th cylinder data number counter C(L) (L; integer from 2 to 4) is incremented by "1" every time the air-fuel ratio relating data on (for) the L-th cylinder is newly obtained. In addition, the L-th cylinder data number counter C(L) is set to (at) "0" by the initialization routine described above.

When the operation described above is repeatedly performed, the fuel injection, the intake of the mixture, the compression of the mixture, the combustion, and the exhaust are carried out, and thus, the engine 10 continues to perform the normal operation.

Next, operations when the fuel cut start condition becomes satisfied during the normal operation will be described. In this case, when the CPU proceed to step 1520 shown in FIG. 15 through step 1500 and step 1510, it makes a "Yes" determination at step 1520. Thereafter, the CPU sets the F/C request flag XFCreq to (at) "1" at step 1530.

Subsequently, the CPU proceeds to step 1540 at which the CPU determines n-th cylinder (data-to-be-obtained cylinder) whose air-fuel ratio relating data is to be (should be) obtained. "n" is an integer from 1 to 4. The first determining apparatus selects, as the n-th cylinder (data-to-be-obtained cylinder), a "cylinder whose fuel injection start timing comes latest after a time-point at which the fuel cut start condition becomes satisfied (fuel cut start condition satisfied time-point tfc). In other words, at fuel cut start condition satisfied time-point tfc, the CPU selects, as the data-to-be-obtained cylinder, a "cylinder whose fuel injection start timing occurred prior to the fuel cut start condition satisfied time-point tfc is the closest to the fuel cut start condition satisfied time-point tfc".

Figure 20:
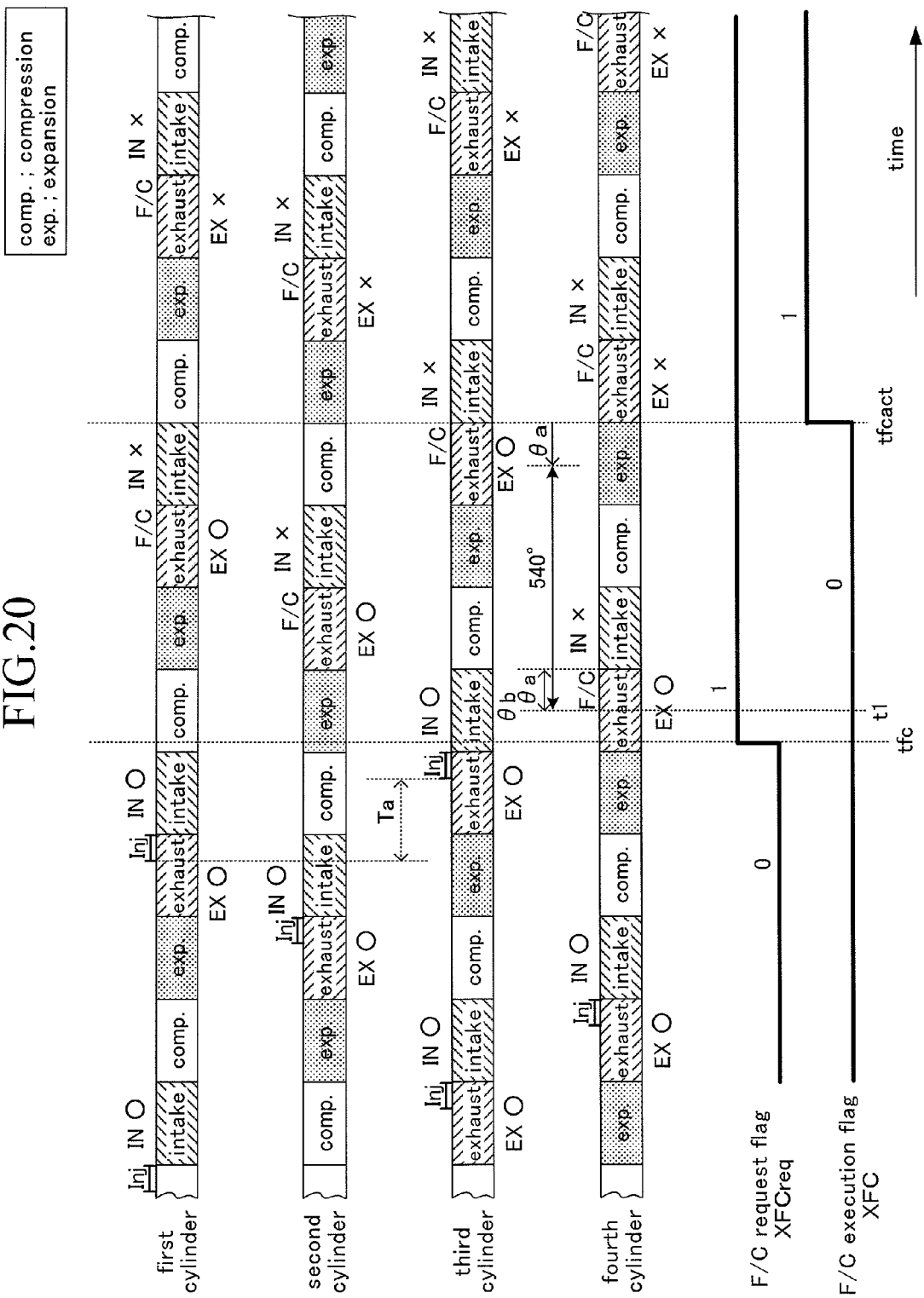
FIG. 20 is a timing chart for describing an example of an operation of the air-fuel ratio imbalance among cylinders determining apparatus according to the first embodiment of the present invention.

For example, as shown by a timing-chart of FIG. 20, when the fuel cut start condition becomes satisfied at the time-point tfc which is in the vicinity of the intake top dead center of the third cylinder, a "cylinder whose fuel injection has not been started, and whose fuel injection start timing comes latest" at (with respect to) the fuel cut start condition satisfied time-point tfc is the third cylinder. Accordingly, in the example shown in FIG. 20, the third cylinder (the n-th cylinder; n=3) is determined to be the data-to-be-obtained cylinder. In contrast, if the fuel cut start condition satisfied time-point tfc occurs, for example, within a period Ta (period from the fuel injection start timing of the first cylinder to the fuel injection start timing of the third cylinder), the data-to-be-obtained cylinder is the first cylinder. Thereafter, the CPU proceeds to step 1595 to end the present routine tentatively.

It should be noted that, "IN ○" in FIG. 20 indicates that the state of the intake valves 23 is in the "valve operating state", and "EX ○" in FIG. 20 indicates that the state of the exhaust valves 25 is in the "valve operating state". "IN X" indicates that the state of the intake valves 23 is in the "valve resting state", and "EX X" indicates that the state of the exhaust valves 25 is in the "valve resting state". "Inj" indicates a fuel injection period (duration). "F/C" indicates that the fuel injection is stopped. The meanings of those sings (symbols) are maintained in similar timing charts described later.

When a predetermined time elapses in this state (state when the fuel cut start condition becomes satisfied after the fuel cut start condition has been unsatisfied), the CPU starts the process of the routine shown in FIG. 16 from step 1600 again. In this case, the value of the F/C request flag XFCreq is "1". Therefore, when the CPU proceeds to step 1610, the CPU makes a "No" determination at step at step 1610 to proceed to step 1640 at which the CPU determines whether or not the value of the F/C execution flag XFC is "0".

At this point of time, the value of the F/C execution flag XFC is still "0". Therefore, the CPU makes a "Yes" determination at step 1640 to proceed to step 1650 to determine whether or not the absolute crank angle θ (that is, the crank angle θa before the intake top dead center of the fuel injection cylinder) is within a region (area) between the "crank angle θa before the intake top dead center of the n-th cylinder which is the data-to-be-obtained cylinder" and a "crank angle θb which goes back 540° from (i.e., 540° prior to) the crank angle θa before the intake top dead center of the n-th cylinder". It should be noted that the region may includes the "crank angle θa before the intake top dead center of the n-th cylinder" and the "crank angle θb before the intake top dead center of the n-th cylinder". In other words, it is determined whether or not a present (current) absolute crank angle θ satisfies a formula (1) described below at step 1650, when the absolute crank angle is defined as a "crank angle which has a positive value when the crank angle is before the intake top dead center of the n-th cylinder with reference to the intake top dead center of the n-th cylinder.

$$\theta a \leq \theta \leq \theta b = \theta a + 540° \tag{1}$$

As described above, the first determining apparatus selects, as the n-th cylinder (data-to-be-obtained cylinder), the "cylinder whose fuel injection start timing comes latest", at (with respect to) the time-point at which the fuel cut start condition becomes satisfied tfc (that is, when the value of the fuel cut request flag XFCreq is changed from "0" to "1"). That is, at the fuel cut start condition satisfied time-point tfc, the CPU selects, as the data-to-be-obtained cylinder, the "cylinder whose fuel injection start timing occurred prior to the fuel cut start condition satisfied time-point tfc is the closest to the fuel cut start condition satisfied time-point tfc". Accordingly, when the CPU starts the process of the routine shown in FIG. 16, and if the value of the fuel cut request flag XFCreq is "1" and the value of the F/C execution flag XFC is "0", the determining condition at step 1650 is always satisfied. In this regard, the step 1650 in the first determining apparatus is provided to stop the fuel injection with more certainty.

In other words, the CPU determines whether or not the present point of time is a fuel injection timing 0 to 3 times prior to the fuel injection timing of the n-th cylinder" by the process of step 1650. The present (current) crank angle is equal to a crank angle three times of fuel injections (540° crank angle) prior to the fuel injection timing of the n-th cylinder. Accordingly, the CPU makes a "Yes" determination at step 1650 to proceed to step 1660.

At step 1660, the CPU stops the fuel injection, although the present time is a time-point to instruct the fuel injector 29 of the fuel injection cylinder to perform the fuel injection in a normal situation. That is, the CPU does not send the injection instruction signal to the fuel injector 29 of the fuel injection cylinder. As a result, the fuel injection cylinder becomes in the fuel cut operating state.

Subsequently, the CPU proceeds to step 1670 to send the instruction signals to "the intake valve actuator 27 and the exhaust valve actuator 28" of the fuel injection cylinder so as to set the states of "the intake valves 23 and the exhaust valves 25" of the fuel injection cylinder to (at) the "valve resting states". That is, the CPU sets the cylinder whose fuel injection has been stopped to (at) the "valve resting state". It should be noted that, if the exhaust valves 25 of the fuel injection cylinder is still open at that time-point, the CPU closes the exhaust valves 25 at the normal time-point, and thereafter, the CPU sets the states of the exhaust valves 25 to (at) the valve resting states by a time-point at which a next exhaust stroke of the fuel injection cylinder comes.

Subsequently, the CPU proceeds to step 1680 to determine whether or not the present (current) absolute crank angle θ is (coincides with) the crank angle θa before the intake top dead center of the data-to-be-obtained cylinder (n-th cylinder). The present (current) absolute crank angle θ is not equal to the crank angle θa before the intake top dead center of the data-to-be-obtained cylinder (n-th cylinder). Accordingly, the CPU makes a "No" determination at step 1680 to directly proceed to step 1695 so as to end the present routine tentatively. With the processes described above, the fuel injection of the cylinder (i.e., the fuel injection cylinder at the present point of time) whose ignition timing is 3 times of ignition in the ignition order prior to the n-th cylinder's ignition timing is stopped, and the cylinder is changed to be in the "valve resting state".

For example, referring to FIG. 20, when "the crank angle of the fourth cylinder reaches the crank angle θa before the intake top dead center of the fourth cylinder (that is, the injection timing of the fourth cylinder arrives)" immediately after the fuel cut start condition satisfied time-point tfc (at a time-point at which the value of the F/C request flag XFCreq is changed from "0" to "1"), the absolute angle θ at that time-point is equal to (θa+540°) prior to the intake top dead center of the third cylinder which is selected as the data-to-be-obtained cylinder. Accordingly, the processes of step 1660 and step 1670 are executed. Consequently, the fuel injection of the fourth cylinder is stopped, and the states of the intake valves 23 and the states of the exhaust valves 25 are set to (maintained in) the "valve resting states" after that time-point.

In this state, the value of the F/C execution flag XFC is still "0". Accordingly, when the CPU proceeds to step 1710 in the routine shown in FIG. 17, the CPU makes a "No" determination at step 1710 to directly proceed to step 1795 to end the present routine tentatively. Further, when the CPU proceeds to step 1805 in the routine shown in FIG. 18, the CPU makes a "No" determination at step 1805 to directly proceed to step 1895 to end the present routine tentatively. These operations are continued until the value of the F/C execution flag XFC is set to (at) "1".

Further in this state, the value of the first cylinder data number counter C(1) is "0", and is smaller than the data number threshold Cth. Accordingly, the when the CPU proceeds to step 1910 in the routine shown in FIG. 19, the CPU makes a "No" determination at step 1910 to directly proceed to step 1995 to end the present routine tentatively. This operation is continued until the value of the first cylinder data number counter C(1) is incremented to become larger than the data number threshold Cth.

Further, in this state, the value of the F/C request flag XFCreq has been changed to "1". Accordingly, when the CPU proceeds to step 1510 in the routine shown in FIG. 15, the CPU makes a "No" determination at step 1510 to directly proceed to step 1595 to end the present routine tentatively. This operation is continued until the value of the F/C request flag XFCreq is again changed to "0".

Figure 16:
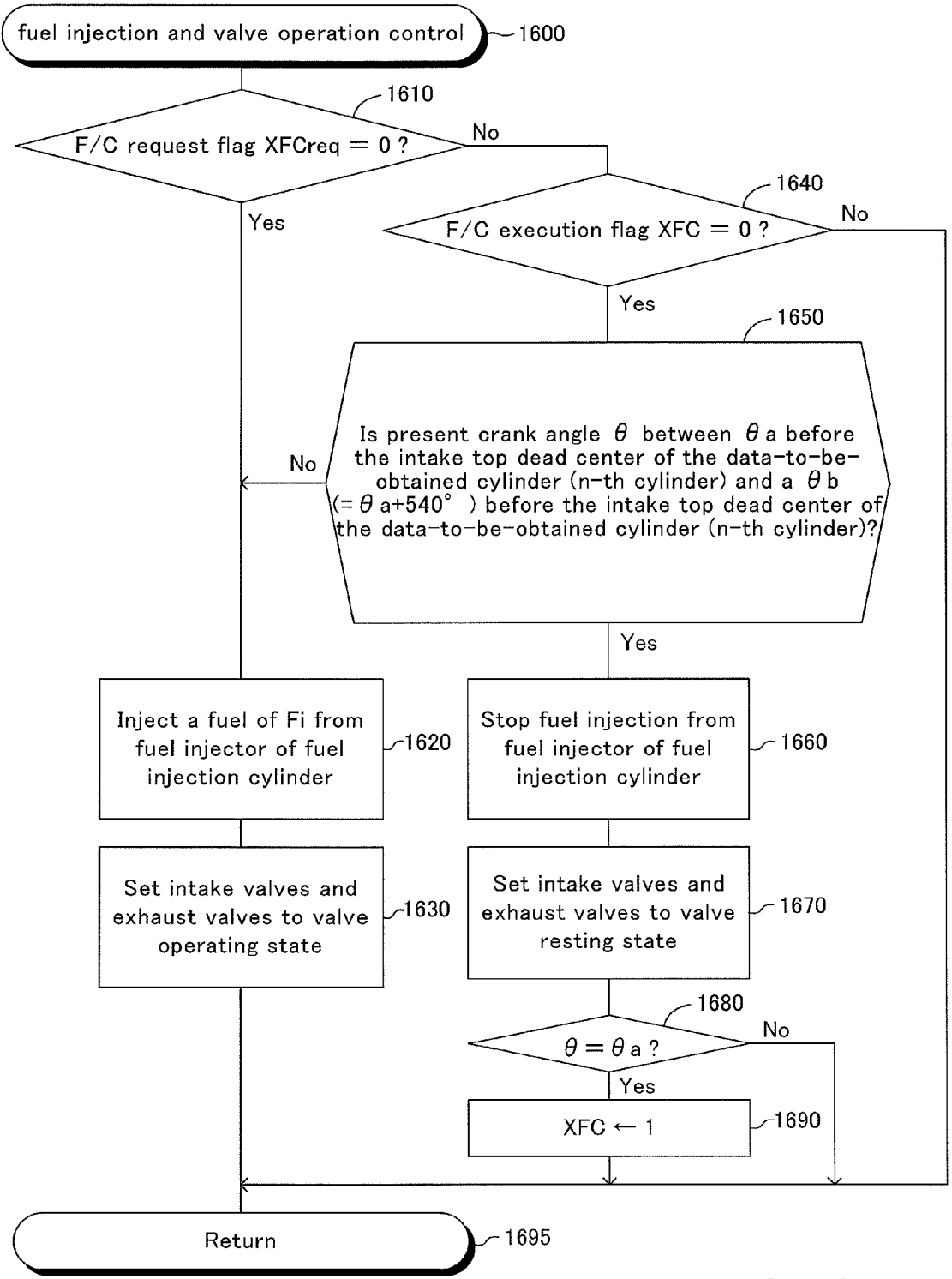
FIG. 16 is a flowchart showing a routine executed by the CPU of the air-fuel ratio imbalance among cylinders determining apparatus (first determining apparatus) according to the first embodiment of the present invention.

Further, when the crank angle rotates by 180° under this state, the CPU again starts to execute the process of the routine shown in FIG. 16 from step 1600. The CPU makes a "No" determination at step 1610, and then makes a "Yes" determination at step 1640 to proceed to step 1650.

The present (current) crank angle is 360° prior to (before) the fuel injection timing of the n-th cylinder. Accordingly, the CPU makes a "Yes" determination at step 1650 to execute the processes of step 1660 and step 1670. As a result, the fuel injection cylinder at the present time-point becomes in the fuel cut operating state. That is, the fuel injection of the cylinder whose ignition timing is 2 times of ignition in the ignition order prior to the n-th cylinder's ignition timing (the ignition timing of the data-to-be-obtained cylinder) is stopped, and the cylinder (the states of the intake valves 23 and the states of the exhaust valves 25) is changed to be in the "valve resting state". Thereafter, the CPU makes a "No" determination at step 1680 to directly proceed to step 1695 to end the present routine tentatively.

Further, when the crank angle rotates by 180° under this state, the CPU again starts to execute the process of the routine shown in FIG. 16 from step 1600. In this case, the CPU makes a "No" determination at step 1610, and then makes a "Yes" determination at step 1640 to proceed to step 1650.

The present (current) crank angle is 180° prior to (before) the fuel injection timing of the n-th cylinder. Accordingly, the CPU makes a "Yes" determination at step 1650 to execute the processes of step 1660 and step 1670. As a result, the fuel injection cylinder at the present time-point becomes in the fuel cut operating state. That is, the fuel injection of the cylinder whose ignition timing is 1 time of ignition in the ignition order prior to the n-th cylinder's ignition timing (the ignition timing of the data-to-be-obtained cylinder) is stopped, and the cylinder (the states of the intake valves 23 and the states of the exhaust valves 25) is changed to be in the "valve resting state". Thereafter, the CPU makes a "No"

determination at step 1680 to directly proceed to step 1695 to end the present routine tentatively.

Further, when the crank angle rotates by 180° under this state, the CPU again starts to execute the process of the routine shown in FIG. 16 from step 1600. In this case, the CPU makes a "No" determination at step 1610, and then makes a "Yes" determination at step 1640 to proceed to step 1650.

The present (current) crank angle coincides with the injection timing of the n-th cylinder. That is, the absolute crank angle θ described above coincides with the "crank angle θa before the intake top dead center of the n-th cylinder which is the data-to-be-obtained cylinder". Therefore, the CPU makes a "Yes" determination at step 1650 to execute the processes of step 1660 and step 1670. As a result, the fuel injection cylinder at the present time-point (that is, the n-th cylinder) becomes in the fuel cut operating state. In other words, the fuel injection of the n-th cylinder is stopped, and the n-th cylinder (the states of the intake valves 23 of the n-th cylinder and the states of the exhaust valves 25 of the n-th cylinder) is changed to be in the "valve resting state".

Subsequently, the CPU proceeds to step 1680. In this case, the absolute angle θ coincides with the "crank angle θa before the intake top dead center of the n-th cylinder which is the data-to-be-obtained cylinder". Accordingly, the CPU makes a "Yes" determination at step 1680 to proceed to step 1690 at which the CPU sets the value of the F/C execution flag XFC to (at) "1", and thereafter, proceeds to step 1695 to end the present routine tentatively. By the operations described above, the states of all of the cylinders becomes the fuel cut operating states and the valve resting states.

In this state, when the CPU stars the process of the routine shown in FIG. 17 to proceed to step 1710, the CPU makes a "Yes" determination at step 1710, and determines whether or not a fuel cut termination condition is satisfied at step 1720. One of examples of the fuel cut termination condition (i.e., deceleration fuel cut operation termination condition) corresponding to the deceleration fuel cut operation start condition in step 1520 shown in FIG. 15 described above is satisfied when "the value of the F/C execution flag XFC is "1" and the throttle valve opening angle TA (or the operation amount Accp of the accelerator pedal) becomes larger than "0", or, the value of the F/C execution flag XFC is "1" and the engine rotational speed NE is equal to or lower than a fuel cut termination rotational speed NERTth which is lower than the fuel cut start rotational speed NEFCth".

The description will be continued under an assumption that the fuel cut termination condition is not satisfied at the present point of time. Under this assumption, the CPU makes a "No" determination at step 1720 to directly proceed to step 1795 to end the present routine tentatively. Accordingly, since a process of step 1740 described later is not executed, the value of the F/C execution flag XFC is maintained at "1".

In this state, when the CPU proceeds to step 1805 shown in FIG. 18 at the predetermined time-point, the CPU makes a "Yes" determination at step 1805, and determines whether or not a value of a data obtaining flag Xget is "0" at step 1810.

The data obtaining flag Xget indicates that the air-fuel ratio relating data has already been obtained in the current fuel cut operation when the value of the data obtaining flag Xget is equal to "1" (refer to step 1855 described later). The data obtaining flag Xget indicates that the air-fuel ratio relating data have not been obtained yet when the value of the data obtaining flag Xget is equal to "0" during the present (current) fuel cut operation. It should be noted that the value of the data obtaining flag Xget is set to (at) "0" by the initialization routine and step 1750 shown in FIG. 17 described later.

At the present time, the air-fuel ratio relating data have not been obtained yet during the present (current) fuel cut operation. Accordingly, the value of the data obtaining flag Xget is "0", and thus, the CPU makes a "Yes" determination at step 1810. Thereafter, the CPU proceeds to step 1815 to calculate, according to a formula (2) described below, an "absolute value ΔAF (hereinafter, referred to as an "air-fuel ratio change amount ΔAF") of a temporal change amount of the "upstream-side air-fuel ratio abyfs (that is, detected air-fuel ratio) obtained based on the output value Vabyfs of the upstream air-fuel ratio sensor 55 and the air-fuel ratio conversion table Mapabyfs". In the formula (2), abyfsold is the upstream-side air-fuel ratio abyfs at a time-point at which the present routine was executed previously (refer to step 1820). The abyfsold is referred to as a "previous upstream-side air-fuel ratio abyfsold".

$$\Delta AF = |abyfs - abyfsold| \qquad (2)$$

Subsequently, the CPU proceeds to step 1820 to store the present (current) upstream-side air-fuel ratio abyfs as the previous upstream-side air-fuel ratio abyfsold for a next calculation, and thereafter, proceeds to step 1825 to determine whether or not the air-fuel ratio change amount ΔAF is smaller than an air-fuel ratio change amount threshold ΔAFth (ΔAFth>0). The present time is immediately after the start of the fuel cut operation, and therefore, is immediately after the fuel cut start condition satisfied time-point tfc and the predetermined first time-point t1. As described above, the "exhaust gas discharged into the exhaust gas staying space from the cylinders other than the data-to-be-obtained cylinder" stays (exists) in the exhaust gas staying space, and passes through the upstream air-fuel ratio sensor 55 until the predetermined time elapses from the predetermined first time-point t1. Accordingly, since the detected air-fuel ratio which is the upstream-side air-fuel ratio abyfs is not stable, the air-fuel ratio change amount ΔAF is equal to or larger than the air-fuel ratio change amount threshold ΔAFth. The CPU therefore makes a "No" determination at step 1825 to directly proceed to step 1895 to end the present routine tentatively.

When this state continues, the exhaust gas staying space becomes substantially filled with the exhaust gas (final gas) discharged lastly from the data-to-be-obtained cylinder (n-th cylinder). Accordingly, the upstream-side air-fuel ratio abyfs becomes stable, and thus the air-fuel ratio change amount ΔAF becomes smaller than the air-fuel ratio change amount threshold ΔAFth. Consequently, when the CPU starts the process of the routine shown in FIG. 18 to proceed to step 1825, the CPU makes a "Yes" determination at step 1825 to proceed to step 1830 at which the CPU increments a value of a stable state continuation counter Cok by "1". The stable state continuation counter Cok is a counter to confirm that a "state in which the air-fuel ratio change amount ΔAF is smaller than the air-fuel ratio change amount threshold ΔAFth" continues for more than a predetermined time. As described below, the value of the stable state continuation counter Cok is set to (at) "0" when the air-fuel ratio relating data are obtained (refer to step 1850), and is also set to (at) "0" when the fuel cut termination condition is satisfied (refer to step 1760 in FIG. 17). Further, the value of the stable state continuation counter Cok is set to (at) "0" by the initialization routine.

Subsequently, the CPU proceeds to step 1835 to determine whether or not the stable state continuation counter Cok is equal to or larger than the stable state continuation counter threshold Cokth. The present time is immediately after the air-fuel ratio change amount ΔAF becomes smaller than the air-fuel ratio change amount threshold ΔAFth. Accordingly the stable state continuation counter Cok is smaller than the stable state continuation counter threshold Cokth. Thus, the CPU makes a "No" determination at step 1835 to directly proceed to step 1895 to end the present routine tentatively. It should be noted that the stable state continuation counter threshold Cokth may be equal to or larger than "1".

When this state continues, the process at step 1830 is repeatedly executed, and therefore, the stable state continuation counter Cok becomes equal to or larger than the stable state continuation counter threshold Cokth. This time-point corresponds to the predetermined second time-point tp described above. Therefore, when the CPU proceeds to step 1835, the CPU makes a "Yes" determination at step 1835 to execute processes from steps 1840 to 1855 described below in this order so as to obtain the air-fuel ratio relating data of the data-to-be-obtained cylinder (n-th cylinder). Thereafter, the CPU proceeds to step 1895 to end the present routine tentatively.

Step 1840: The CPU obtains a new (updated) air-fuel ratio relating data integrated (cumulative) value SAF(n) for the n-th cylinder (the present data-to-be-obtained cylinder) by adding the "upstream-side air-fuel ratio abyfs obtained based on the output value Vabyfs of the upstream air-fuel ratio sensor 55" to the "current air-fuel ratio data integrated value SAF(n) for the n-th cylinder". That is, when the data-to-be-obtained cylinder is the first cylinder, the "air-fuel ratio data integrated value SAF(1) for the first cylinder" is increased by the "present upstream-side air-fuel ratio abyfs (detected air-fuel ratio)". When the data-to-be-obtained cylinder is the second cylinder, the "air-fuel ratio data integrated value SAF(2) for the second cylinder" is increased by the "present upstream-side air-fuel ratio abyfs (detected air-fuel ratio)". Similarly, when the data-to-be-obtained cylinder is the third cylinder, the "air-fuel ratio data integrated value SAF(3) for the third cylinder" is increased by the "present upstream-side air-fuel ratio abyfs (detected air-fuel ratio)". When the data-to-be-obtained cylinder is the fourth cylinder, the "air-fuel ratio data integrated value SAF(4) for the fourth cylinder" is increased by the "present upstream-side air-fuel ratio abyfs (detected air-fuel ratio)".

Step 1845: The CPU increment a value of a n-th cylinder data number counter C(n) by "1". That is, a value of a first cylinder data number counter C(1) is incremented by "1" when the data-to-be-obtained cylinder is the first cylinder, and a value of a second cylinder data number counter C(2) is incremented by "1" when the data-to-be-obtained cylinder is the second cylinder. Similarly, a value of a third cylinder data number counter C(3) is incremented by "1" when the data-to-be-obtained cylinder is the third cylinder, and a value of a fourth cylinder data number counter C(4) is incremented by "1" when the data-to-be-obtained cylinder is the fourth cylinder.

Step 1850: The CPU sets the value of the stable state continuation counter Cok to (at) "0".

Step 1855: The CPU sets the value of the data obtaining flag Xget to (at) "1".

With the processes described above, data (air-fuel ratio relating data) representing (indicative of) the air-fuel ratio of the mixture supplied to the data-to-be-obtained cylinder (the cylinder which becomes the valve resting state lastly, that is, the final gas discharging cylinder) is obtained and stored.

It should be noted that, when the CPU proceeds to step 1810 in the routine shown in FIG. 18 in this state, the CPU makes a "No" determination at step 1810 to directly proceed to step 1895 to end the present routine tentatively. Accordingly, the air-fuel ratio relating data is obtained only once per one fuel cut operation.

A case will next be described in which the fuel cut termination condition become satisfied while the value of the F/C execution flag XFC is set to (at) "1" (when the fuel injections for all of the cylinders are stopped). In this case, when the CPU starts the process of the routine shown in FIG. 17 from step 1700 and proceeds to step 1710, the CPU makes a "Yes" determination at step 1710, and also makes a "Yes" determination at step 1720 following to step 1710. Thereafter, the CPU executes processes from steps 1730 to 1760 described below in this order, and proceeds to step 1795 to end the present routine tentatively.

Step 1730: The CPU sets the value of the F/C request flag XFCreq to (at) "0".

Step 1740: The CPU sets the value of the F/C execution flag XFC to (at) "0".

Step 1750: The CPU sets the value of the data obtaining flag Xget to (at) "0".

Step 1760: The CPU sets the value of the stable state continuation counter Cok to (at) "0".

According to the processes described above, the CPU operates as follows.

Figure 15:
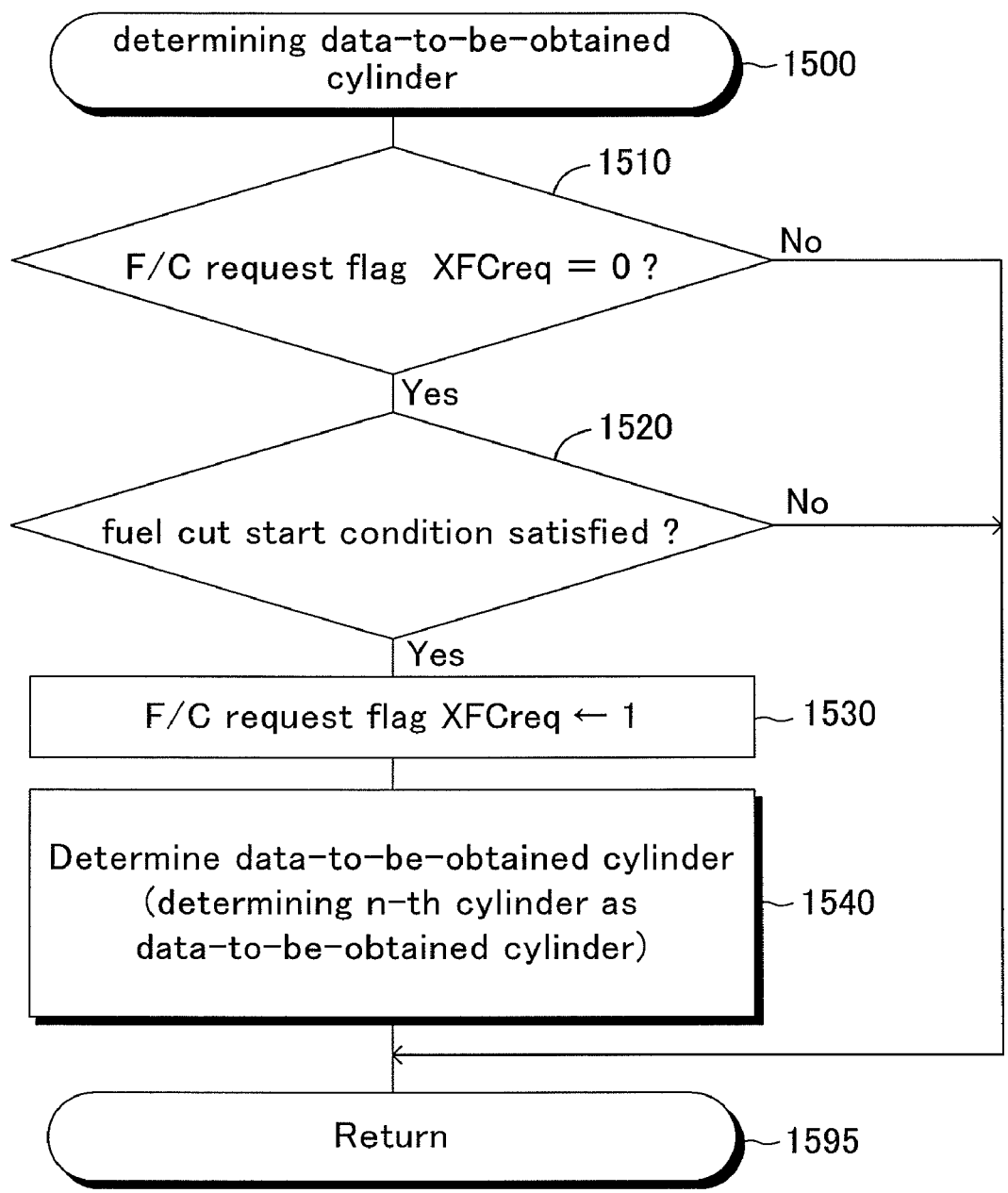
FIG. 15 is a flowchart showing a routine executed by a CPU of an air-fuel ratio imbalance among cylinders determining apparatus according to a first embodiment of the present invention.

The CPU proceeds to step 1520 from step 1510, shown in FIG. 15.

The CPU proceeds to step 1620 from step 1610, shown in FIG. 16.

The CPU proceeds to step 1795 from step 1710, shown in FIG. 17.

The CPU proceeds to step 1895 from step 1805, shown in FIG. 18.

Accordingly, the fuel injection is resumed (refer to step 1620 shown in FIG. 16), and the state of each of the cylinders is changed to the valve operating state. Further, when the fuel cut start condition becomes satisfied again, the CPU determines the data-to-be-obtained cylinder (refer to step 1540 shown in FIG. 15), and sequentially stops the fuel injection of each of the cylinders so that the fuel injection for the data-to-be-obtained cylinder becomes the last fuel injection (refer to steps from 1650 to 1670, shown in FIG. 16). The CPU obtains, when the upstream-side air-fuel ratio abyfs becomes stable (the air-fuel ratio change amount $\Delta AF$ becomes smaller than the air-fuel ratio change amount threshold $\Delta AFth$) under such a state, the upstream-side air-fuel ratio abyfs at that moment as the air-fuel ratio relating data of the data-to-be-obtained cylinder.

As described above, the time-point at which the fuel cut start condition is satisfied arrives irrespective of the crank angle. Therefore, when the engine 10 is operated for a certain operating time, each of the cylinders is generally selected as the data-to-be-obtained cylinder with the same frequency to each other, and therefore, the air-fuel ratio relating data for each of the cylinder is obtained with the approximately same frequency to each other. Therefore, the m-th cylinder data number counters C(m) (that is, the first cylinder data number counter C(1), the second cylinder data number counter C(2), the third cylinder data number counter C(3), and the fourth cylinder data number counter C(4)) increases in the same (similar) way to each other, and some time after, all of these becomes larger than the data number threshold Cth.

In this case, the CPU starts the process of the routine shown in FIG. 19 from step 1900, the CPU makes a "Yes" determination at step 1910 at which the CPU determines whether or not the "value of the first cylinder data number counter C(1) is equal to or larger than the data number threshold Cth", and the CPU proceeds to step 1920 to determine whether or not the "value of the second cylinder data number counter C(2) is equal to or larger than the data number threshold Cth".

At step 1920, the CPU makes a "Yes" determination to proceed to step 1930 at which the CPU determines whether or not the "value of the third cylinder data number counter C(3) is equal to or larger than the data number threshold Cth". At this time, the CPU makes a "Yes" determination at step 1930 to proceed to step 1940 at which the CPU determines whether or not the "value of the fourth cylinder data number counter C(4) is equal to or larger than the data number threshold Cth".

At this time, the CPU makes a "Yes" determination at step 1940 to proceed to step 1950 at which the CPU obtains an "air-fuel ratio AF(m) of each of the cylinders (air-fuel ratio of the mixture supplied to each of the cylinders) using the air-fuel ratio data integrated value SAF(m) which is the air-fuel ratio relating data. More specifically, the CPU obtains, as the air-fuel ratio of the m-th cylinder AF(m), an average of the air-fuel ratio of the m-th cylinder through dividing the air-fuel ratio data integrated value SAF(m) by the m-th cylinder data number counter C(m).

That is, the CPU obtains the air-fuel ratio of the first cylinder AF(1) through dividing the air-fuel ratio data integrated value SAF(1) by the first cylinder data number counter C(1). The CPU obtains the air-fuel ratio of the second cylinder AF(2) through dividing the air-fuel ratio data integrated value SAF(2) by the second cylinder data number counter C(2). The CPU obtains the air-fuel ratio of the third cylinder AF(3) through dividing the air-fuel ratio data integrated value SAF(3) by the third cylinder data number counter C(3). The CPU obtains the air-fuel ratio of the fourth cylinder AF(4) through dividing the air-fuel ratio data integrated value SAF(4) by the fourth cylinder data number counter C(4).

Subsequently, the CPU proceeds to step 1960 whether or not only one selected from the air-fuel ratio of the first cylinder AF(1), the air-fuel ratio of the second cylinder AF(2), the air-fuel ratio of the third cylinder AF(3), and the air-fuel ratio of the fourth cylinder AF(4) is different (deviates) from the other (the rest of) air-fuel ratios of the cylinder by a "predetermined value" or more.

For example, it is assumed that the air-fuel ratio imbalance among cylinders is occurring in which only the air-fuel ratio of the third cylinder deviates (shifts) greatly toward a rich side. In this case, for example, each of the air-fuel ratio of the first cylinder AF(1), the air-fuel ratio of the second cylinder AF(2), and the air-fuel ratio of the fourth cylinder AF(4) is between 14.5 and 14.7, and the air-fuel ratio of the third cylinder AF(3) is 11. Accordingly, the air-fuel ratio of the third cylinder AF(3) deviates from each of the other air-fuel ratios of the other cylinders AF(1), AF(2), and AF(4) by the predetermined value (e.g., 3) or more. Therefore, in this case, it can be determined that the air-fuel ratio imbalance among cylinders due to the third cylinder is occurring.

In this way, when there is only one air-fuel ratio, among the air-fuel ratio of the first cylinder AF(1), the air-fuel ratio of the second cylinder AF(2), the air-fuel ratio of the third cylinder AF(3), and the air-fuel ratio of the fourth cylinder AF(4), which is different from the other air-fuel ratios by a value equal to or larger than the predetermined value, the CPU makes a "Yes" determination at step 1960 to proceed to step 1970 at which the CPU sets a value of an "imbalance occurrence flag XINB" to (at) "1". That is, the CPU determines that "the air-fuel ratio imbalance among cylinders has occurred". It should be noted that the value of the imbalance occurrence flag XINB is stored in the back up RAM of the electric controller 60. In addition, when the value of the imbalance occurrence flag XINB is set to (at) "1", the CPU may drive waning means (for example, it may turn on a warning light).

In contrast, when there is no air-fuel ratio, among the first cylinder AF(1), the air-fuel ratio of the second cylinder AF(2), the air-fuel ratio of the third cylinder AF(3), and the air-fuel ratio of the fourth cylinder AF(4), which is different from the other air-fuel ratios by the predetermined value or more, the CPU makes a "No" determination at step at step 1960 to proceed to step 1980 at which the CPU sets the value of an "imbalance occurrence flag XINB" to (at) "0". That is, the CPU determines that "the air-fuel ratio imbalance among cylinders is not occurring".

It should be noted that the CPU directly proceed to step 1995, when the CPU makes a "No" determination with respect to the condition to be determined at one of steps from step 1920 to step 1940.

Details of an Operation of an Air-Fuel Ratio Imbalance Among Cylinder Determining Apparatus According to a Second Embodiment The actual operation of the air-fuel ratio imbalance among cylinder determining apparatus (hereinafter, referred to as a "second determining apparatus") according to the second embodiment will next be described. The second apparatus is different from the first apparatus in the way to determine the data-to-be-obtained cylinder. Accordingly, hereinafter, the difference is mainly described.

When the CPU of the second determining apparatus proceeds to step 1540 shown in FIG. 15 immediately after the fuel cut start condition becomes satisfied (immediately after the fuel cut start condition satisfied time-point tfc), the CPU determines the data-to-be-obtained cylinder (n-th cylinder) as follows.

Figure 21:
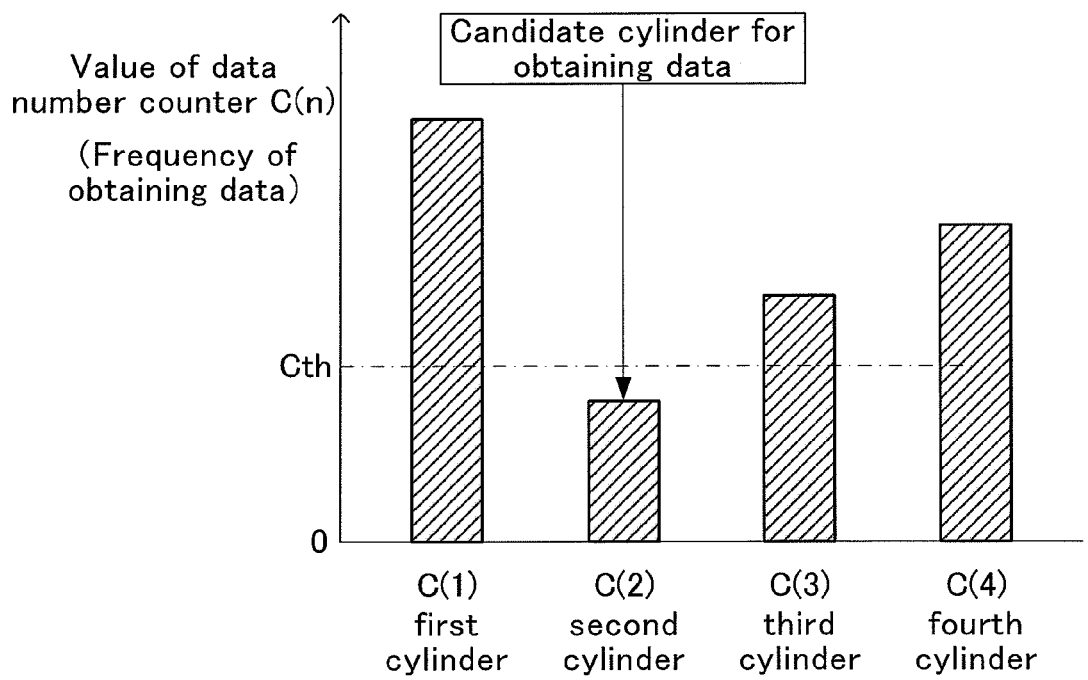
FIG. 21 is an example of value of a data number counter of each of cylinders to which a CPU of an air-fuel ratio imbalance among cylinders determining apparatus according to a second embodiment of the present invention refers.

The CPU selects, at the fuel cut start condition satisfied time-point tfc, as the data-to-be-obtained cylinder (n-th cylinder), a "cylinder to which a counter having the smallest value among the m-th cylinder data number counters C(m) (m; integer from 1 to 4) corresponds (that is, a cylinder whose frequency of obtaining air-fuel ratio relating data is the smallest)". For example, when the value of the cylinder data number counter C(m) of the m-th cylinder is as shown in FIG. 21, the CPU selects the second cylinder as the data-to-be-obtained cylinder (n-th cylinder; n=2).

Figure 22:
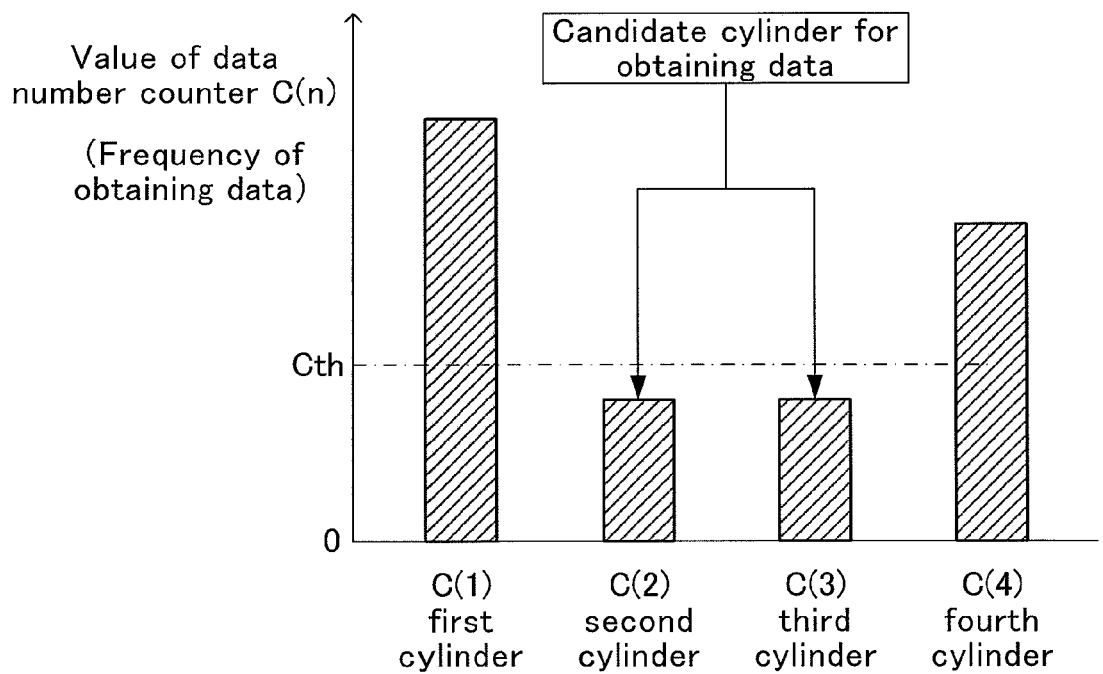
FIG. 22 is another example of value of the data number counter of each of cylinders to which the CPU of the air-fuel ratio imbalance among cylinders determining apparatus according to the second embodiment of the present invention refers.

When two or more of the counters among cylinder data number counters C(m) have the same values to each other at the fuel cut start condition satisfied time-point tfc (refer to FIG. 22), the CPU selects, as the data-to-be-obtained cylinder (n-th cylinder), the "cylinder whose fuel injection timing before (prior to) the fuel cut start condition satisfied time-point tfc was the closest to the fuel cut start condition satisfied time-point tfc" among the cylinders to which such a cylinder data number counters correspond.

As described above, there is a case where the second determining apparatus selects, as the data-to-be-obtained cylinder (n-th cylinder), the cylinder which is different from the "cylinder whose fuel injection timing before (prior to) the fuel cut start condition satisfied time-point tfc was the closest to the fuel cut start condition satisfied time-point tfc".

Figure 23:
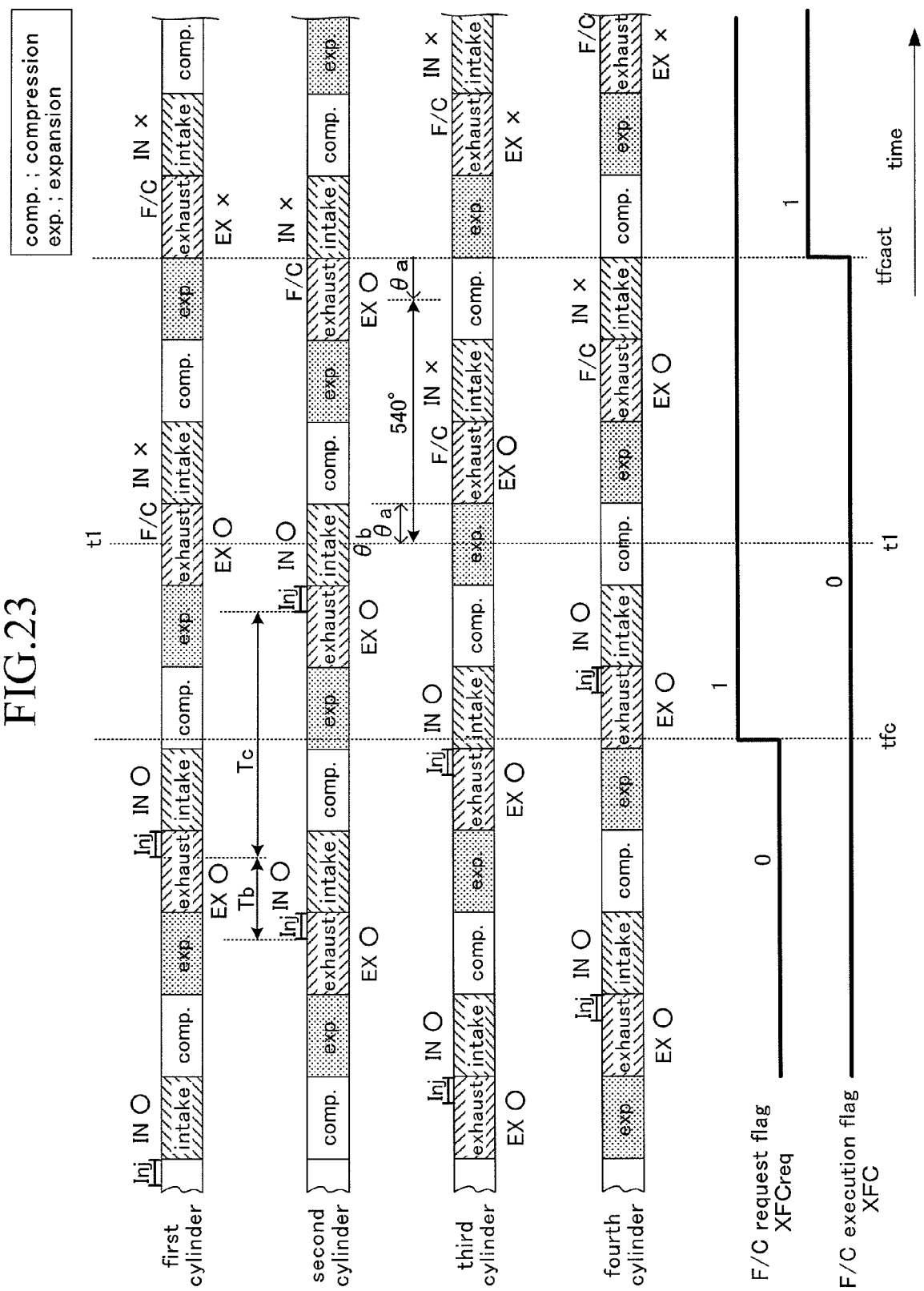
FIG. 23 is a timing chart for describing an example of an operation of the air-fuel ratio imbalance among cylinders determining apparatus according to the second embodiment of the present invention.

FIG. 23 shows one example of the above case. In the example shown in FIG. 23, the "cylinder whose fuel injection timing before (prior to) the fuel cut start condition satisfied time-point tfc is the closest to the fuel cut start condition satisfied time-point tfc (i.e., the cylinder whose fuel injection timing comes last after the fuel cut start condition satisfied time-point tfc)" is the third cylinder. However, as shown in FIG. 21, when the second cylinder data number counter C(2) is smaller than the other cylinder data number counters C(1), C(3), and C(4), the second cylinder instead of the third cylinder is selected as the data-to-be-obtained cylinder.

Consequently, the fuel injection is carried out at the fuel injection timing of the fourth cylinder which comes immediately after the fuel cut start condition satisfied time-point tfc, and therefore, the fourth cylinder is not changed into the valve resting state (the valve operating state is maintained). Further, the fuel injection is carried out at the fuel injection timing of the second cylinder which comes after that, and therefore, the second cylinder is not changed into the valve resting state (the valve operating state is maintained).

Subsequently, the fuel injection is stopped at the fuel injection timing of the first cylinder, and the state of the first cylinder is changed into the valve resting state. This time-point is the predetermined first time-point t1. Thereafter, the fuel injections of the third, the fourth, and the second cylinders are sequentially stopped in this order (i.e., according to the ignition order), and the state of the cylinder whose fuel injection is stopped is sequentially changed into the valve resting state. Consequently, the second cylinder becomes the final gas discharging cylinder, that is, the second cylinder becomes the data-to-be-obtained cylinder.

The actual operation of the second determining apparatus will next be described. The CPU of the second determining apparatus executes the routine shown in FIG. 15, a routine having steps shown in FIG. 24 which replace a part of steps shown in FIG. 16, the routines shown FIG. 17 to FIG. 19. The routines shown in FIG. 15, and FIGS. 17 to 19 have been already described. Accordingly, the routine having steps shown in FIG. 24 which replace a part of steps shown in FIG. 16 will next be described mainly.

It is assumed here that the crank angle of any of the cylinders coincides with the predetermined crank angle θa before the intake top dead center immediately after the value of the F/C request flag XFCreq was changed from "0" to "1" when the fuel cut start condition was satisfied, and thus, the CPU starts the process of the routine shown in FIG. 16 from step 1600.

Figure 24:
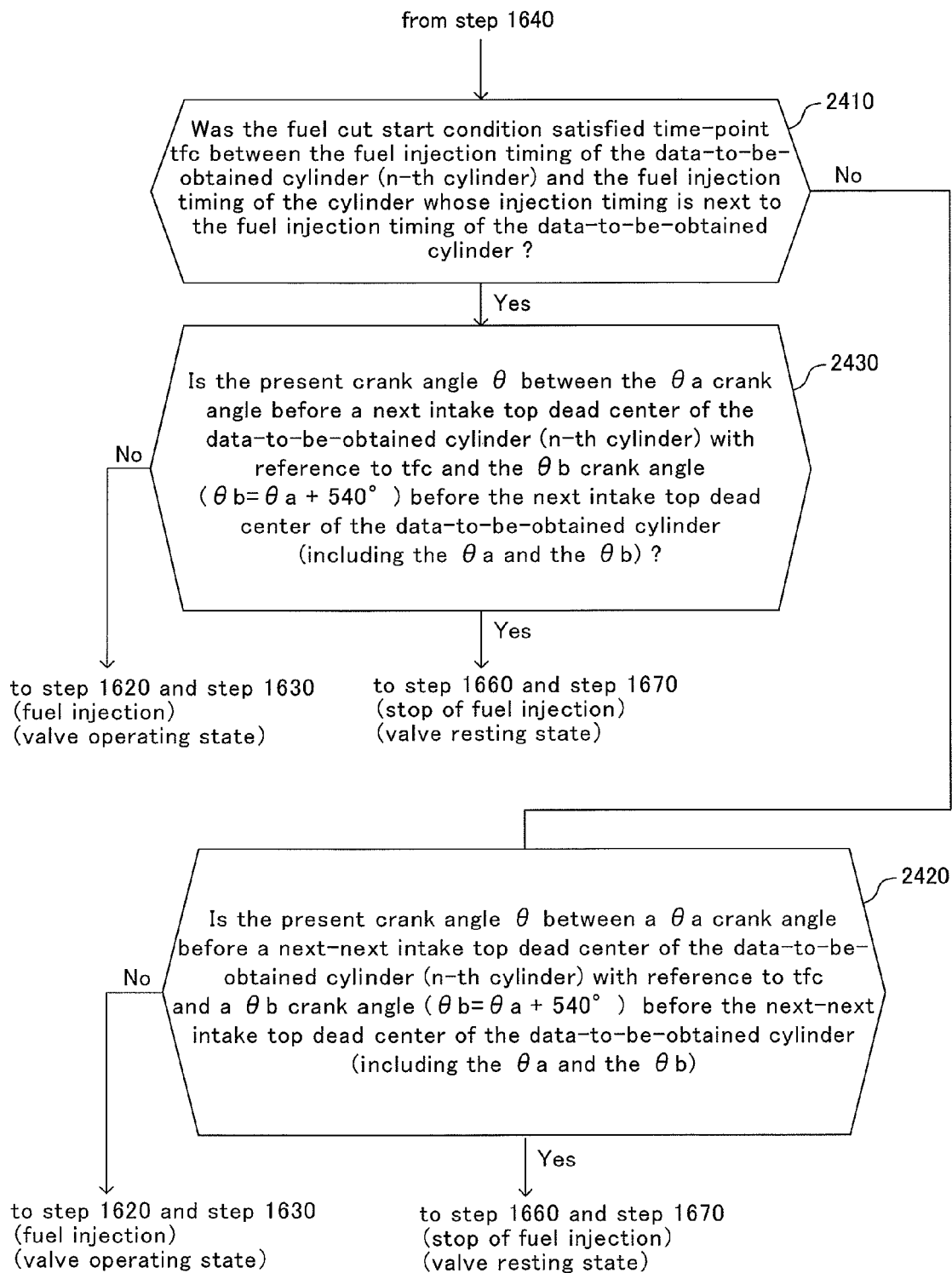
FIG. 24 is a flowchart showing a routine executed by a CPU of the air-fuel ratio imbalance among cylinders determining apparatus according to the second embodiment of the present invention.

In this case, the CPU makes a "No" determination at step 1610, and makes a "Yes" determination at step 1640 to proceed to step 2410 shown in FIG. 24. At the step 2410, the CPU determines whether or not the fuel cut start condition satisfied time-point tfc was between the fuel injection timing of the data-to-be-obtained cylinder (n-th cylinder) and the fuel injection timing of the cylinder whose injection timing is supposed to come next to the fuel injection timing of the data-to-be-obtained cylinder (i.e., whether or not the time-point tfc was in a period Tb).

For example, a description is made referring to the example shown in FIG. 23 (the example in which the second cylinder is the data-to-be-obtained cylinder), the CPU determines whether the time-point tfc was in the period Tb or a period (i.e., a period Tc) other than the period Tb. In the example shown in FIG. 23, the time-point tfc was not in the period Tb. Therefore, the CPU makes a "No" determination at step 2410 to proceed to step 2420 at which the CPU determines whether or not the present (current) crank angle θ is between a "θa crank angle before a next-next intake top dead center of the data-to-be-obtained cylinder (n-th cylinder) with reference to the fuel cut start condition satisfied time-point tfc" and a "θb crank angle (θb=θa+540°) before the next-next intake top dead center of the data-to-be-obtained cylinder" (including the θa and the θb)

The present point of time is immediately after the fuel cut start condition satisfied time-point tfc, and therefore, the present crank angle θ does not satisfy the condition in step 2420 (refer to FIG. 23). Accordingly, the CPU makes a "No" determination at step 2420 to proceed to step 1620 and step 1630. Consequently, the fuel injection for the present (current) fuel injection cylinder (in the example shown in FIG. 23, the fourth cylinder) is carried out, and the state of the cylinder is maintained in the valve operating state.

This operation continues until the condition in step 2420 becomes satisfied. Accordingly, in the example shown in FIG. 23, the fuel injection for the second cylinder followed by the fuel injection for the fourth cylinder is performed, and the state of the second cylinder is maintained in the valve operating state.

When the condition in step 2420 is satisfied, the CPU makes a "Yes" determination at step 2420 to proceed to step 1660 and step 1670. Consequently, the fuel injection is sequentially stopped in ignition order from the cylinder whose crank angle θ reach the "θb crank angle before the next-next intake top dead center of the data-to-be-obtained cylinder (n-the cylinder)", and the state of the cylinder is changed into the valve resting state. That is, in the example shown in FIG. 23, the fuel injections for the first, the third, and the fourth cylinder are sequentially stopped in this order, and the states of these cylinders are sequentially changed to the valve resting state.

When the crank angle θ coincides with the "θa crank angle before a next-next intake top dead center of the data-to-be-obtained cylinder (n-th cylinder) with reference to the fuel cut start condition satisfied time-point tfc", the fuel injection for the n-th cylinder is stopped, and the state of the n-th cylinder is changed into the valve resting state. As a result, the n-th cylinder (in the example shown in FIG. 23, the second cylinder) becomes the final gas discharging cylinder, that is the data-to-be-obtained cylinder. At this time, the CPU makes a "Yes" determination at step 1680 to execute the process of step 1690. Accordingly, the value of the F/C execution flag XFC is set to (at) "1".

In contrast, if the fuel cut start condition satisfied time-point tfc is within the period Tb, the CPU makes a "Yes" determination at step 2410 to proceed to step 2430 at which the CPU determines whether or not the present (current) crank angle θ is between the "θa crank angle before a next intake top dead center of the data-to-be-obtained cylinder (n-th cylinder) with reference to the fuel cut start condition satisfied time-point tfc" and the "θb crank angle (θb=θa+ 540°) before the next intake top dead center of the data-to-be-obtained cylinder" (including the θa and the θb).

Meanwhile, when the CPU makes a "Yes" determination at step 2410, the data-to-be-obtained cylinder is (coincides with) the cylinder whose fuel injection start timing which is before the fuel cut start condition satisfied time-point tfc is the closest to the fuel cut start condition satisfied time-point tfc". Therefore, the condition in step 2430 is always satisfied when the CPU proceeds to step 2430, similarly to the condition in step 1650. That is, the step 2430 is provided for confirmation. Accordingly, the CPU makes a "Yes" determination at step 2430 to proceed to step 1660 and step 1670.

In this manner, the fuel injections are sequentially stopped in ignition order from for the cylinder whose ignition timing is 3 times ignition prior to the ignition timing of the n-th cylinder which is the data-to-be-obtained cylinder, and the state of the cylinder for which the fuel injection is sequentially stopped is sequentially changed into the valve resting state.

Details of an Operation of an Air-Fuel Ratio Imbalance Among Cylinder Determining Apparatus According to a Third Embodiment The actual operation of the air-fuel ratio imbalance among cylinder determining apparatus (hereinafter, referred to as a "third determining apparatus") according to the third embodiment will next be described. The third apparatus is different from the second apparatus in the way to determine the data-to-be-obtained cylinder. Accordingly, hereinafter, the difference is mainly described.

The CPU of the second determining apparatus described above selects, as the data-to-be-obtained cylinder (n-th cylinder), a "cylinder to which a data number counter having the smallest value among the cylinder data number counters C(m) (m: integer from 1 to 4) of the m-th cylinder corresponds (that is, a cylinder whose frequency of obtaining air-fuel ratio relating data is the smallest)" at the fuel cut start condition satisfied time-point tfc. In contrast, the CPU of the third determining apparatus determines the data-to-be-obtained cylinder in consideration of a time (duration) tex (hereinafter, referred to as a "fuel cut execution start completion time tex") from the "fuel cut start condition satisfied time-point tfc" to a "time-point at which the fuel injection for the data-to-be-obtained cylinder is not carried out (stopped) even when the fuel injection timing for the data-to-be-obtained cylinder comes", in addition to the frequency of obtaining air-fuel ratio relating data.

More specifically, when the CPU of the third determining apparatus proceeds to step 1540 shown in FIG. 15 immediately after the fuel cut start condition satisfied time-point tfc, the CPU determines the data-to-be-obtained cylinder (n-th cylinder) as follows.

Figure 25:
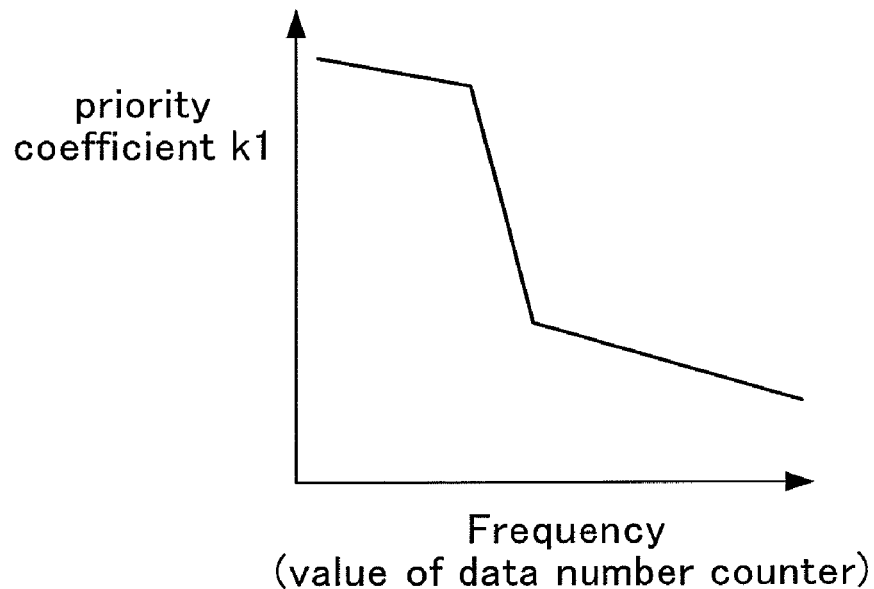
FIG. 25 is a table used by the CPU of the air-fuel ratio imbalance among cylinders determining apparatus according to the second embodiment of the present invention for determining a priority coefficient k1.

The CPU determines a priority k, and determines a cylinder which has the highest priority k, as the data-to-be-obtained cylinder. In order to determine the priority k, the CPU firstly applies the cylinder data number counter C(m) (m: integer from 1 to 4) of the m-th cylinder to a first table shown in FIG. 25 to obtain a priority coefficient k1($m$) of the m-th cylinder. According to the first table, the priority coefficient k1($m$) is obtained in such a manner that the priority coefficient k1($m$) becomes larger as the cylinder data number counter C(m) of the m-th cylinder becomes smaller.

Figure 26:
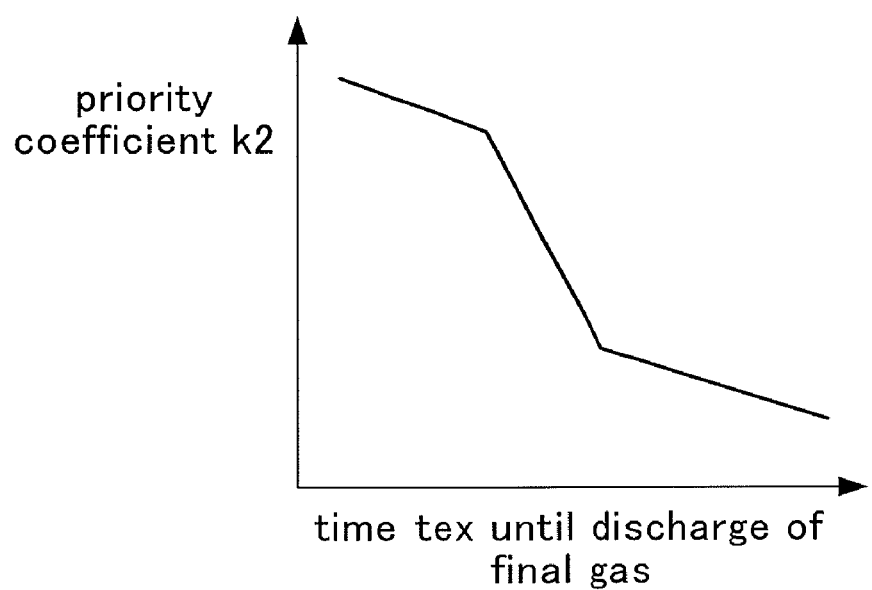
FIG. 26 is a table used by the CPU of the air-fuel ratio imbalance among cylinders determining apparatus according to the second embodiment of the present invention for determining a priority coefficient k2.

Subsequently, the CPU determines the fuel cut execution start completion time tex when it is assumed that the m-th cylinder is selected as the data-to-be-obtained cylinder, and applies the time tex to a second table shown in FIG. 26 to obtain a priority coefficient k2($m$). According to the second table, the priority coefficient k2($m$) is obtained in such a manner that the priority coefficient k2($m$) becomes larger as the time tex becomes shorter.

Thereafter, the CPU obtains a product of the priority coefficient k1($m$) of the m-th cylinder and the priority coefficient k2($m$) of the m-th cylinder, and adopts the product as the priority k of the m-th cylinder. The CPU determines (selects) the m-th cylinder which has the highest priority k as the data-to-be-obtained cylinder (n-th cylinder). The operation of the CPU is the same as that of the second determining apparatus except the described way to determine the data-to-be-obtained cylinder.

It should be noted that the third determining apparatus may obtain the priority coefficient k2($m$) by using a time form the "fuel cut start condition satisfied time-point tfc" to a "final gas discharging time-point (final gas discharging start time-point, or final gas discharging completion time-point)" in place of the "fuel cut execution start completion time tex". Further, the third determining apparatus may determine (select) the data-to-be-obtained cylinder based on only the priority coefficient k2($m$) (i.e., based on only the fuel cut execution start completion time tex).

Details of an Operation of an Air-Fuel Ratio Imbalance Among Cylinder Determining Apparatus According to a Fourth Embodiment The actual operation of the air-fuel ratio imbalance among cylinder determining apparatus (hereinafter, referred to as a "fourth determining apparatus") according to the fourth embodiment will next be described. The fourth apparatus is different from the first apparatus only in the way to determine the data-to-be-obtained cylinder. Accordingly, hereinafter, the difference is mainly described.

The CPU of the fourth determining apparatus determines (selects), at the (present) fuel cut start condition satisfied time-point tfc, as a present (current) data-to-be-obtained cylinder, a cylinder which is different from a "cylinder which was the data-to-be-obtained cylinder at the previous fuel cut start condition satisfied time-point (i.e., when the fuel cut operation was performed previously)".

For example, it is assumed that the first cylinder was determined to be the data-to-be-obtained cylinder according to the way which is the same as the way that the first determining apparatus adopts at the previous fuel cut start condition satisfied time-point tfc, and the air-fuel ratio relating data of the first cylinder was obtained during the fuel cut operation caused by the previous satisfaction of the fuel cut start condition. Under this assumption, if the first cylinder is again determined to be the data-to-be-obtained cylinder according to the way which is the same as the way that the first determining apparatus adopts at the present (current) fuel cut start condition satisfied time-point tfc, the CPU of the fourth determining apparatus selects, as the data-to-be-obtained cylinder, a cylinder which is different from the first cylinder (e.g., the third cylinder whose ignition is curried out next to the ignition of the first cylinder). The operation of the CPU is the same as that of the second determining apparatus except the described way to determine the data-to-be-obtained cylinder.

The determining apparatus according to the present invention may be an apparatus in which various modifications may be made as described below.

Each of the first to fourth determining apparatuses sequentially stops the fuel injection for each of the cylinders in the fuel injection order (which is the same as the ignition order), and the intake valves 23 and the exhaust valves 25 of the cylinder for which the fuel injection is stopped are both changed into the valve resting states.

In contrast, a determining apparatus (another determining apparatus) of the modified embodiment according to the present invention stops the fuel injection for each of the cylinders in the fuel injection order, changes only either one of the intake valves 23 and the exhaust valves 25 of the cylinder for which the fuel injection is stopped into the valve resting states, and maintains the other one of the intake valves 23 and the exhaust valves 25 in the valve operating states, after the predetermined first time-point t1.

Figure 27:
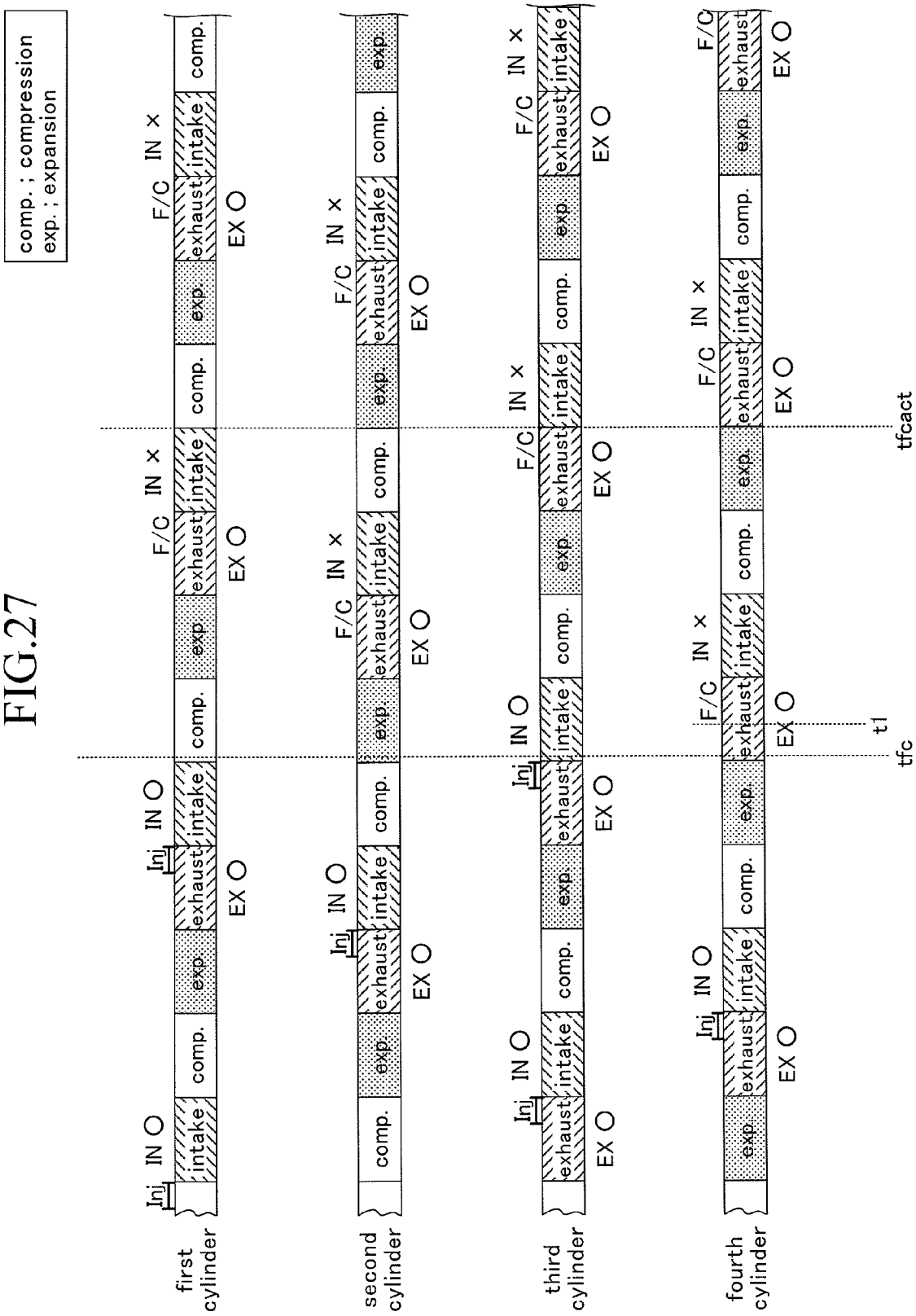
FIG. 27 is a timing chart for describing an example of an operation of an air-fuel ratio imbalance among cylinders determining apparatus according to a modified example of the embodiments of the present invention.

That is, for example, as shown in FIG. 27, another determining apparatus, after the predetermined first time-point t1, changes only the intake valves 23 of the cylinder for which the fuel injection is stopped into the valve resting states, and maintains the exhaust valves 25 of that cylinder in the valve operating states. In this case, there is a possibility that a part of the gas which was once discharged from a certain cylinder into the exhaust gas staying space flows into the combustion chamber 21 of the certain cylinder, when the exhaust valves 25 of the certain cylinder are made opened. However, since the intake valves 23 remain in the valve resting states, a "gas other than the gas which was already discharged into the exhaust gas staying space" is not discharged into the exhaust gas staying space after the final gas discharging time-point.

Figure 28:
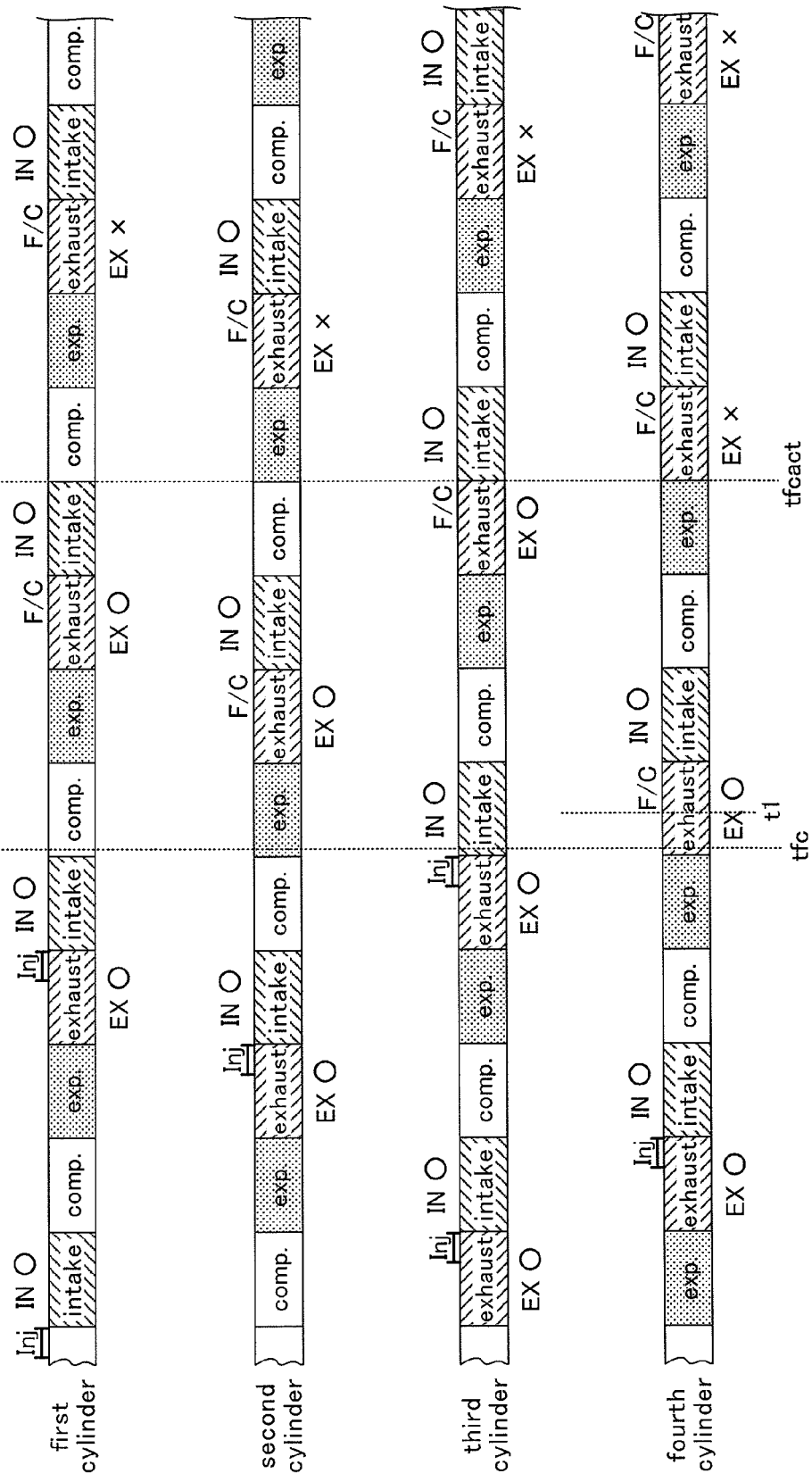
FIG. 28 is a timing chart for describing an example of an operation of an air-fuel ratio imbalance among cylinders determining apparatus according to another modified example of the embodiments of the present invention.

Similarly, as shown in FIG. 28, another determining apparatus, after the predetermined first time-point t1, changes only the exhaust valves 25 of the cylinder for which the fuel injection is stopped into the valve resting states, and maintains the intake valves 23 of that cylinder in the valve operating states. In this case, since the intake valves 23 are opened and closed in the intake stroke, there is a possibility that a gas in the intake passage (fresh air) flows into the combustion chamber 21 of the certain cylinder, when the intake valves 23 of the certain cylinder are made opened. However, since the exhaust valves 25 remain in the valve resting states, the "gas other than the gas which was already discharged into the exhaust gas staying space" is not discharged into the exhaust gas staying space after the final gas discharging time-point.

Further, another determining apparatus, after the predetermined first time-point t1, may change only the intake valves 23 of "one or more of the certain cylinders" for which the fuel injections are stopped into the valve resting states, and maintain the exhaust valves 25 of the certain cylinders in the valve operating states, and in addition, change only the exhaust valves 25 of "the other (the rest of) the certain cylinders" for which the fuel injections are stopped into the valve resting states, and maintain the intake valves 23 of the other cylinders in the valve operating states. Furthermore, after the predetermined first time-point t1, another determining apparatus may change both the intake valves 23 and the exhaust valves 25 of "one or more of the certain cylinders" for which the fuel injections are stopped into the valve resting states, maintain the intake valves 23 of "another cylinders" for which the fuel injections are stopped in the valve operating states and change the exhaust valves 25 of the another cylinders into the valve resting states, and change the intake valves 23 of the "rest of the cylinders" for which the fuel injections are stopped into the valve resting states and maintain the exhaust valves 25 of the rest of the cylinders in the valve operating states.

Figure 29:
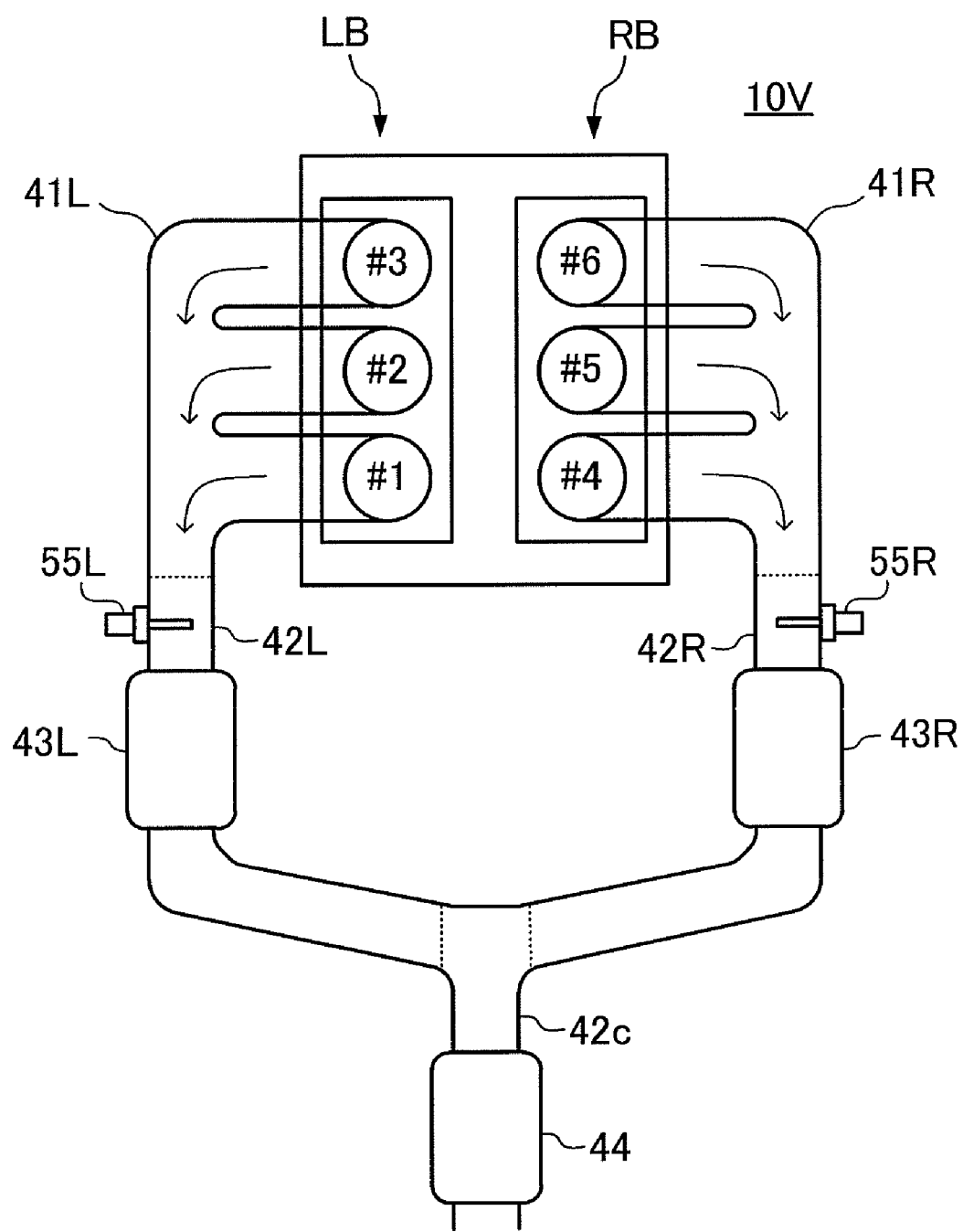
FIG. 29 is a schematic view of another internal combustion engine to which the air-fuel ratio imbalance among cylinders determining apparatus according to the present invention is applied.

Further, another determining apparatus may be applied to a V-type engine 10V shown in FIG. 29. The V-type engine 10V is, for example, a V-6 engine having a "left bank LB including a first to third cylinder" and a "right bank RB including a fourth to sixth cylinder". The first to third cylinders of the left bank belong to a first specified cylinder group. The fourth to sixth cylinders of the right bank belong to a second specified cylinder group. The ignition order (thus, the fuel injection order) of the engine 10V is, for example, the first cylinder, the fifth cylinder, the second cylinder, the fourth cylinder, the third cylinder, and the sixth cylinder.

Each of the cylinders of the V-type engine 10V has unillustrated two intake valves and unillustrated two exhaust valves. The two intake valves of each of the cylinders are connected to a surge tank via unillustrated two intake ports. A fuel injector is disposed at an aggregated portion of the two intake ports that each of the cylinders comprises. Further, an unillustrated variable valve operating mechanism for intake valves and an unillustrated variable valve operating mechanism for exhaust valves are provided for each of the cylinders. The configurations of these variable valve operating mechanisms are the same as described above.

Each of the exhaust ports of each of the cylinders belonging to the left bank is connected with each of branch portions of an exhaust manifold 41L for the left bank. All of the branch portions of the exhaust manifold 41L for the left bank aggregates (merges) into a first exhaust gas aggregated section. A main exhaust passage section 42L for the left bank is connected with the first exhaust gas aggregated section. An upstream-side catalytic converter 43L for the left bank is disposed in the main exhaust passage section 42L for the left bank. The main exhaust passage section 42L for the left bank is connected to a downstream-side exhaust gas passage section 42c. An upstream air-fuel ratio sensor 55L for the left bank is disposed in the main exhaust passage section 42L for the left bank, and between the first exhaust gas aggregated section and the upstream-side catalytic converter 43L for the left bank. The upstream air-fuel ratio sensor 55L is the same type sensor as the upstream air-fuel ratio sensor 55 described above.

Each of the exhaust ports of each of the cylinders belonging to the right bank is connected with each of branch portions of an exhaust manifold 41R for the right bank. All of the branch portions of the exhaust manifold 41R for the right bank aggregates (merges) into a second exhaust gas aggregated section. A main exhaust passage section 42R for the right bank is connected with the second exhaust gas aggregated section. An upstream-side catalytic converter 43R for the right bank is disposed in the main exhaust passage section 42R for the right bank. The main exhaust passage section 42R for the right bank is connected to the downstream-side exhaust gas passage section 42c. A downstream-side catalytic converter 44 is disposed in the downstream-side exhaust gas passage section 42c. An upstream air-fuel ratio sensor 55R for the right bank is disposed in the main exhaust passage section 42R for the right bank, and between the second exhaust gas aggregated section and the upstream-side catalytic converter 43R for the right bank. The upstream air-fuel ratio sensor 55R is the same type sensor as the upstream air-fuel ratio sensor 55 described above.

The determining apparatus applied to the thus configured V-type engine 10V functions (operates) in a way similar to each of the first to fourth determining apparatuses. It should be noted that air-fuel ratio relating data obtained based on the upstream air-fuel ratio sensor 55L for the left bank is data for a cylinder determined as the "data-to-be-obtained cylinder" among the cylinders (the first to third cylinder) belonging to the left bank. Similarly, air-fuel ratio relating data obtained based on the upstream air-fuel ratio sensor 55R for the right bank is data for a cylinder determined as the "data-to-be-obtained cylinder" among the cylinders (the fourth to sixth cylinder) belonging to the right bank.

As described above, the air-fuel ratio imbalance among cylinders determining apparatus according to the embodiments of the present invention is applied to an engine (10, 10V) having a plurality of cylinders, each including the valve driving device (27, 28, 100-104, 150-154, etc.) which selectively achieves (realizes) one of:

the valve operating state in which the intake valve 23 is opened and closed in such a manner that "at least the fresh air is introduced into the combustion chamber 21 through the intake port 22 communicating (connected) with the combustion chamber 21" in the intake stroke, and the exhaust valve 25 is opened and closed in such a manner that "the gas in the combustion chamber 21 is discharged into the exhaust port 24 communicating with the combustion chamber 21" in the exhaust stroke; and the valve resting state in which at least one of the intake valve 23 and the exhaust valve 25 is maintained in the closed state in all of the strokes including the intake stroke and the exhaust stroke.

Further, the engine (10, 10V) comprises;

the exhaust gas aggregated section (the aggregated section 41b, the first exhaust gas aggregated section, the second exhaust gas aggregated section), which communicates with the exhaust ports of all of the cylinders belonging to the specific cylinder group including one or more of the cylinders of a plurality of the cylinders, and into which the gases discharged from the cylinders belonging to the specific cylinder group aggregate (merge);

the main exhaust gas passage section (the exhaust pipe 42, the main exhaust gas passage section 42L for the left bank, the main exhaust gas passage section 42R for the right bank), which communicates with the exhaust gas aggregated section, and which forms (constitutes) the exhaust passage downstream of the exhaust gas aggregated section; and the catalytic converter (43, 43L, 43R) disposed (interposed) in the main exhaust gas passage section.

Figure 6:
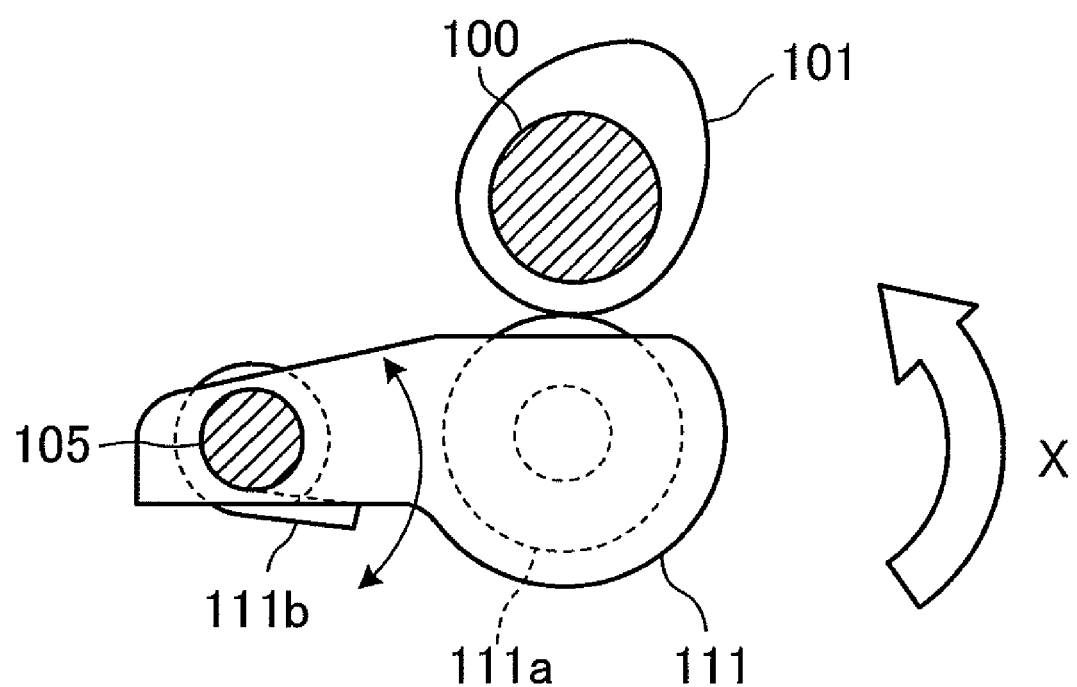
FIG. 6 is a side view of a first roller rocker arm.

The air-fuel ratio imbalance among cylinders determining apparatus according to the embodiments of the present invention comprises:

the air-fuel ratio sensor (55, 55L, 55R) disposed at the exhaust gas aggregated section or at the position between the exhaust gas aggregated section and the catalytic converter in the main exhaust gas passage section;

engine control means for providing (sending) instruction to the valve driving device of each of the cylinders belonging to the specific cylinder group, in such a manner that the states of all of the cylinders belonging to the specific cylinder group become in the valve operating states when the predetermined operation performing condition is not satisfied (refer to step 1630 shown in FIG. 16), and in such a manner that each of the states of all of the cylinders belonging to the specific cylinder group is sequentially changed from the valve operating state to the valve resting state in accordance with the ignition (firing) order after the predetermined first time-point t1 which is after the time-point at which the predetermined operating condition becomes satisfied (refer to step 1670 shown in FIG. 6);

individual cylinder air-fuel ratio data obtaining means for obtaining the value based on the output value of the air-fuel ratio sensor at the predetermined second time-point which is after the time-point at which the states of all of the cylinders belonging to the specific cylinder group have become the valve resting states owing to the satisfaction of the predetermined operation performing condition, as the air-fuel ratio relating data rerating to the air-fuel ratio of the mixture supplied to the combustion chamber of the final gas discharging cylinder whose state has become the valve resting state lastly (at the latest time-point) among all of the cylinders belonging to the specific cylinder group (refer to steps from step 1815 to step 1840 shown in FIG. 18); and air-fuel ratio imbalance among cylinders determining means for determining, after the time-point at which the air-fuel ratio relating data for each of all of the cylinders belonging to the specific cylinder group has been obtained by the individual cylinder air-fuel ratio data obtaining means, whether or not an imbalance is occurring among the air-fuel ratios of the mixtures, each supplied to each of the combustion chambers of all of the cylinders belonging to the specific cylinder group, based on a plurality of the obtained air-fuel ratio relating data (refer to the routine shown in FIG. 19).

Accordingly, when the predetermined operating condition becomes satisfied, the data relating to the air-fuel ratio (air-fuel ratio relating data) of each of the cylinders can be obtained with certainty, and therefore, the practical air-fuel ratio imbalance among cylinders determining apparatus can be provided.

Further, the engine control means of the determining apparatus described above, performs the fuel injection for each of the cylinders belonging to the specific cylinder group at the predetermined fuel injection timing which is before the end of the intake stroke of each of the cylinders, when the fuel cut performing condition as the predetermined operation performing condition is not satisfied (refer to step 1620 shown in FIG. 16); and stops sequentially the fuel injection for each of the cylinders belonging to the specific cylinder group at the predetermined fuel injection timing (refer to step 1660 shown in FIG. 16), and change the state of the cylinder for which the fuel injection is stopped from the valve operating state to the valve resting state (refer to step 1660 shown in FIG. 16), after the predetermined first time-point which is after the time-point at which the fuel cut performing condition is satisfied.

Even when the cylinder that has been changed into the fuel cut operating state is changed to the valve resting state, there arises no problem for operating the engine. Accordingly, by the configuration described above, the air-fuel ratio relating data can be obtained without causing any obstacle for the operation of the engine. Further, since no fresh air is introduced (flowed) into the catalytic converter (43, 43L, 43R) while the fuel cut operation is being performed, a progress of a deterioration of the catalytic converter can be avoided.

Further, the engine control means is configured so as to include data-to-be-obtained-cylinder determining means (refer to step 1540 shown in FIG. 15) for determining data-to-be-obtained-cylinder whose air-fuel ratio relating data should be obtained among the cylinders belonging to the specific cylinder group, when the fuel cut performing condition is satisfied, and is configured so as to sequentially stop the fuel injection at the predetermined fuel injection timing for each of all of the cylinders belonging to the specific cylinder group in such a manner that the determined data-to-be-obtained-cylinder becomes the final gas discharging cylinder (refer to the routine shown in FIG. 24).

With this configuration, it is possible to obtain the air-fuel ratio relating data for each of the cylinders at (with) the equivalent (similar) frequency.

Further, the data-to-be-obtained-cylinder determining means may be configured so as to determine the data-to-be-obtained-cylinder based on the number of times of obtaining the air-fuel ratio relating data for each of the cylinders belonging to the specific cylinder group (i.e., based on the cylinder data number counter C(m) of the m-th cylinder (refer to the second determining apparatus).

Further, the data-to-be-obtained-cylinder determining means may be configured so as to determine the data-to-be-obtained-cylinder based on the time-relating-value (refer to the fuel cut execution start completion time tex) which corresponds to the time (duration) from the time-point at which the fuel cut performing condition is satisfied to the predetermined fuel injection timing of each of the cylinders belonging to the specific cylinder group (refer to the third determining apparatus).

Furthermore, the data-to-be-obtained-cylinder determining means may be configured so as to determine, when the fuel cut performing condition is satisfied, as the current data-to-be-obtained cylinder, a cylinder which is different from a cylinder which was the data-to-be-obtained cylinder at the previous fuel cut operating condition satisfied time-point (refer to the fourth determining apparatus).

According to these aspects, it is possible to decrease a difference in frequencies of obtaining the air-fuel ratio relating data for each of the cylinders with more certainty.

As described above, according to the air-fuel ratio imbalance among cylinders of the embodiments and the modified embodiments according to the present invention, the state of the cylinder whose fuel injection is stopped after the predetermined first time-point is set to the valve resting state in such a manner that no new gas (gas other than the gas once discharged into the exhaust gas staying space, i.e., the fresh air or a new exhaust gas) is discharged from the cylinder into the exhaust gas staying space. Therefore, the data relating to the air-fuel ratio of the mixture supplied to each of the cylinder can easily be obtained, and consequently, it is possible to determine with certainty whether or not the air-fuel ratio imbalance among cylinders has been occurring.

It should be noted that the present invention is not limited to the embodiments described above, but various modifications may be adopted without departing from the scope of the invention. For example, the determining apparatus may switch over the states of the intake valves 23 and the exhaust valves 25 from the valve operating state to the valve resting state or vice versa by means of a electro-magnetic intake valve driving device and the electro-magnetic exhaust valve driving device instead of "the intake valve opening-closing mechanism and the exhaust valve opening-closing mechanism" described above. The electro-magnetic intake valve driving device is a device which can open and close the intake valve by an electro-magnetic force generated when energized. The electro-magnetic exhaust valve driving device is a device which can open and close the exhaust valve by an electro-magnetic force generated when energized.

Further, the "predetermined operating condition" is "the condition for the deceleration fuel cut operation", however, it may be another conditions. For example, the predetermined operating condition may be as follows.

The condition is a condition for a fuel cut operation after an operation for a stop of the engine satisfied when the ignition key switch is changed from "on" to "off".

The condition is a condition for stopping the engine operation according to a request from a motor etc. in a hybrid vehicle.

The condition is a condition for a fuel cut operation for an idling stop (so-called eco-run system). The idling stop is a function to stop the engine operation by the fuel cut operation, when a predetermined condition (engine stop condition) is satisfied, the predetermined condition being satisfied when the vehicle stops because of a traffic light and a shift position is at a neutral position. It will allow to prevent a wasteful operation of the engine so that an amount of carbon dioxide ($CO_2$) discharged from the vehicle is reduced, and a fuel consumption of the vehicle is improved.

The condition is a condition for a fuel cut operation satisfied when an abnormality of the system is detected.

The determining apparatus may be configured so as to determine the data-to-be-obtained cylinder, when one of these fuel cut operating conditions is satisfied, based on whether or not the condition is a condition which can permits a relatively long time (duration) from a time-point at which the fuel cut operating condition is satisfied to a time-point at which the fuel injections for all of the cylinders are stopped.

The determining apparatus may determine whether or not a predetermined time has elapsed since the predetermined first time-point t1 or since the final gas discharged time-point, and may obtain the air-fuel ratio relating data at the time-point at which the predetermined time has elapsed, the time-point being adopted as the "predetermined second time-point tp" described above.

It should be noted that "sequentially stopping the fuel injection at the predetermined fuel injection timing for each of the cylinders belonging to the specific cylinder group" may include stopping the fuel injections for all of the cylinders belonging to the specific cylinder group after the predetermined first time-point t1. In the present specification and the attached claims, that the fuel injection is stopped means that the fuel injection is not carried out at the original fuel injection timing.

The invention claimed is:

1. An air-fuel ratio imbalance among cylinders determining apparatus, applied to a multi-cylinder engine comprising:
    a plurality of cylinders, each including the valve driving device which selectively achieves one of a valve operating state and a valve resting state,
    said valve operating state being a state in which an intake valve is opened and closed in such a manner that at least a fresh air is introduced into a combustion chamber through an intake port communicating with said combustion chamber in an intake stroke, and an exhaust valve is opened and closed in such a manner that a gas in said combustion chamber is discharged into an exhaust port communicating with said combustion chamber in an exhaust stroke, and
    said valve resting state being a state in which at least one of said intake valve and said exhaust valve is maintained in a closed state in all of strokes including said intake stroke and said exhaust stroke;
    an exhaust gas aggregated section, which communicates with said exhaust ports of all of cylinders belonging to a specific cylinder group including two or more of a plurality of said cylinders, and into which gases discharged from said combustion chambers of all of said cylinders belonging to said specific cylinder group aggregate;
    a main exhaust gas passage section, which communicates with said exhaust gas aggregated section, and which forms an exhaust passage downstream of said exhaust gas aggregated section; and
    a catalytic converter disposed in said main exhaust gas passage section,
    said air-fuel ratio imbalance among cylinders determining apparatus comprising:
    an air-fuel ratio sensor, disposed at a position in said exhaust gas aggregated section or at a position between said exhaust gas aggregated section and said catalytic converter in said main exhaust gas passage section, and outputs an output value according to an air-fuel ratio of a gas existing at said position at which the air-fuel ratio sensor is disposed;
    engine controller that provides instruction to each of said valve driving devices of said cylinders belonging to said specific cylinder group in such a manner that states of all of said cylinders belonging to said specific cylinder group become in said valve operating states when a predetermined operation performing condition is not satisfied, and in such a manner that each of the states of all of said cylinders belonging to said specific cylinder group is sequentially changed from said valve operating state to said valve resting state in accordance with a firing order of said engine after a predetermined first time-point which is after a time-point at which said predetermined operating condition becomes satisfied;
    individual cylinder air-fuel ratio data obtaining unit that obtains a value based on said output value of said air-fuel ratio sensor at a predetermined second time-point which is after a time-point at which said states of all of said cylinders belonging to said specific cylinder group have become said valve resting states after said predetermined operation performing condition was satisfied, as an air-fuel ratio relating data which relates to an air-fuel ratio of a mixture supplied to said combustion chamber of a final gas discharging cylinder, which is one of said cylinders belonging to said specific cylinder group and whose state has become said valve resting state lastly among all of said cylinders belonging to said specific cylinder group; and air-fuel ratio imbalance among cylinders determining unit that determined, after a time-point at which said air-fuel ratio relating data for each of all of said cylinders belonging to said specific cylinder group has been obtained by said individual cylinder air-fuel ratio data obtaining means, whether or not an imbalance is occurring among said air-fuel ratios of said mixtures, each supplied to each of said combustion chambers of all of said cylinders belonging to said specific cylinder group, based on a plurality of said obtained air-fuel ratio relating data.

2. The air-fuel ratio imbalance among cylinders determining apparatus according to claim 1, wherein, said engine controller is configured so as to:

perform a fuel injection for each of said cylinders belonging to said specific cylinder group at a predetermined fuel injection timing which is before an end of said intake stroke of each of said cylinders, when a fuel cut performing condition as said predetermined operation performing condition is not satisfied; and stop sequentially said fuel injection for each of said cylinders belonging to said specific cylinder group at said predetermined fuel injection timing, and change said state of said cylinder for which said fuel injection is stopped from said valve operating state to said valve resting state, after said predetermined first time-point which is after said fuel cut performing condition is satisfied.

3. The air-fuel ratio imbalance among cylinders determining apparatus according to claim 2, wherein, said engine controller is configured so as to include a data-to-be-obtained-cylinder determining unit that determines a data-to-be-obtained-cylinder whose air-fuel ratio relating data should be obtained among said cylinders belonging to said specific cylinder group when said fuel cut performing condition is satisfied, and is configured so as to sequentially stop said fuel injection at said predetermined fuel injection timing for each of all of said cylinders belonging to said specific cylinder group in such a manner that said determined data-to-be-obtained-cylinder becomes said final gas discharging cylinder.

4. The air-fuel ratio imbalance among cylinders determining apparatus according to claim 3, wherein, said data-to-be-obtained-cylinder determining unit is configured so as to determine said data-to-be-obtained-cylinder based on the number of times of obtaining said air-fuel ratio relating data for each of said cylinders belonging to said specific cylinder group.

5. The air-fuel ratio imbalance among cylinders determining apparatus according to claim 3, wherein, said data-to-be-obtained-cylinder determining unit is configured so as to determine said data-to-be-obtained-cylinder based on a time-relating-value which corresponds to time from said time-point at which said fuel cut performing condition is satisfied to said predetermined fuel injection timing of each of said cylinders belonging to said specific cylinder group.

6. The air-fuel ratio imbalance among cylinders determining apparatus according to claim 3, wherein, said data-to-be-obtained-cylinder determining unit is configured so as to determine, when said fuel cut performing condition is satisfied, as a current data-to-be-obtained cylinder, a cylinder which is different from a cylinder which was said data-to-be-obtained cylinder when said fuel cut performing condition was previously satisfied.

* * * * *